(12) United States Patent
Takashimizu

(10) Patent No.: US 7,064,862 B2
(45) Date of Patent: Jun. 20, 2006

(54) PRINTER AND PRINTING METHOD FOR IMAGE-QUALITY CORRECTION

(75) Inventor: Yoshihiro Takashimizu, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 851 days.

(21) Appl. No.: 09/835,620

(22) Filed: Apr. 17, 2001

(65) Prior Publication Data

US 2001/0021035 A1 Sep. 13, 2001

Related U.S. Application Data

(63) Continuation of application No. PCT/JP99/05073, filed on Sep. 17, 1999.

(30) Foreign Application Priority Data

Oct. 19, 1998 (JP) ................... 10-296908

(51) Int. Cl.
*H04N 1/60* (2006.01)
*H04N 1/409* (2006.01)

(52) U.S. Cl. ............... 358/1.9; 358/2.1; 358/3.05; 358/3.26; 358/3.27; 382/258; 382/261; 382/275; 382/304

(58) Field of Classification Search ........... 382/201, 382/209, 217, 218, 254, 258, 257, 264, 266, 382/267, 268, 269, 270, 274, 298, 299, 300, 382/304; 358/1.9, 2.1, 3.01, 3.03, 3.05, 3.07, 358/3.12, 3.13, 3.26, 3.27; 718/107
See application file for complete search history.

(56) References Cited

U.S. PATENT DOCUMENTS 5,381,522 A * 1/1995 Seto et al. ............ 345/443
5,535,007 A * 7/1996 Kim ..................... 358/296
5,764,812 A * 6/1998 Sakano ................. 382/261
5,832,141 A * 11/1998 Ishida et al. ........... 382/298
6,226,050 B1 * 5/2001 Lee ..................... 348/607
6,229,578 B1 * 5/2001 Acharya et al. ......... 348/607
6,278,804 B1 * 8/2001 Okuyama ............... 382/261

(Continued)

FOREIGN PATENT DOCUMENTS

JP 62-242473 10/1987

(Continued)

OTHER PUBLICATIONS

American Heritage College Dictionary, Fourth Edition, 2002, Houghton Mifflin Company, p. 1376.*

(Continued)

*Primary Examiner*—King Y. Poon
*Assistant Examiner*—Lucas Divine
(74) *Attorney, Agent, or Firm*—Staas & Halsey LLP

(57) ABSTRACT

A printer performs printing after appropriately correcting irregularities, thin-line patchiness, and isolated pixels. A first image-quality corrector unit detects slanting-line irregularities represented by the black and white pixel data generated through binary processing according to a method other than the error-variance method to thereby perform smoothing processing therefor. A second image-quality corrector unit detects defects such as irregularities and patchiness specific to the binary processing according to the error-variance method to thereby perform smoothing processing therefor. A third image-quality corrector unit detects isolated pixels in gray fields that are specific to the binary processing according to the error-variance method to thereby distribute the isolated pixels to peripheral pixels. When an original image is reduced in size according to pixel-removal prior to the binary processing, the pixel-removal is not performed if a gradient variation is relatively great with respect to peripheral pixels.

17 Claims, 72 Drawing Sheets

U.S. PATENT DOCUMENTS 6,559,974 B1 * 5/2003 Morisita ................ 358/1.9
6,574,367 B1 * 6/2003 Arai et al. ............. 382/203

FOREIGN PATENT DOCUMENTS

| JP | 1-152869 | 6/1989 |
| JP | 3-275371 | 12/1991 |
| JP | 8-214154 | 8/1996 |
| JP | 8-214156 | 8/1996 |
| JP | 10-126609 | 5/1998 |
| JP | 10-214338 | 8/1998 |
| JP | 10-257341 | 9/1998 |
| JP | 11-32208 | 2/1999 |
| JP | 11-88682 | 3/1999 |

OTHER PUBLICATIONS

The Authoritative Dictionary of IEEE Standards Terms, Seventh Edition, 2000, IEEE, p. 1122.*

* cited by examiner

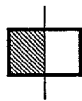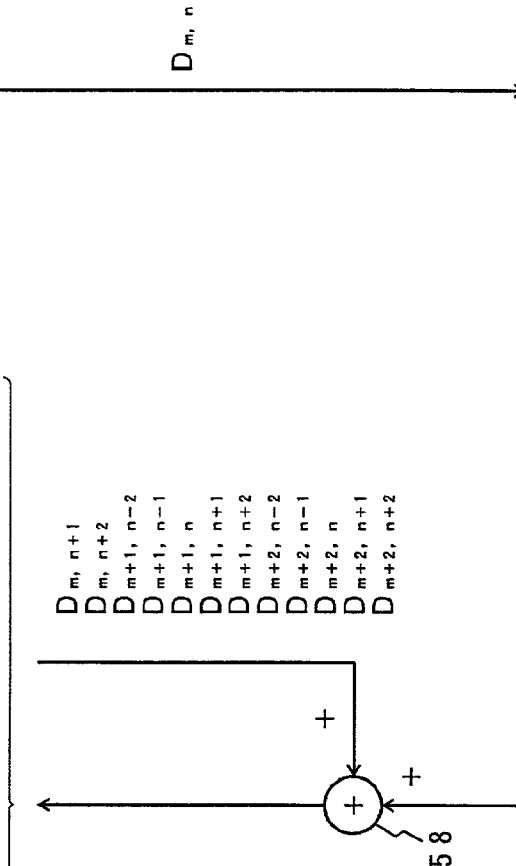
FIG. 10A

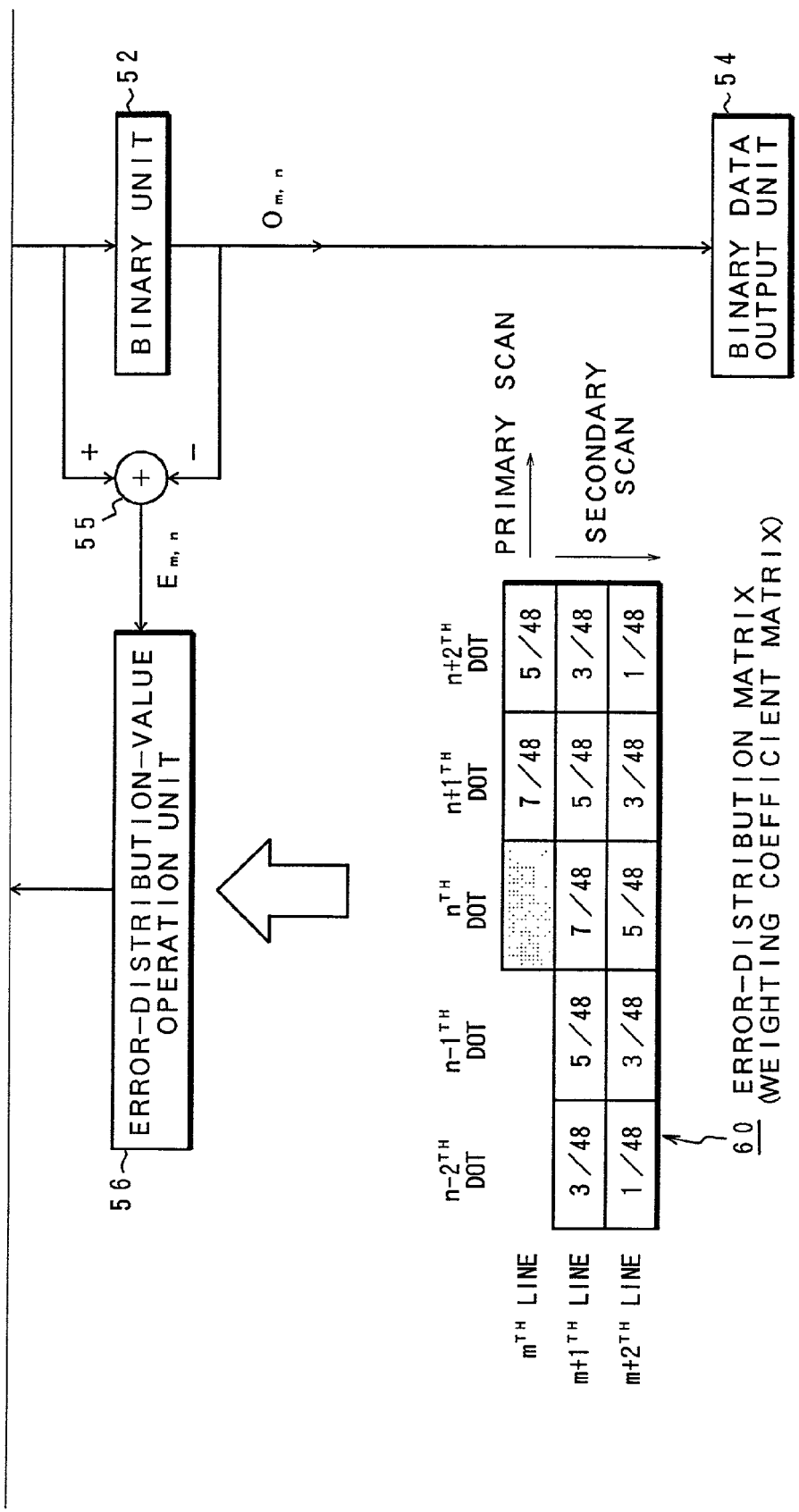

ORIGINAL PICTURE
IMAGE

MULTIVALUE DENSITY
LEVEL

OUTPUT IMAGE

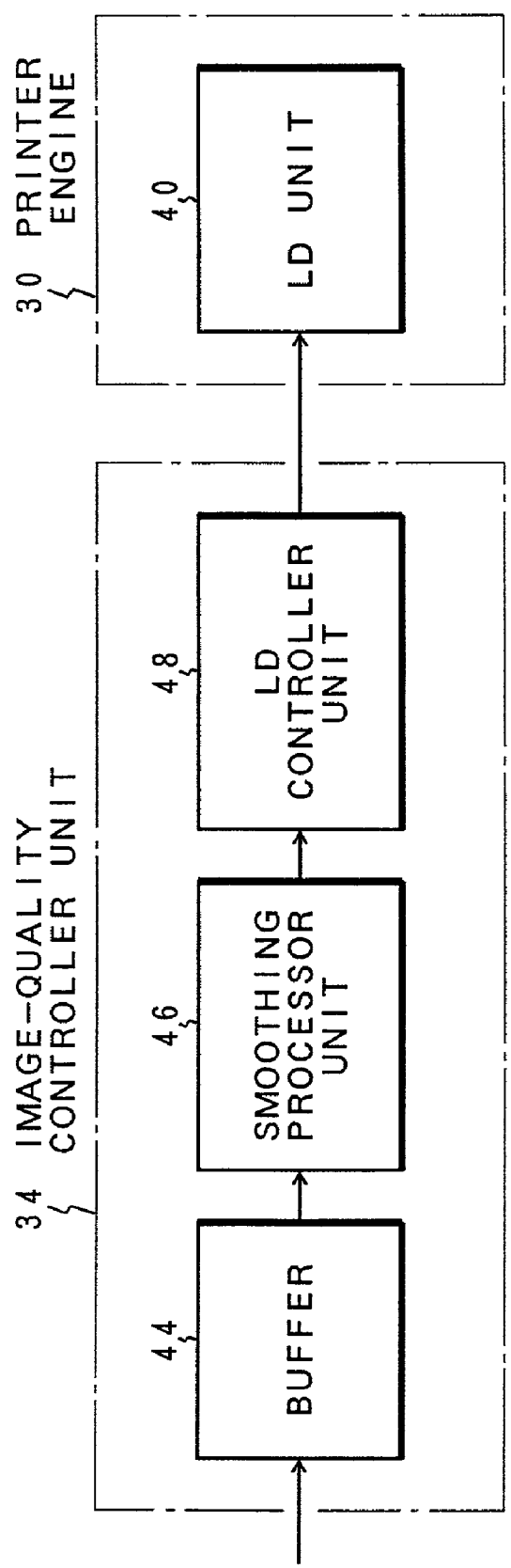

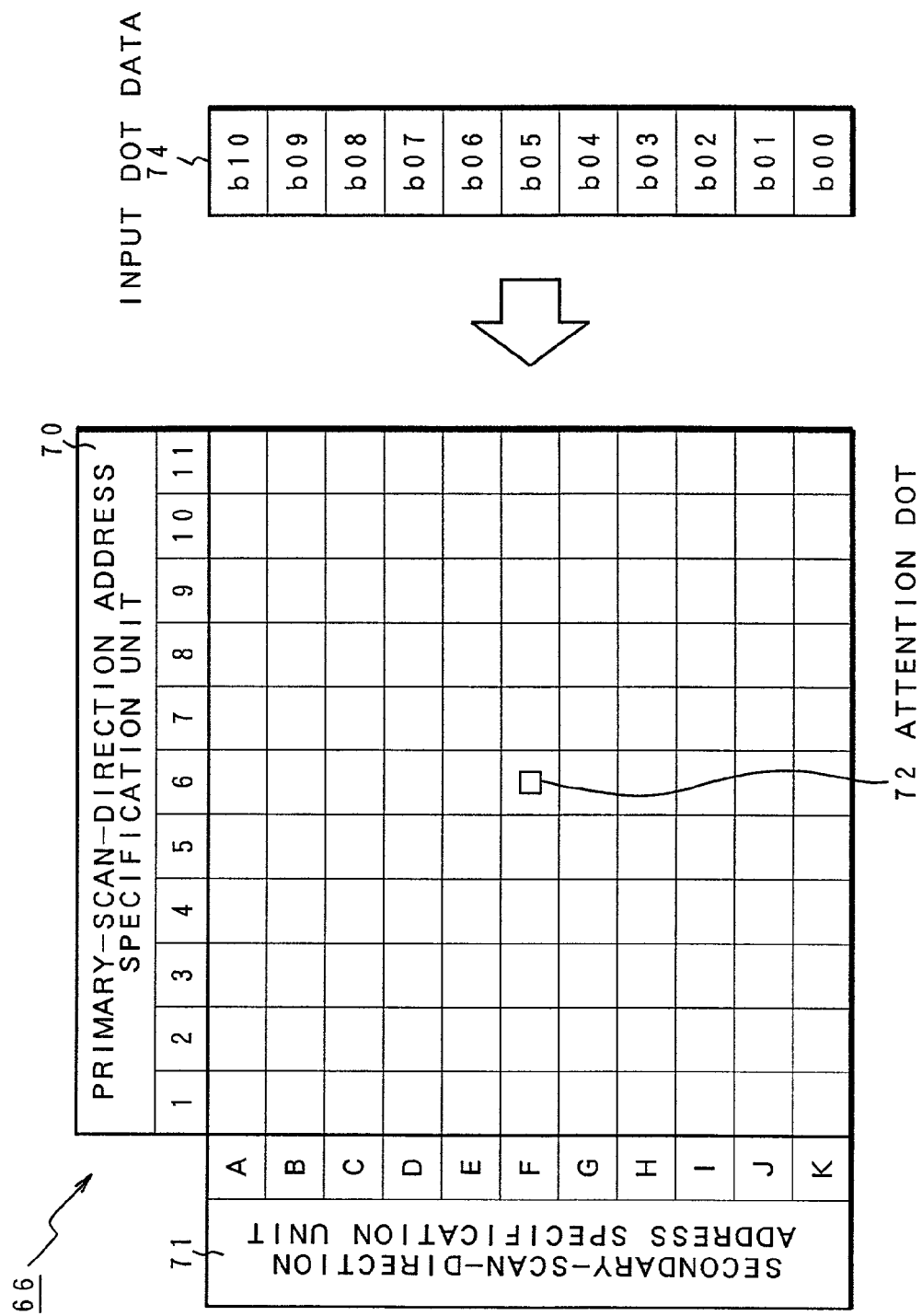

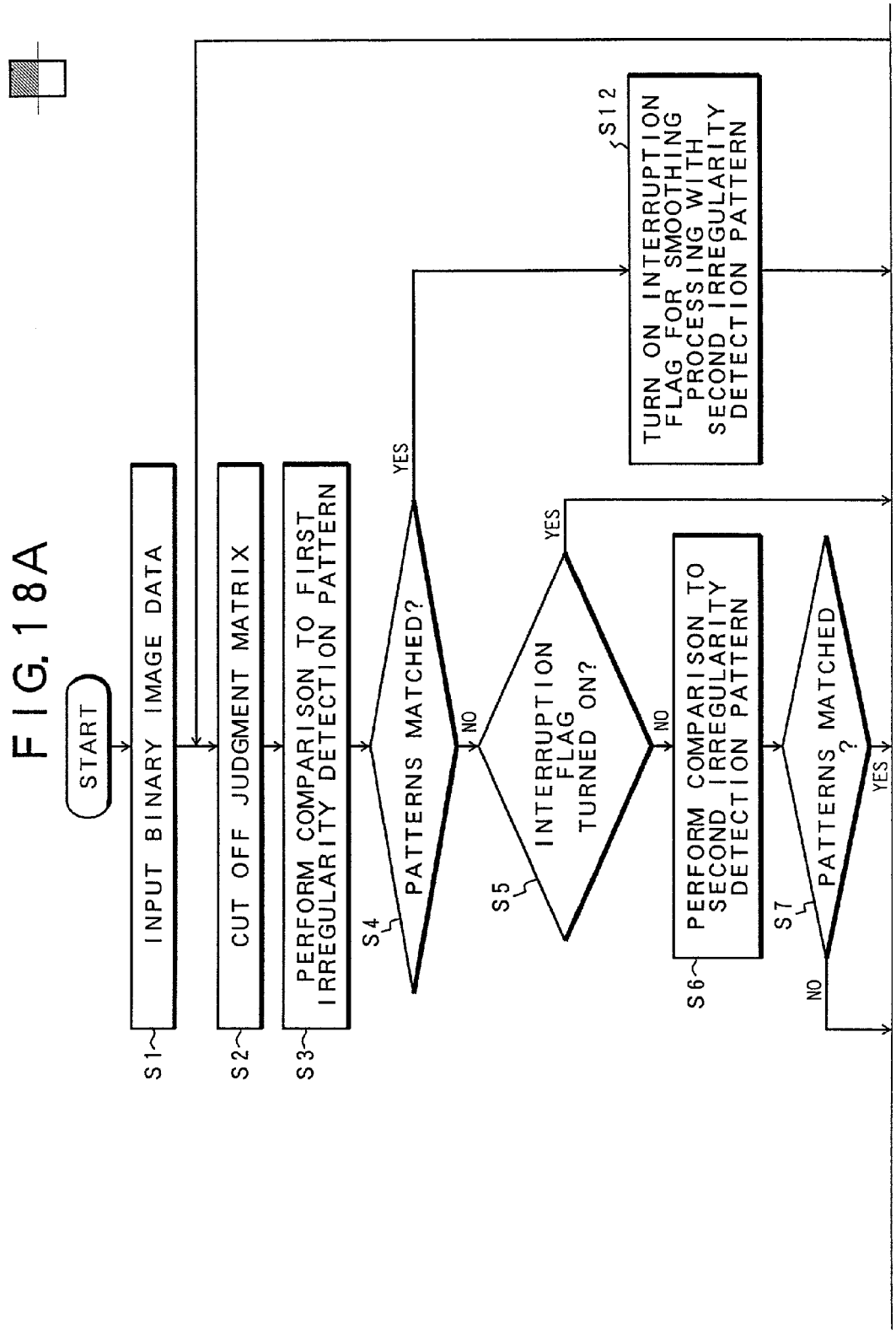

FIG. 19

| STORAGE UNITS | PATTERN CONTENTS | BINARY METHODS |
|---|---|---|
| FIRST IRREGULAR-PATTERN STORAGE UNIT | SLANTING-LINE IRREGULARITY DETECTION PATTERN | SIMPLE BINARY/DITHER |
| | VERTICAL/HORIZONTAL-LINE IRREGULARITY DETECTION PATTERN | ERROR VARIANCE |
| SECOND IRREGULAR-PATTERN STORAGE UNIT | THIN-LINE PATCHY DETECTION PATTERN | ERROR VARIANCE |
| ISOLATED-DOT-PATTERN STORAGE UNIT | ISOLATED-DOT DETECTION PATTERN | ERROR VARIANCE |

FIG. 20

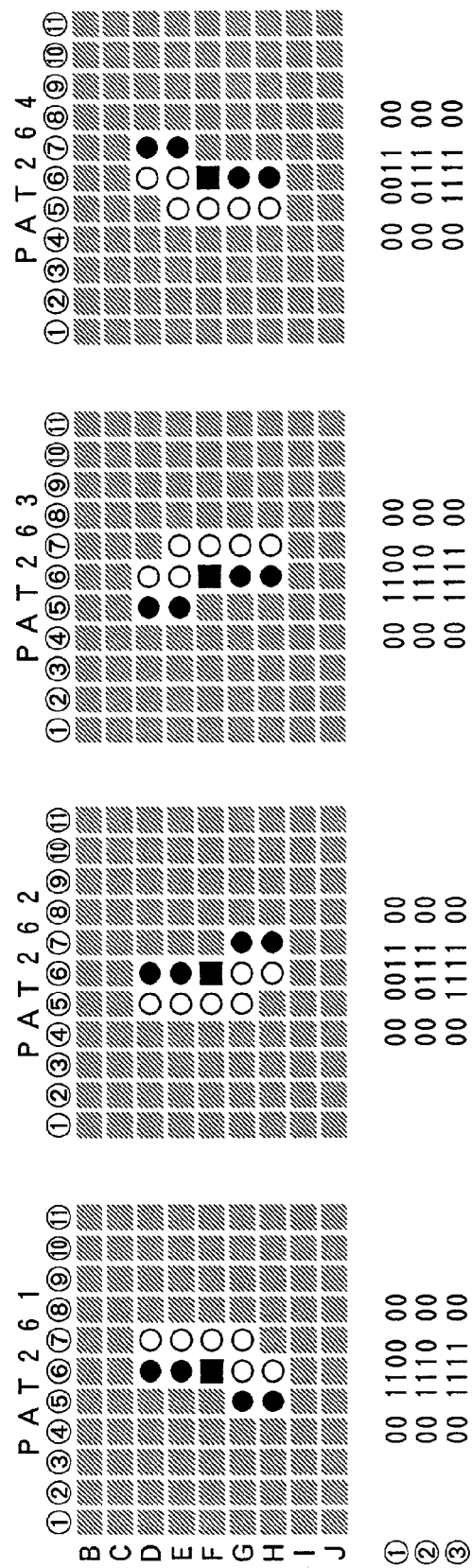

| DENSITY-PRESERVATION-PATTERN COMBINATIONS | | |
|---|---|---|
| PAT91 | PAT99 | PAT101 |
| PAT92 | PAT100 | PAT102 |
| PAT93 | PAT101 | PAT99 |
| PAT94 | PAT102 | PAT100 |

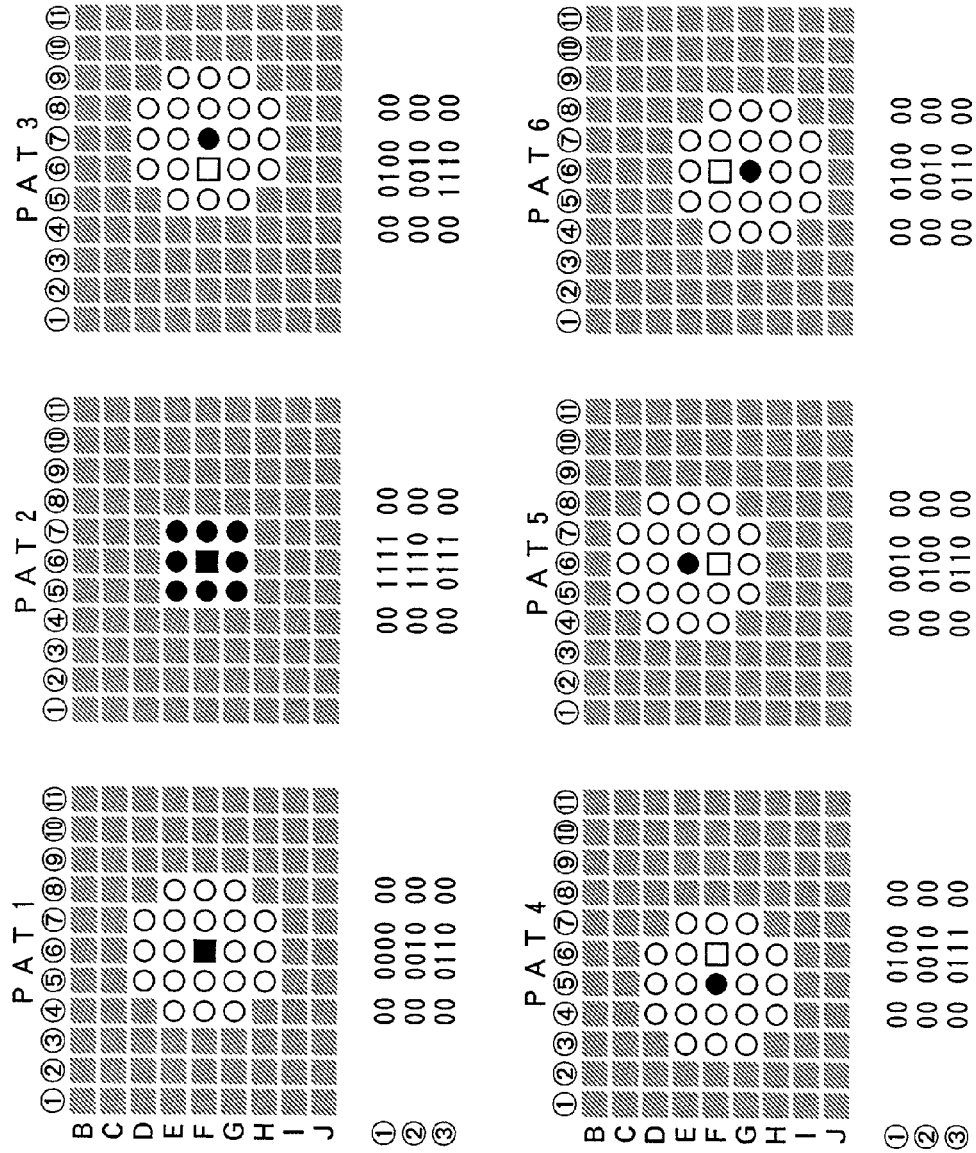

F I G. 54
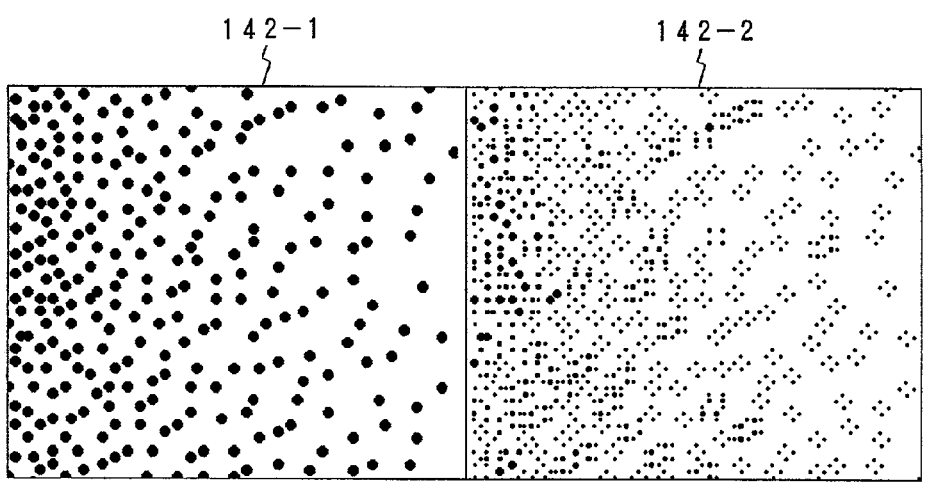
F I G. 55
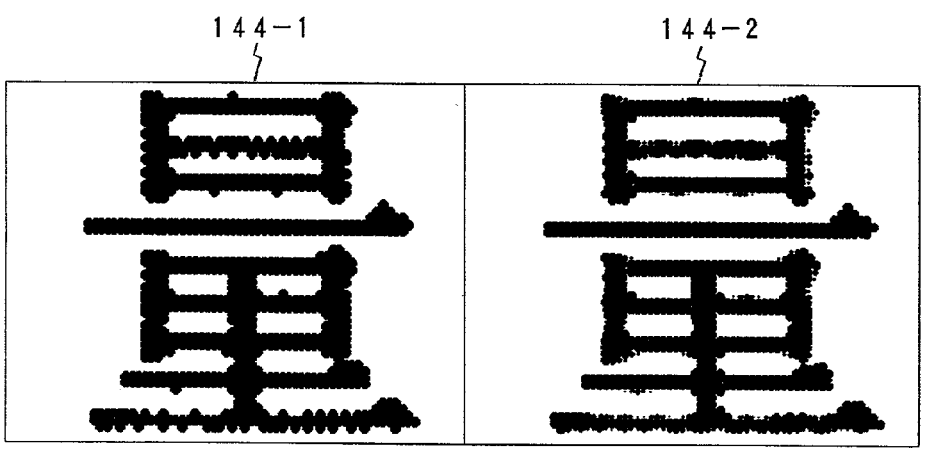

F I G. 5 6
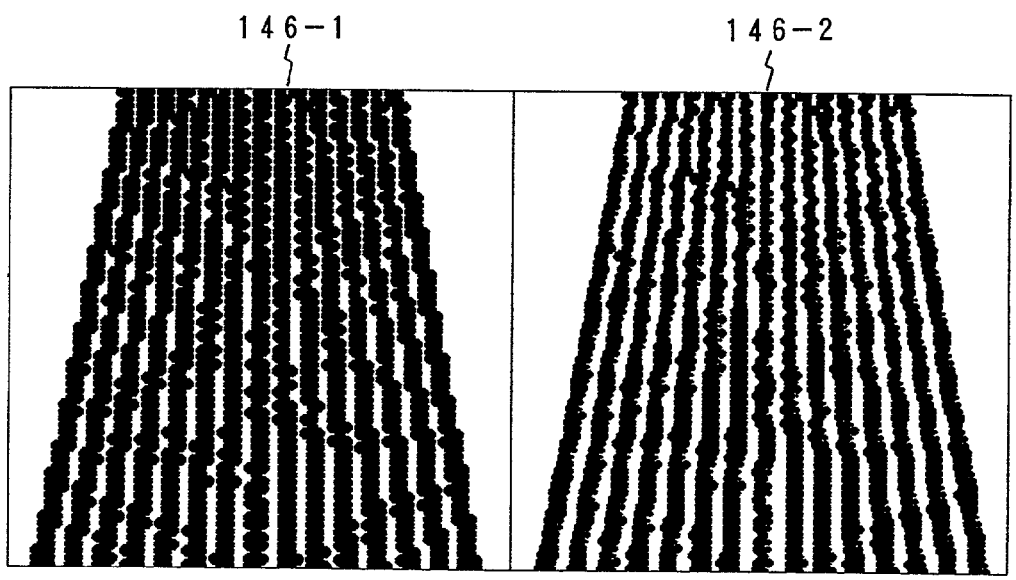

FIG. 65A
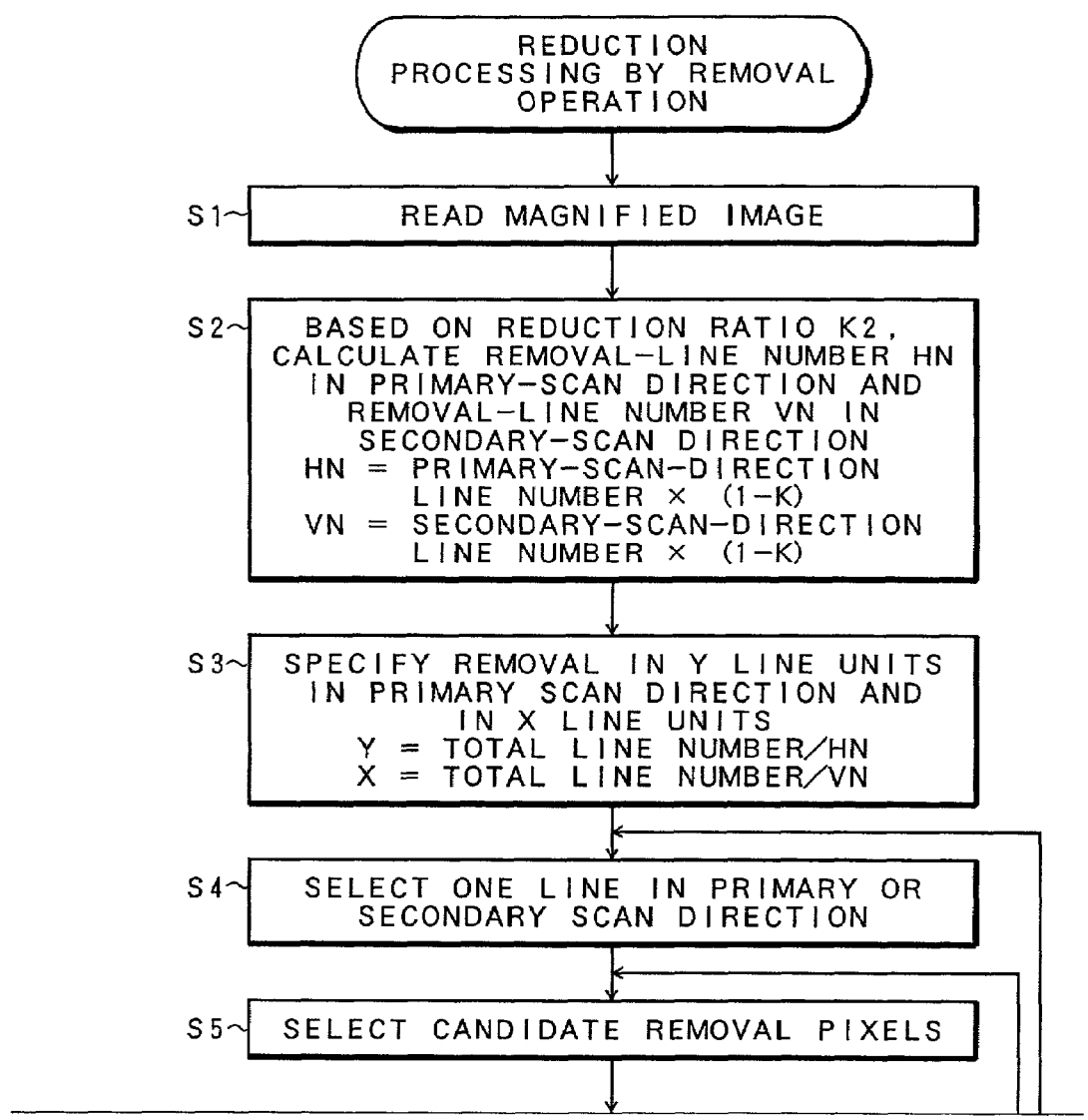

PRINTER AND PRINTING METHOD FOR IMAGE-QUALITY CORRECTION

This application is a continuation of PCT/JP99/05073 filed Sep. 17, 1999

TECHNICAL FIELD

The present invention relates to a printer and a printing method for printing binary black and white pixel data converted from multivalue image data ("image data" hereinbelow may be referred to as "video data") representing combined images of halftone-gradation images (such as photographs), characters, and lines. Particularly, the invention relates to a printer and a printing method for printing black and binary white pixel data after correcting defects such as irregularity and omission in the binary black and white pixel data converted by an error-variance method from multivalue image data.

BACKGROUND ART

Conventionally, there are various types of apparatuses and systems having an image processing mechanism. They include facsimile machines, photocopy reproduction machines, documentation-filing systems, and desk-top publishing systems. These apparatuses and systems perform processing as illustrated in FIG. 1. Images such as photographs, characters, and lines that are recorded on paper-state originals are scanned by a scanner 200, and multivalue image data is thereby generated. A printer 202 performs printing of the data in the following manners. After various types of image processing are performed, the multivalue image data is converted by a binary processor unit 204 into binary black and white pixel data. Then, smoothing processing, for example, image-quality correction, is performed by an image-quality corrector unit 206 of the printer 202; and subsequently, printing thereof is performed by using a printer engine such as a laser-printer mechanism. In the scanner 200, an image sensor, such as a charge-coupled device (CCD), is used to scan the original image. The original image is then converted by a photoelectric converter into an analog signal. Subsequently, processing, for example, white-level control (gain control), shading control, and analog/digital (A/D) conversion are concurrently performed. In addition, correction, for example, MTF (modulus of optical transfer function) correction and gamma correction, are performed to thereby generate multivalue image data that represents pixels each having an 8-bit or greater value level. The multivalue image data thus produced is subjected to binary-coding processing (which hereinbelow will be referred to as binary processing). Thereby, the data is converted into black and white pixel data. The data is then stored in a storage unit, such as a hard disk, and becomes ready for printing upon request. Depending on a request, the data is further processed, and is then printed by the printer 202 according to an area gradation representation method, such as a mesh-point method or a line screen method.

The aforementioned binary processing converts the multivalue image data to black and white pixels in units of a pixel. One of most frequently used binary processing methods is a simple binary processing method. The simple binary processing method converts multivalue image data into white pixels and black pixels on a specific slice level determined corresponding to tones of output images. The simple binary processing method has a function to produce results without causing a problem in regard to the resolution of images such as line images or characters that are clearly defined for black and white colors. However, the method has the problem of not being able to reproduce gradations of halftone images, such as photographs. For this reason, a dither method is instead employed for binary processing to comply with requirements for reproductivity of halftone images, such as photographs. In a dither method, for example, a matrix in the square size of 16×16 pixels corresponding to the primitive pixels is prepared to perform the representation of 256 gradations, and area gradation representation is performed to cause a black and white area to vary spirally from the center corresponding to the gradient values of 0 to 256. However, in the dither method, since the number of gradations is determined according to the size of a matrix, a problem is arisen in that the resolution of a high-contrast line or character image is reduced. In addition, for example, a matrix in the square size of 16×16 pixels is required to obtain 256 gradations. In this case, patchy characters are printed in a normal print mode. In addition, with a matrix of which the size is reduced, gradient characteristics sharply vary to develop defects such as pseudoprofiles, thereby reducing the print quality level.

Other methods conventionally used for reproducing halftone images include matrix area gradation representation methods, such as the aforementioned mesh-point method and line screen method. In the mesh-point method, the sizes of points in a mesh having a predetermined matrix size are controlled to vary corresponding to gradient values. In line screen method, the number of lines in a screen having a predetermined matrix screen is controlled to vary corresponding to gradient values. In these area gradation representation methods, the number of representable gradations is determined by the multiplication product of the number of gradations in a pixel and the matrix size. Therefore, in a printing mechanism such as an electrophotographic printing mechanism in a laser printer, since the pixel size is small, the number of gradations in a pixel is restricted. To avoid the restriction, the matrix size must be large relative to the basic pixel size. However, this arises the problem of reducing the resolution of the print portions of line images and characters. As described above, in the area gradation representation methods, the number of gradations in one pixel greatly depends on the basic pixel size; in proportion to the increase in the resolution, the difficulty increases in the representation of the number of intrapixel gradations through a practically-used printer. For example, the basic pixel size in diameter is 0.042 mm at a basic pixel resolution of 600 dpi. In this case, since the sizes equal to or smaller than toner diameters in a range of 0.006 to 0.010 mm that are used in electrophotography cannot be represented, the greatest representable number of gradations in a pixel is only about 64. In addition, in the high-resolution mesh-point method and line screen method, a load of an image-processing controller unit is increased through processing such as transfer, rotation, compression, and expansion of multivalue image data.

An error-variance method is known as a method that solves the problems that can be caused in the binary processing of the aforementioned multivalue image data, which represents combined images of halftone images (such as photographs) and character and line images. This method is characterized in that the halftone-gradation reproductivity is high, and the reduction in the resolution of portions of line images and character image is relatively low. In addition, in the error-variance method, when multivalue image data does not reach a predetermined slice level, error gradation components are distributed to peripheral pixels according to a variance matrix, and gradations are represented overall in a pseudo-manner. In the error-variance method, high-contrast images such as character images and line images reach a predetermined slice level and are thereby binary-coded. Therefore, the reduction level in resolution is relatively low. However, in binary processing according to the above-described conventional error-variance method, error variance is also performed for profile portions of high-contrast line images and character images. Therefore, in the binary processing of gray-scale fields in the profile portions to which quantization errors are distributed, irregularities are generated in border fields between black and white lines. For specific reference, in binary processing of the gray-scale fields of vertical lines in FIG. 2A and horizontal lines in FIG. 2B, irregularities are generated therebetween. In addition, for thin lines and low-density color lines, since MTF of multivalue image data is low. Therefore, as in the cases of a vertical line in FIG. 3A, a horizontal line in FIG. 3B, and a slanting line in FIG. 3C, defects are caused such that the lines are patchy and discontinuous.

In recent years, as the image-quality corrector unit 206 provided in the printer 202 in FIG. 1, a smoothing mechanism is included to implement the representation of smoothed lines. To avoid the defects, such as irregularities and patchiness, caused in binary black and white pixel data through the error-variance method, it is conceivable that the smoothing mechanism included in the printer is used to implement the representation of smoothed lines. Regarding individual pixels in a binary black and white image as shown in FIG. 4A, the smoothing mechanism precisely controls black and white positions and pixel sizes according to the configuration of peripheral pixels, as shown in FIG. 4B. Thereby, the smoothing mechanism removes jaggy portions caused in slanting lines and characters in profile portions at a resolution of a basic pixel size of a printer. However, the smoothing processing is not effective in the correction of irregularities and patchiness in black and white pixel data binary-coded by the error-variance method. Therefore, the image quality is not improved thereby. In this case, the smoothing processing gives adverse effects. According to the smoothing processing, also for halftone images as in the cases of lines and characters, black and white positions and pixel sizes are precisely controlled according to a peripheral-pixel configuration. As a result, the smoothing processing causes problems in that gradient characteristics are impaired; and reversed gradation, pseudo profiles, and linear and streaky images are generated in halftone images, thereby significantly degrading the image quality level.

Hereinbelow, a description will be made regarding a case in which the error-variance method is used to perform binary processing of a highlight gray image, that is, a high-lightness gray halftone image. In this case, even when an original image has uniformed lightness, error components need to be stored until black pixels are generated through binary processing. As a result, as shown in FIG. 5A, inter-black-pixel intervals are increased. On the other hand, as shown in FIG. 5B, in a gray field where inter-black-pixel intervals are short, the inter-black-pixel intervals are ranged from about 0.04 to 0.08 mm, which are relatively short. Therefore, when the print image is visually observed, individual black pixels cannot be easily identified. That is, as the overall black pixels, gray gradations and resolutions can be secured. However, in a gray field in a highlight portion, as shown in FIG. 5A, inter-black-pixel intervals are increased. Therefore, the individual black pixels can easily be identified in observation through the human eye, and the black pixels are not recognized overall as a gray-scale image. In addition, the density of gray in the highlight portion cannot be easily recognized. That is, the image is recognized to be an image different from the original image.

In the case shown in FIG. 1, scanning is performed by the scanner 200 for the image including photographs, characters, lines, and the like to thereby generate the multivalue image data. In the read (scan) stage, the original image size is required to change corresponding to user-specified scale factors. Therefore, an image-scale varying mechanism is indispensable.

Similarly to an analog photocopy reproducing machine, the image-scale varying mechanism includes a mechanism in which a lens optical system that allows the scale factor of its own to be variable. However, the mechanism is expensive, requires a high cost in precision adjustment and the like. Therefore, in many cases, an electronic image-scale varying mechanism is employed.

A representative example of the scale-varying mechanism is of a coordinate conversion method. The coordinate conversion method converts multivalue levels of all pixels into those corresponding to absolute distances of logical pixel positions. The conversion is performed on planes in a primary scan direction and a secondary scan direction corresponding to scale factors. The method is excellent at gradation reproductivity. However, the method has disadvantages in that processing is significantly complicated, and the resolution is significantly reduced when a document, such as an office document, having containing high-contrast images is processed.

A pixel-removal method (which hereinbelow may be simply referred to as a "removal method") is used most popularly in recent years. In this method, a multivalue image signal is once subjected to interpolation processing in a primary scan direction and a secondary scan direction to thereby increase the size of an image up to a size of the image represented by a required number of pixels, and thereafter, the image size is reduced by pixel-removal to a required size. In this method, pixels to be removed are either determined from a fixed pattern based on a scale-reduction factor (which hereinbelow will simply be referred to as a "reduction factor"), or are determined from reduction factors through calculation.

At this time, pixels are removed in units of a line in the primary scan direction and the secondary scan direction. Therefore, for an image of a character, a slanting line, or the like, image defects, such as streaky indented portions and aberrant portions, and the like become conspicuous. An additional disadvantage is that one thin line to be represented can be omitted because of the line-unit removal, and there may even be a terrible case where represented characters cannot be readable. In this connection, there has been proposed a method for removing pixels at random. Also in this case, however, patchiness in thin lines and irregularities caused by flickered lines appear noticeably on an output image. In addition, to prevent the omission of thin lines, there has been proposed a method for determining removal pixels either after binary processing or according to peripheral-pixel patterns created using values binary-coded with dummy values.

DISCLOSURE OF THE INVENTION (Smoothing Processing)

According to the present invention, a printer is provided that performs printing after appropriately correcting irregularities, thin-line patchiness, and isolated pixels that are specific to black and white pixel data generated through binary processing (binary coding) according to an error-variance method and that are caused in border areas in line and character portions.

According to a first aspect of the invention, there is provided a printer for performing correction to improve the quality of images represented by input binary black and for printing the images, comprising an image-quality corrector unit for detecting irregular patterns that are represented by data included in the input black and white pixel data and that are specific to an error-variance method. The image-quality corrector unit detects at least one type of the following irregular patterns to thereby perform smoothing processing therefor:

I) Substantially vertical vertical-line irregular patterns;
II) Substantially horizontal horizontal-line irregular patterns, and thin-line patchy patterns; and
III) Thin-line patchy patterns.

According to the smoothing processing, occurrence of blurred portions in profile portions, such as line and character portions, can be prevented. In addition, thin-line patchiness is corrected. Therefore, the quality of printed images can be improved. For black and white pixel data representing halftone images, such as photographs, since they are not applicable to the irregular patterns to be smoothed, reduction in the quality level according to smoothing processing performed for halftone portions can be prevented.

The image-quality corrector unit sequentially inputs the black and white pixel data representing groups of an attention pixel and a plurality of peripheral pixels, and performs comparison of the input data to the irregular patterns registered. When pattern-matching is detected, the image-quality corrector unit performs area gradation correction for converting an area at a predetermined position in an n-divisional pixel (n=natural number) of the attention pixel and a predetermined number of intrapixel divisional areas to black areas.

In addition, a printer of the invention comprises an image-quality corrector unit (third image-quality corrector unit) for detecting isolated pixels that are represented by data included in the input black and white pixel data and for distributing the detected isolated pixel to peripheral pixels to thereby reduce the pixel size. The image-quality corrector unit for handling the isolated pixels has a plurality of matrixes having different sizes, uses the matrix patterns in the order of larger sizes to detect isolated pixels, and performs distribution of the isolated pixels to peripheral pixels according to the sizes of the matrix patterns used to detect the isolated pixels. For example, the image-quality corrector unit uses the matrixes in the order of a 5×5-pixel matrix, a 4×4-pixel matrix, and a 3×3-pixel matrix. The image-quality corrector unit allows the number of distributed peripheral pixels to be increased in proportion to the increase in the size of the matrix pattern used to detect an isolated pixel, and concurrently, allows the size of a reduced distribution pixel to be reduced in inverse proportion thereto. In addition, the third image-quality corrector unit uniformly distributes reduced pixels obtained through reduction in the size of the detected isolated pixel to peripheral pixels in a plurality of directions. According to the provision of the image-quality corrector unit for handling the isolated pixels, smoothing processing is performed to reduce the sizes of isolated pixels caused by the error-variance method in light-gray areas and highlight portions and to distribute fragments to peripheral pixels. Since finely reduced fragments of black pixels are distributed to peripheral pixels, when the overall black pixels are viewed, an appropriate grayscale gradation can be recognized. That is, reproduction can be implemented for densities of near-original-image light-gray areas and highlight portions.

According to another aspect of the present invention, there is provided a printer for performing correction to improve the quality of images represented by input binary black and for printing the images, comprising a first image-quality corrector unit for detecting first irregular patterns that are represented by data included in the black and white pixel data and that are specific to binary processing (binary coding) according to a method other than an error-variance method to thereby smooth the detected first irregular patterns; a second image-quality corrector unit for detecting of second irregular patterns that are represented by data included in the input black and white pixel data and that are specific to an error-variance method, wherein the image-quality corrector unit detects at least one type of substantially vertical vertical-line irregular patterns, substantially horizontal horizontal-line irregular patterns, and thin-line patchy patterns to thereby smooth the detected second irregular patterns; and a controller unit for operating such that the black and white pixel data input to the first image-quality corrector unit is input to the second image-quality corrector unit to be processed thereby when the black and white pixel data does not match one of the first irregularity detection patterns, and the first image-quality corrector unit is used to process the input black and white pixel data by interrupting processing being performed by the second image-quality corrector unit when the black and white pixel data matches one of the first irregularity detection patterns. In this case, the second image-quality corrector unit for detecting of irregular patterns that are represented by data included in the input black and white pixel data and that are specific to an error-variance method. The image-quality corrector unit detects at least one type of substantially vertical vertical-line irregular patterns (caused in profiles of lines, characters, and the like), substantially horizontal horizontal-line irregular patterns (caused in profiles of lines, characters, and the like), and thin-line patchy patterns to thereby smooth the detected second irregular patterns. In addition, regarding irregularities represented by black and white pixel data binary-coded according to, for example, a simple binary processing method or a dither method, the first image-quality corrector unit detects the irregularities and smooth them. Therefore, even when no data on the binary-processing type is provided as control information, determination can be automatically made from the black and white pixel data whether the binary data has been generated by the error-variance method or a different method. This allows smoothing processing to be performed for specific patterns corresponding to the type of an employed binary-processing method. That is, as described above, the smoothing processing is performed when the first image-quality corrector unit performs the pattern-detecting processing for black and white pixel data generated according to a method other than the error-variance method, and detects that the input pattern does not match one of the first irregularity detection patterns. On the other hand, when the first image-quality corrector unit detects that the input pattern match one the first irregularity detection patterns, interruption is controlled to occur in processing being executed in the second image-quality corrector unit provided to handle black and white pixel data generated through binary processing according to the error-variance method. This algorithm prevents the image quality level from being degraded because of overcorrection that can be performed for the black and white pixel data generated according to the method such as the simple binary processing method and the dither method. The first image-quality corrector unit and the second image-quality corrector unit sequentially input the black and white pixel data representing groups of an attention pixel and a plurality of peripheral pixels, and compares the input data to the first irregular patterns and the second irregularity detection patterns. As a result, when pattern-matching is detected, the first image-quality corrector unit and the second image-quality corrector unit perform area gradation correction for converting an area at a predetermined position in an n-divisional pixel (n=natural number) of the attention pixel and a predetermined number of intrapixel divisional areas to black areas.

Furthermore, according to the above aspect of the invention, in addition to the first and second image-quality corrector units, a third image-quality corrector unit is provided. The third image-quality corrector unit detects isolated pixels that are represented by data included in the input black and white pixel data and for distributing the detected isolated pixel to peripheral pixels to thereby reduce the pixel size. Similarly to the case where the third image-quality corrector unit is independently provided, it comprises a plurality of matrix patterns having different sizes, uses the matrix patterns in the order of larger sizes to detect isolated pixels, and distributes the isolated pixels to peripheral pixels according to the sizes of the matrix patterns used to detect the isolated pixels. For example, the image-quality corrector unit uses the matrixes in the order of a 5×5-pixel matrix, a 4×4-pixel matrix, and a 3×3-pixel matrix. The image-quality corrector unit allows the number of distributed peripheral pixels to be increased in proportion to the increase in the size of the matrix pattern used to detect an isolated pixel, and concurrently, allows the size of a reduced distribution pixel to be reduced in inverse proportion thereto. In addition, the third image-quality corrector unit uniformly distributes reduced pixels obtained through reduction in the size of the detected isolated pixel to peripheral pixels in a plurality of directions. With the third image-quality corrector unit being provided, the black and white pixel data input to the first image-quality corrector unit is input to the second image-quality corrector unit and subsequently to the third image-quality corrector unit to be processed thereby when the black and white pixel data does not match one of the first irregularity detection patterns. According to the provision of the third image-quality corrector unit, smoothing processing is performed to reduce the sizes of isolated pixels caused by the error-variance method in light-gray areas and highlight portions and to distribute fragments to peripheral pixels. Since finely reduced fragments of black pixels are distributed to peripheral pixels, when the overall black pixels are viewed, an appropriate grayscale gradation can be recognized. That is, reproduction can be implemented for densities of near-original-image light-gray areas and highlight portions. Furthermore, the first image-quality corrector unit is used to process the input black and white pixel data by interrupting processing being performed by the second image-quality corrector unit and processing being processed by the third image-quality corrector unit when the black and white pixel data matches one of the first irregularity detection patterns.

According to still another aspect of the invention, a printer may be configured to include a first image-quality corrector unit, a third image-quality corrector unit, and a controller unit. Specifically, the first image-quality corrector unit detects first irregular patterns that are represented by data included in the black and white pixel data and that are specific to a method other than an error-variance method to thereby smooth the detected first irregular patterns. The third image-quality corrector unit detects isolated pixels that are represented by data included in the input black and white pixel data, and distributes the detected isolated pixel to peripheral pixels to thereby reduce the pixel size. Furthermore, the controller unit operates such that the black and white pixel data input to the first image-quality corrector unit is input to the third image-quality corrector unit to be processed thereby when the black and white pixel data does not match one of the first irregularity detection patterns, and the first image-quality corrector unit is used to process the input black and white pixel data by interrupting processing being performed by the third image-quality corrector unit when the black and white pixel data matches one of the first irregularity detection patterns. In this configuration, for the black and white pixel data generated through binary processing performed according to the error-variance method, appropriate reproduction can be performed for densities in light gray area caused by the distribution of the isolated pixels according to the reduction in size.

According to still another aspect of the present invention, there is provided a printing method for performing correction to improve the quality of images represented by input binary black and for printing the images. The printing method performs printing after correcting defects contained in input binary black and white pixel data. In this printing method, detection is performed for second irregular patterns that are represented by data included in the input black and white pixel data and that are specific to an error-variance method such that detection is performed for at least one type of substantially vertical vertical-line irregular patterns, substantially horizontal horizontal-line irregular patterns, and thin-line patchy patterns to thereby smooth the detected second irregular patterns.

According to still another aspect of the invention, there is provided a printing method for performing correction to improve the quality of images represented by input binary black and for printing the images, wherein detection is performed for isolated pixels that are specific to error-variance method and that are represented by data included in the input black and white pixel data and for distributing the detected isolated pixel to peripheral pixels to thereby reduce the pixel size.

According to still another aspect of the present invention, a printing method comprises the following steps:

a first image-quality correction step for detecting first irregular patterns that are represented by data included in the black and white pixel data and that are specific to binary processing (binary coding) according to a method other than an error-variance method to thereby smooth the detected first irregular patterns;

a second image-quality correction step for detecting second irregular patterns that are represented by data included in the input black and white pixel data and that are specific to an error-variance method, wherein the image-quality correction step detects at least one type of substantially vertical vertical-line irregular patterns, substantially horizontal horizontal-line irregular patterns, and thin-line patchy patterns to thereby smooth the detected second irregular patterns; and a control step for operating such that the black and white pixel data input to the first image-quality correction step is input to the second image-quality correction step to be processed thereby when the black and white pixel data does not match one of the first irregularity detection patterns, and the first image-quality correction step is used to process the input black and white pixel data by interrupting processing being performed in the second image-quality correction step when the black and white pixel data matches one of the first irregularity detection patterns.

According to still another aspect of the present invention, a printing method comprises:

a first image-quality correction step for detecting first irregular patterns that are represented by data included in the black and white pixel data and that are specific to a method other than an error-variance method to thereby smooth the detected first irregular patterns;

a second image-quality correction step for detecting second irregular patterns that are represented by data included in the input black and white pixel data and that are specific to an error-variance method, wherein the image-quality correction step detects at least one type of substantially vertical vertical-line irregular patterns, substantially horizontal horizontal-line irregular patterns, and thin-line patchy patterns to thereby smooth the detected second irregular patterns;

a third image-quality correction step for detecting isolated pixels that are represented by data included in the input black and white pixel data and for distributing the detected isolated pixel to peripheral pixels to thereby reduce the pixel size; and a control step for operating such that the black and white pixel data input to the first image-quality correction step is input to the third image-quality correction step to be processed therein when the black and white pixel data does not match one of the first irregularity detection patterns, and the first image-quality correction step is used to process the input black and white pixel data by interrupting processing being performed in the second image-quality correction step and the third image-quality correction step when the black and white pixel data matches one of the first irregularity detection patterns.

In addition, according to still another aspect of the invention, a printing method comprises the following steps:

an image-quality correction step for detecting irregular patterns that are represented by data included in the black and white pixel data and that are specific to a method other than an error-variance method to thereby smooth the detected irregular patterns;

a pixel-distribution step for detecting isolated pixels that are represented by data included in the input black and white pixel data and for distributing the detected isolated pixel to peripheral pixels to thereby reduce the pixel size; and a control step for operating such that the black and white pixel data input to the image-quality correction step is input to the pixel-distribution step to be processed therein when the black and white pixel data does not match one of the first irregularity detection patterns, and the image-quality correction step is used to process the input black and white pixel data by interrupting processing being performed in the pixel-distribution step when the black and white pixel data matches one of the first irregularity detection patterns.

Basically, the printing methods correspond in detailed to the configurations of the printers.

(Image-Size Variation through Pixel-Removal Processing)

According to still another aspect of the present invention, there is provided a printer configured such that, when an image size is varied through pixel-removal processing, the level of the variation in gradation with respect to peripheral pixels is detected to thereby prevent omission of thin lines and white-void lines, which can be caused through the pixel-removal processing.

In addition, the invention provides a printer for performing correction to improve the quality of images represented by input binary black and for printing the images, comprising a scale-varying processor unit for varying the size of an original image optically scanned to a predetermined image size by performing pixel-removal processing; a binary unit for converting the size-varied image into black and white pixel data according to an error-variance method; and an image-quality corrector unit for detecting irregular patterns that are represented by data included in the black and white pixel data and that are specific to an error-variance method to thereby smooth the detected patterns.

The image-quality corrector unit detects at least one of the following types of patterns:

I) Substantially vertical vertical-line irregular patterns caused through the pixel-removal processing;

II) Substantially vertical vertical-edge irregular patterns;

III) Substantially horizontal horizontal-line irregular patterns;

IV) Substantially horizontal horizontal-edge irregular patterns; and

V) Thin-line patchy patterns to thereby smooth the detected patterns.

The scale-varying processor unit magnifies the size of the original image to a predetermined image size according to pixel-interpolation, and then reduces the magnified image size to the predetermined image size by performing the pixel-removal processing.

In addition, the scale-varying processor unit detects a gradient variation of a pixel-removal-candidate attention pixel with respect to peripheral pixels, does not perform pixel-removal processing when the gradient variation is relatively greater, and performs pixel-removal processing when the gradient variations are relatively less. For example, the scale-varying processor unit defines a matrix having a predetermined size for a pixel-removal-candidate attention pixel, calculates the sum of absolute values representing the difference between the pixel-removal-candidate attention pixel and peripheral pixels belonging to the matrix as a gradient variation amount, does not perform the pixel-removal processing when the gradient variation amount is equal to or greater than a predetermined threshold, and performs pixel-removal processing when the gradient variation amount is less than the threshold.

The scale-varying processor unit does not remove a removal-candidate pixel either when the level of the removal-candidate pixel is bright, and the overall tone of peripheral pixels thereof is dark; or when the level of the removal-candidate pixel is dark, and the overall tone of peripheral pixels thereof is bright.

As described above, determination is made from the amount of the gradient variation with respect peripheral pixels whether or not pixels are removed; and when the amount of the gradient variation is relatively greater, the pixel-removal processing is not performed. This prevents thin lines, white-void lines, and the like from being omitted through the pixel-removal processing. In addition, jaggy portions caused through the pixel-removal processing are appropriately corrected through smoothing processing performed prior to the binary processing performed according to the error-variance method.

Furthermore, the image-quality corrector unit inputs the black and white pixel data representing groups of an attention pixel and a plurality of peripheral pixels, and compares the input data to the irregular patterns registered. In this case, when pattern-matching is detected, the image-quality corrector unit performs area gradation correction for converting an area at a predetermined position in an n-divisional pixel (n=natural number) of the attention pixel and a predetermined number of intrapixel divisional areas to black areas.

BRIEF DESCRIPTION OF THE DRAWINGS

FIGS. 10A and 10B are explanatory views showing processing and operations of an error-variance binary unit in a scanner controller unit in FIG. 9;

FIG. 14 is a schematic view of an image-quality controller unit in a printer controller unit shown in FIG. 9;

FIG. 16 is an explanatory view showing a pattern-recognition-window cut-out register shown in FIG. 15;

FIGS. 18A and 18B are flowcharts of the smoothing processing illustrated in FIGS. 17A and 17B;

FIG. 19 is an explanatory view showing storage states of detection patterns used in the first embodiment shown in FIGS. 17A and 17B;

FIG. 20 shows explanatory views of first irregularity detection patterns PAT253 to PAT260 used in the processing shown in FIGS. 17A and 17B for slanting-line irregularity detection, and correction output bit strings;

FIG. 21 shows explanatory views (continued to the views in FIG. 20) of first irregularity detection patterns PAT261 to PAT264 used for slanting-line irregularity detection, and correction output bit strings;

FIG. 25 shows explanatory views (continued to the views in FIG. 24) of first irregularity detection patterns PAT281 to PAT288 used for slanting-line irregularity detection, and correction output bit strings;

FIG. 40 is an explanatory view showing the relationships of three-pattern groups for density preservation regarding the pixel correction values shown in FIGS. 33 and 34;

FIG. 43 shows explanatory views of isolated-pixel-detection patterns PAT1 to PAT6 used in the processing shown in FIGS. 17A and 17B, and correction output bit strings;

Figure 44:
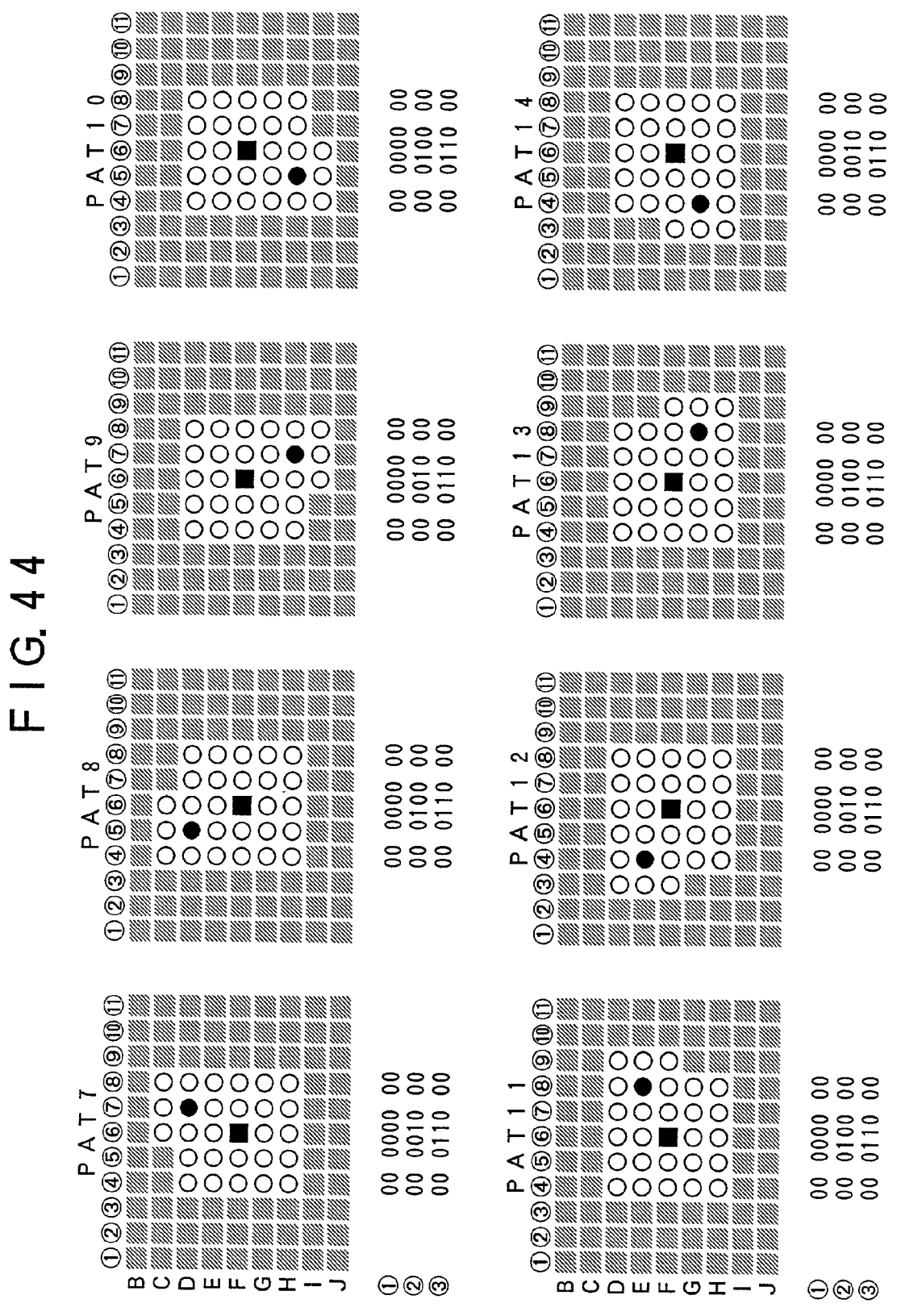

FIG. 44 shows explanatory views (continued to the views in FIG. 43) of isolated-pixel-detection patterns PAT7 to PAT14 and correction output bit strings;

Figure 50:
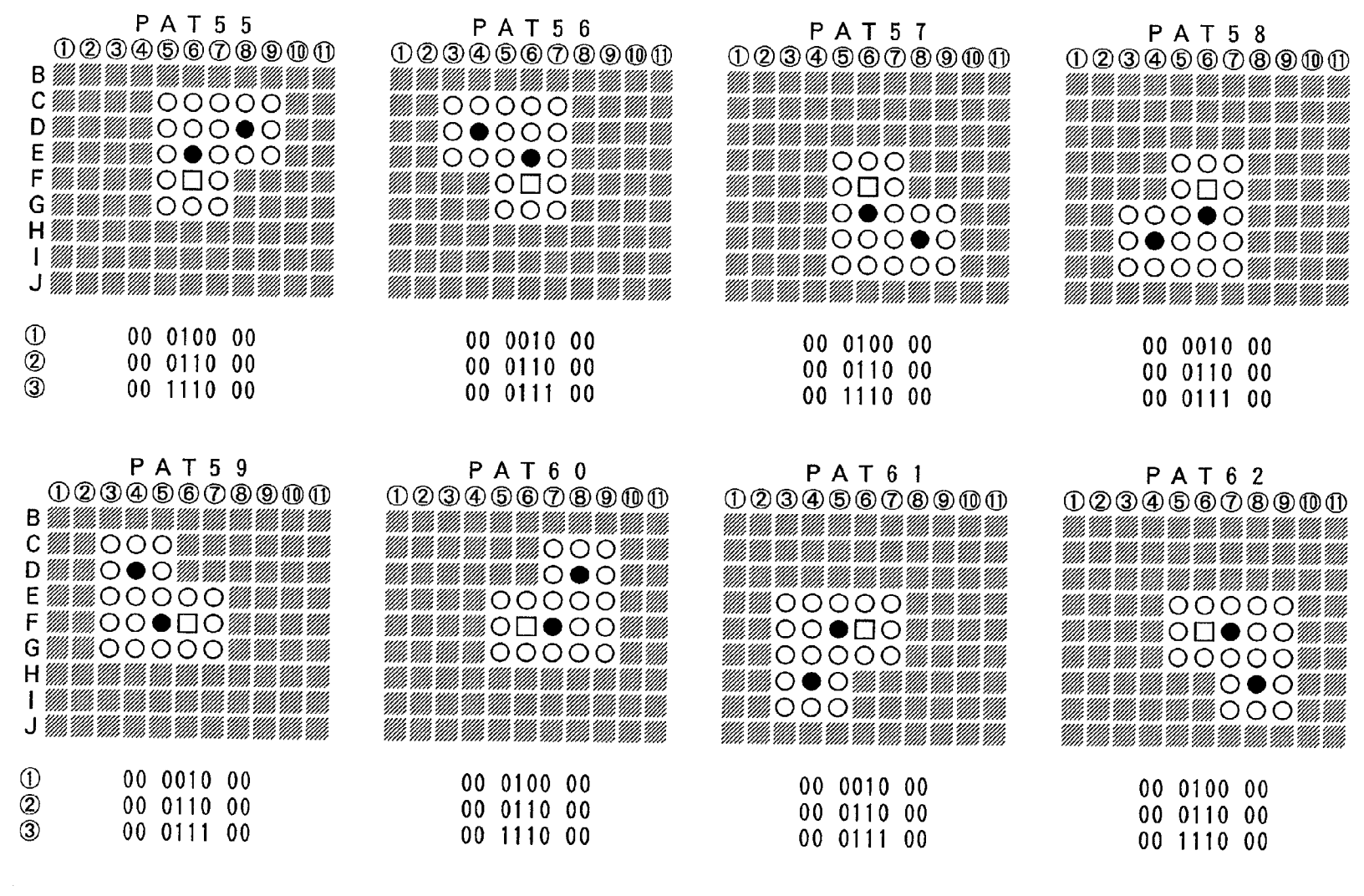

FIG. 50 shows explanatory views (continued to the views in FIG. 49) of isolated-pixel-detection patterns PAT55 to PAT62 and correction output bit strings;

FIG. 51 shows explanatory views (continued to the views in FIG. 50) of isolated-pixel-detection patterns PAT63 to PAT70 and correction output bit strings;

FIG. 54 shows exploded explanatory views of backgrounds in a photograph shown in FIG. 53, in which one of the views was subjected to the smoothing processing of the present invention, and the other one was not subjected thereto;

FIG. 55 shows exploded explanatory views of a character portion in FIG. 53, in which one of the views was subjected to the smoothing processing of the present invention, and the other one was not subjected thereto;

FIG. 56 shows exploded explanatory views of a line portion in FIG. 53, in which one of the views was subjected to the smoothing processing of the present invention, and the other one was not subjected thereto;

FIGS. 65A and 65B are detailed flowcharts of removal (pixel-removal) processing and scale-reduction processing shown in FIG. 63;

BEST MODE FOR CARRYING OUT THE INVENTION (Configuration of Apparatus)

Figure 1:
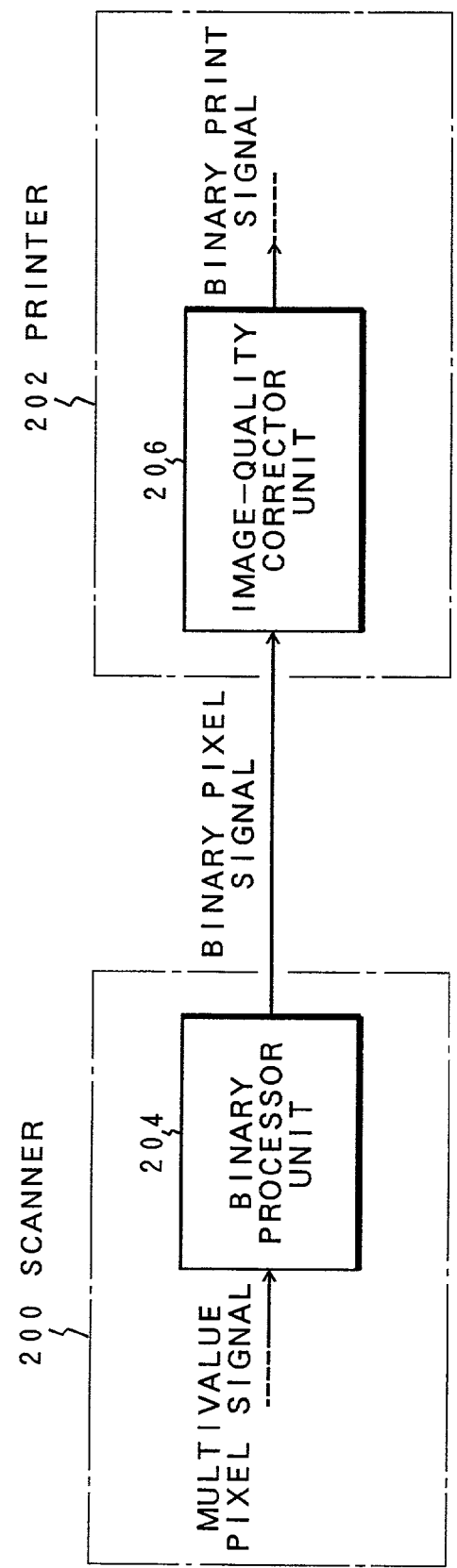
FIG. 1 is a block diagram (schematic view) showing binary processing by a conventional scanner and image-quality correction by a conventional printer.
Figure 2A:
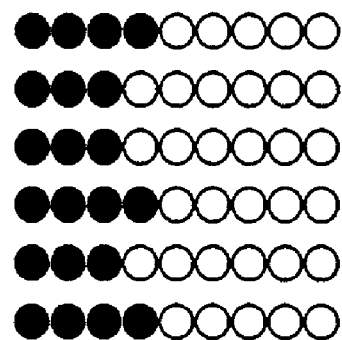
FIGS. 2A and 2B are explanatory views showing vertical-line irregular pixel pattern and a horizontal-line irregular pixel pattern, respectively, when binary processing is performed according to a conventional error-variance method.
Figure 2B:
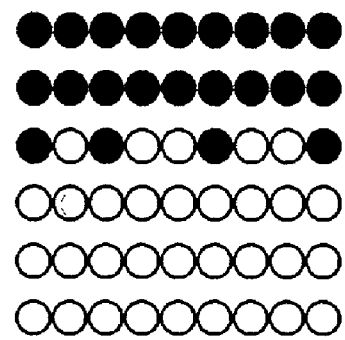
Figure 3A:
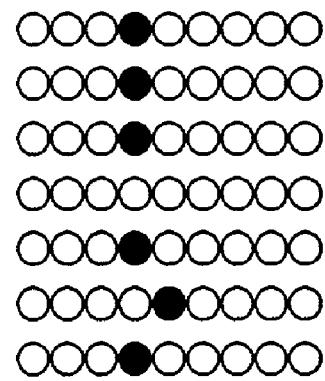
FIGS. 3A to 3C are explanatory views each showing a patchy pattern of a thin line when binary processing is performed according to the conventional error-variance method.
Figure 3B:
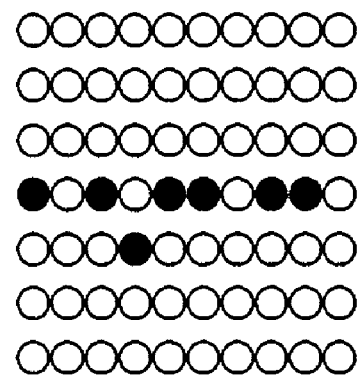
Figure 3C:
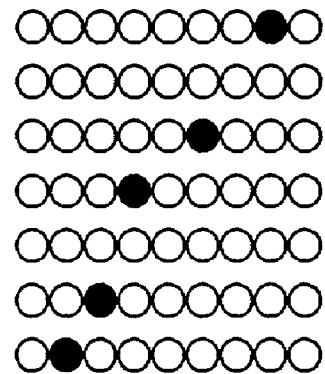
Figure 4A:
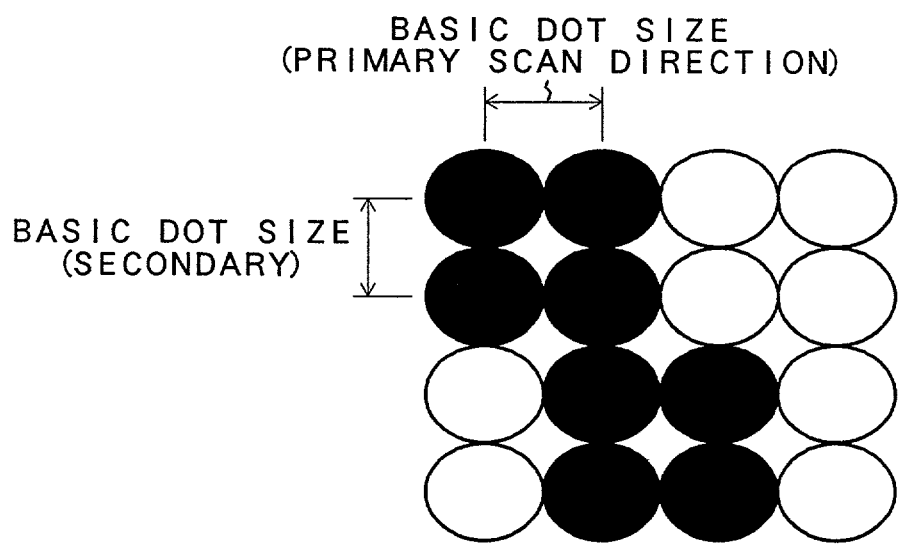
FIGS. 4A and 4B are explanatory each showing smoothing processing performed in the conventional printer.
Figure 4B:
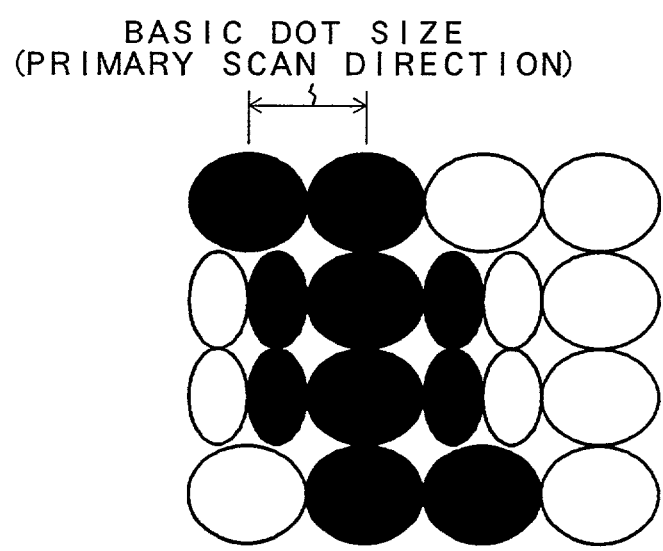
Figure 6:
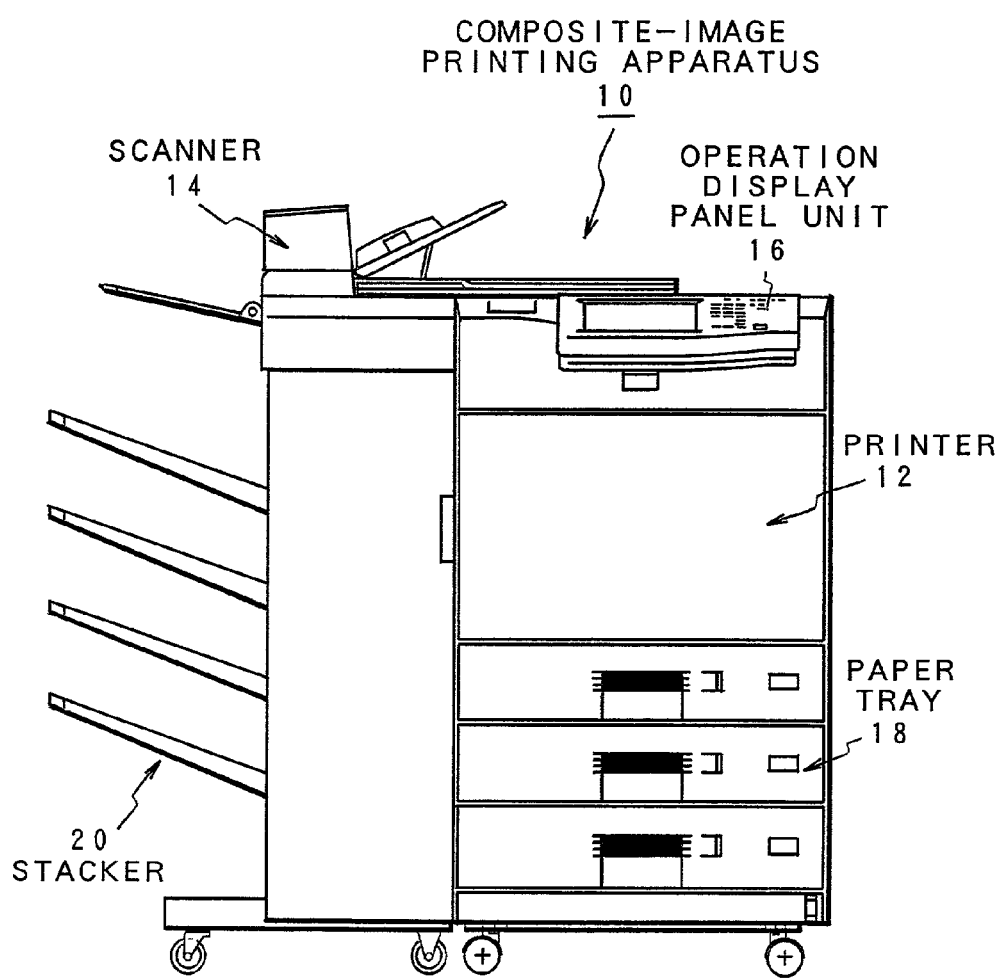
FIG. 6 is a front view of a composite-image printing apparatus to which the present invention is applied.
Figure 7:
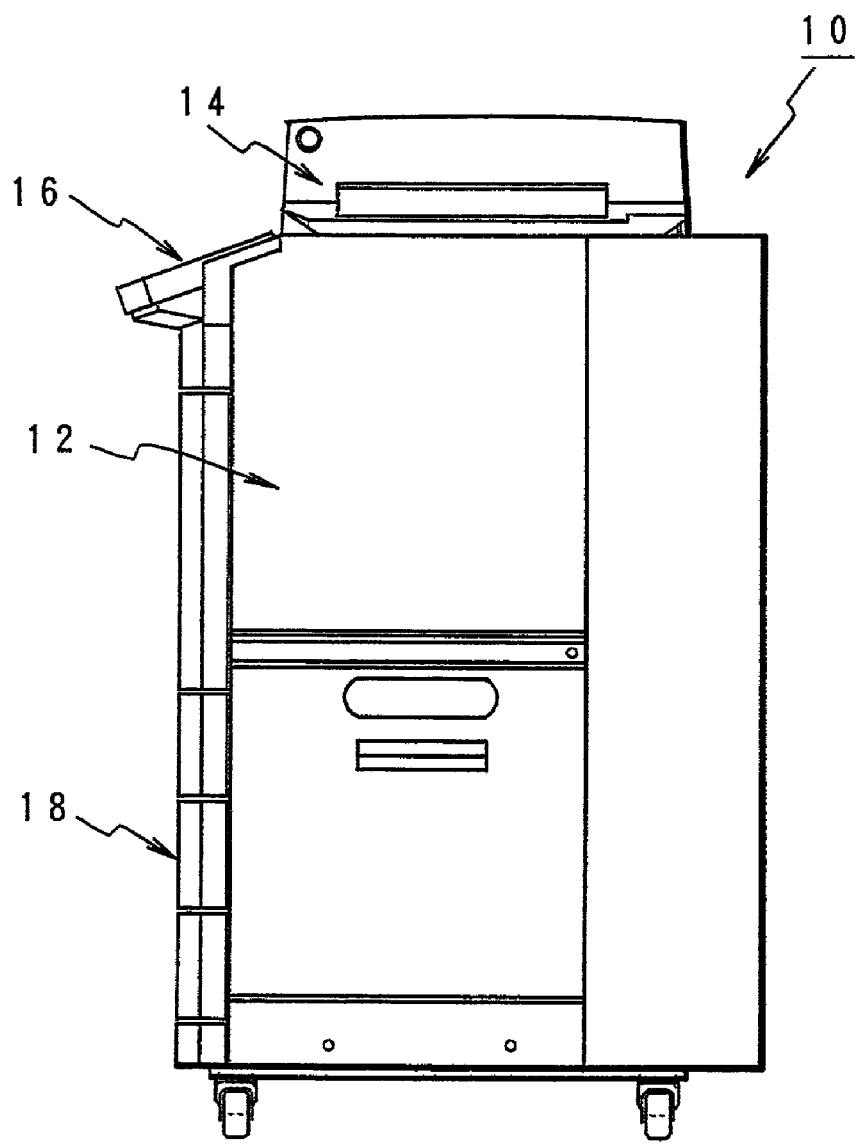
FIG. 7 is a side view of the composite-image printing apparatus in FIG. 6.
Figure 8:
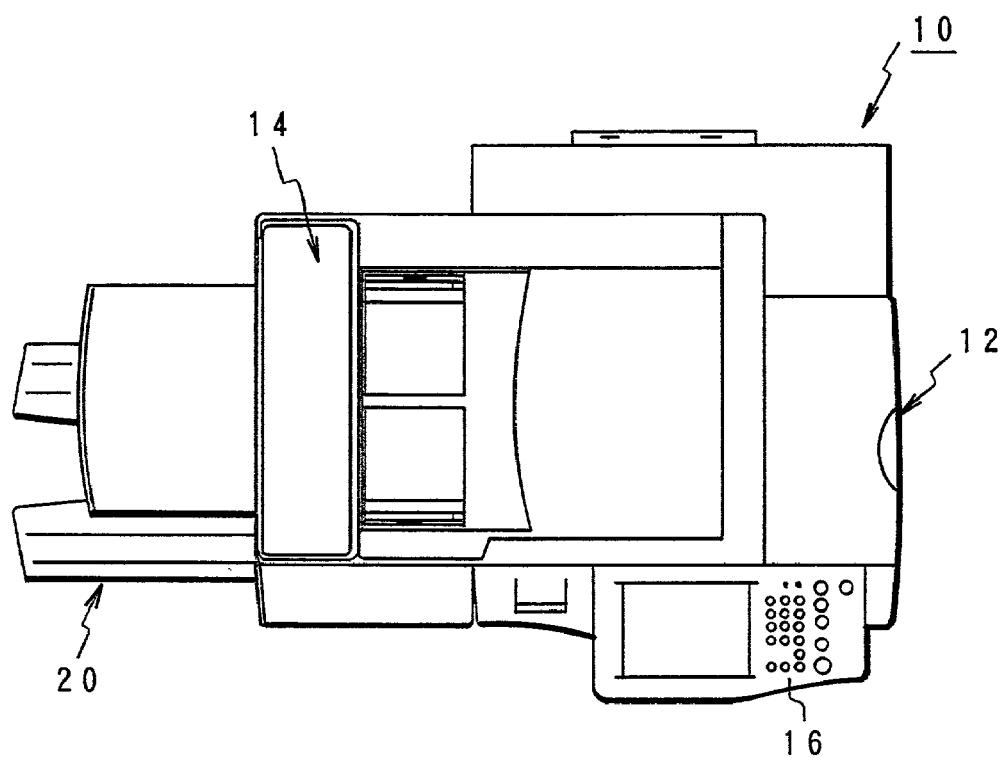
FIG. 8 is a plan view of the composite-image printing apparatus in FIG. 6.

FIG. 6 is a front view of a composite-image printing apparatus 10 to which a printer and a printing method of the present invention are applied. FIG. 7 is a right-side view of the composite-image printing apparatus 10 shown in FIG. 1, and FIG. 8 is a plan view thereof. In FIG. 6, the composite-image printing apparatus 10 is configured to include a printer 12, a scanner 14, an operation display panel unit 16, and a paper-tray section 18 (which hereinbelow will simply be referred to as a "paper tray"). The composite-image printing apparatus 10 is connected to a server (not shown) via a local area network (LAN)(not shown). As described above, client terminals (not shown) are connected via the LAN, and in addition, external client terminals (not shown) are connected to the server via a network, so-called Intranet (not shown). The composite-image printing apparatus 10, which is thus connected to the server via the LAN, includes a photocopy reproduction mechanism (not shown), a documentation registration mechanism (not shown), a facsimile transmission mechanism (not shown), and a documentation-filing mechanism (not shown). In the photocopy reproduction mechanism, an original image is scanned by the scanner 14 in response to a specification operation performed using the operation display panel unit 16, and the scanned image is printed out by the printer 12. In the documentation registration mechanism, documents are scanned by the scanner 14 in cooperation with the server, and concurrently, the scanned documents are registered in folders internally created. In the field of products as the composite-image printing apparatus 10, for example, Fujitsu Limited supplies WSP Series Models 210E/410E.

Figure 9:
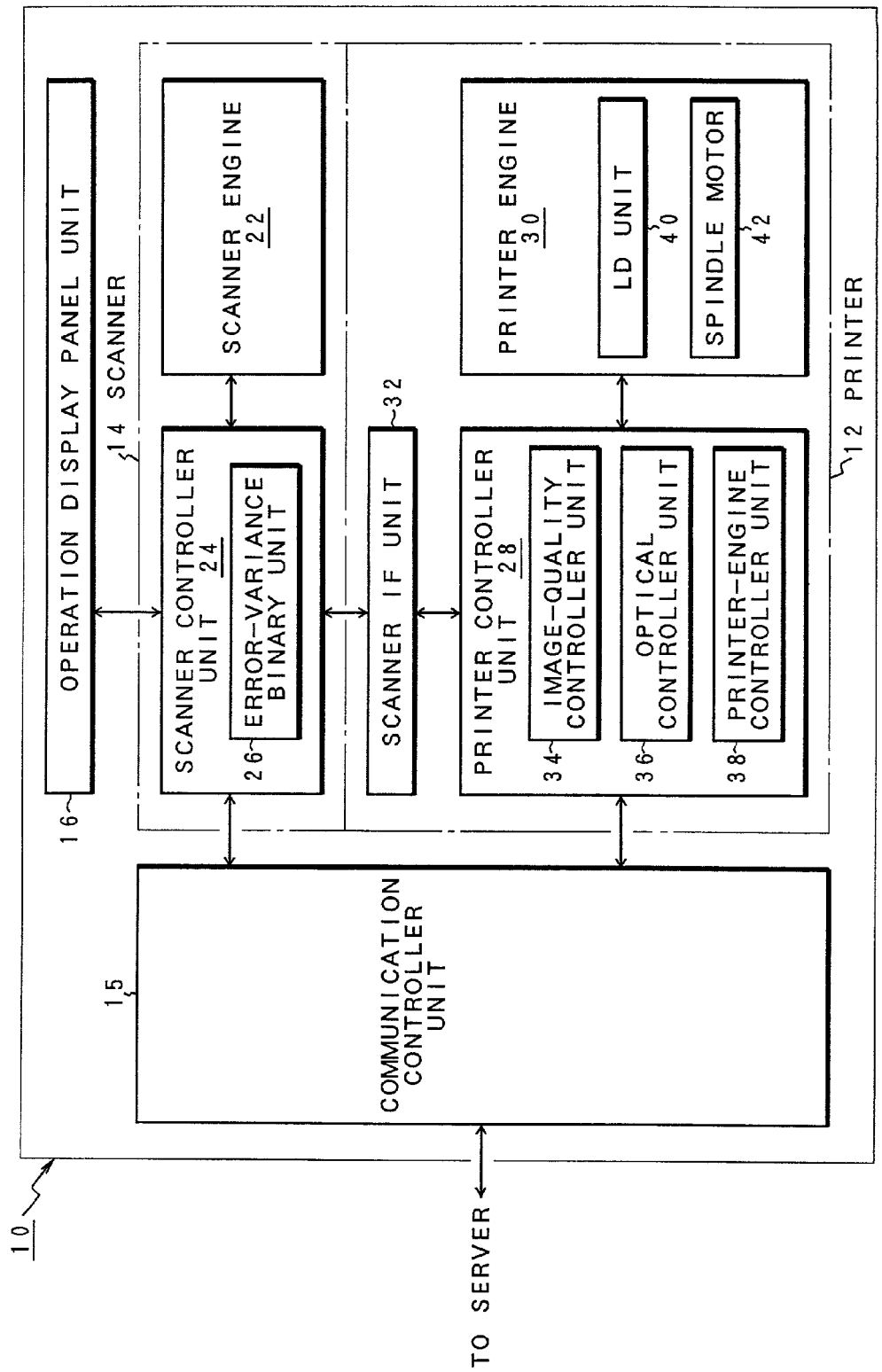
FIG. 9 is a schematic view of an interior configuration of the composite-image printing apparatus in FIG. 6.

FIG. 9 is a schematic view of an interior configuration of the composite-image printing apparatus in FIGS. 6 to 8. The scanner 14 of the composite-image printing apparatus 10 is configured to include a scanner engine 22 and a scanner controller unit 24. The scanner engine 22 optically reads photographs, characters, lines, and the like that are printed on an original sheet, outputs them as multivalue image data to a scanner controller unit 24, performs various types of image conversion processing therefor, and transfers the data to the printer 12 for printing. In this case, the scanner engine 22 converts the multivalue image data through an error-variance binary unit 26 into binary (binary-coded) black and white pixel data, and transfers the converted binary data to the printer 12. Hereinbelow, operation of the scanner 14 will be described. The scanner 14 is configured to include a flat bed and a sheet feeder. The flat bed allows the original sheet to be fixed and allows it to be scanned by a movable sensor unit (not shown). The sheet feeder feeds the original sheet, and concurrently, scans it. When the original sheet is scanned, the sensor is operated in a secondary scan direction in the case where the flat bed operates, and the original sheet is transferred in the secondary scan direction in the case where the sheet feeder operates. Concurrently with the above, the surface of the original sheet is illuminated by an illumination unit (not shown), such as a fluorescent light. Then, using an image sensor (not shown) such as a CCD, reflection light from the surface is read through photoelectric conversion method, and an analog signal is output. The analog signal, which has thus obtained through the reading from the image sensor, is amplified by an amplifier (not shown). The amplified analog signal is then converted by an analog/digital (A/D) converter (not shown) into multivalue image data. Subsequently, the multivalue image data is subjected to white-level correction, shading correction, MTF correction, and gradation correction (gamma correction). Thereafter, the multivalue image data is converted by the error-variance binary unit 26 into black and white pixel data, and the converted data is fed to the printer 12. The printer 12 is configured to include a printer controller unit 28, a printer engine 30, and a scanner IF unit 32. The printer controller unit 28 is configured to include an image-quality controller unit 34, an optical controller unit 36, and a printer-engine controller unit 38. The image-quality controller unit 34 detects vertical and horizontal-line irregularities, and thin-line patchiness in the black and white pixel data that has been converted according to the error variance of the present invention. Then, the image-quality controller unit 34 corrects detected defects.

The printer engine 30 is configured to include a laser diode (LD) unit 40 and a spindle motor 42. The LD unit 40 is used in an exposure unit (not shown) for electrophotographic printing. The spindle motor 42 drives, for example, photosensitive drums in an electrophotographic photography mechanism (not shown). In addition to the operations described above, the scanner 14 and the printer 12 handle communication through a communication controller unit 15 with the server connected to a network, for example, the aforementioned LAN. Data to be printed by the printer 12 includes binary data received through a facsimile machine and binary file data for printing. The binary data received through the facsimile machine is fed from the server via the communication controller unit 15. The binary file data for printing is transferred from a personal computer, such as a client terminal. The resolutions of the various types of binary data are, for example, as follows: 400 dpi for binary data from the scanner 14; 200 dpi for facsimile binary data from the communication controller unit 15; and 300 dpi for binary file data obtained through the communication controller unit 15. For the resolution of data to be processed by the printer 12, one of the resolutions of 600 dpi and 1200 dpi can be selected.

Hereinbelow, referring to FIGS. 10A and 10B, a description will be made regarding binary processing by the error-variance binary unit 26 provided in the scanner controller unit 24 shown in FIG. 9. As shown in FIGS. 10A and 10B, the error-variance binary unit 26 is configured to include a data line memory 50, a binary unit 52, a binary data output unit 54, an error operation unit 55, an error-distribution-value operation unit 56, an error-adder unit 58, and an error-distribution (variance) matrix 60. The data line memory 50 has an area of 5×3 pixels ((5 pixels in the primary scan direction)×(3 pixels in the primary scan direction)). When an n-th pixel at in an m-th line is represented by an attention pixel $D_{m,n}$, the 5×3-pixel area stores twelve pieces of multivalue image data $D_{m,n+1}$ to $D_{m+2,n+2}$ that follow. The binary unit 52 inputs the attention pixel $D_{m,n}$, converts it into binary data at a predetermined slice level, and outputs binary data $O_{m,n}$. When the input does not reach the predetermined slice level in the binary unit 52, an error $E_{m,n}$ is obtained in the error operation unit 55, and is input to the error-distribution-value operation 56. In the error-distribution-value operation unit 56, a distribution (error-variance) value is obtained through the multiplication of the error $E_{m,n}$ and a weighting coefficient $K_{i,j}$ set to the error-distribution matrix 60. In the error-adder unit 58, an individual distribution value obtained through the calculation serially added to a multivalue level of an individual pixel other than attention pixels stored in the data line memory 50. The calculation operation regarding the error variance is represented by the following general expression:

$$D_{m,n+1} = D_{m,n+1} + E_{m,n} \times K_{i,j}$$

Figure 5A:
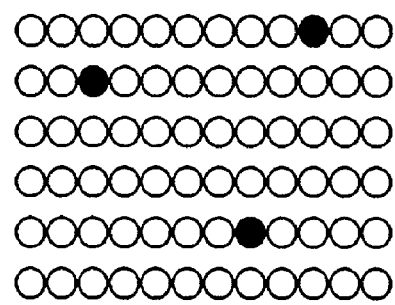
FIGS. 5A and 5B are explanatory views each showing a gray-field pixel pattern when binary processing is performed according to the conventional error-variance method.
Figure 5B:
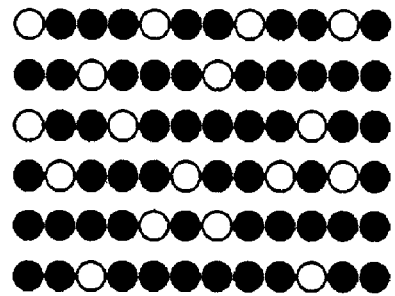
Figure 11A:
FIGS. 11A to 11C are explanatory views showing a gray-field original image, a multivalue density, and binary black and white pixels, respectively, according to an error-variance method illustrated in FIGS. 10A and 10B.
Figure 11B:
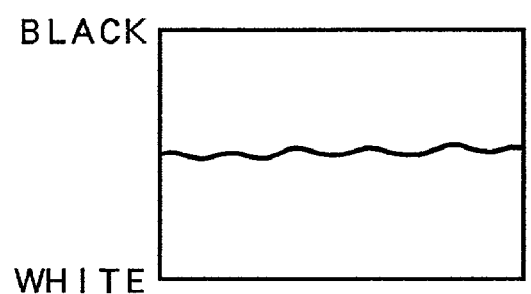
Figure 11C:
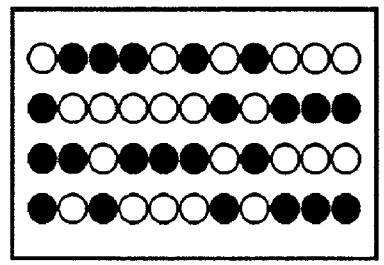
Figure 12A:
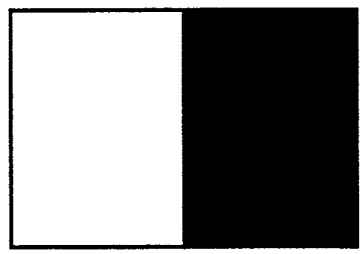
FIGS. 12A to 12C are explanatory views showing a black-and-white border original image, a multivalue density, and binary black and white pixels, respectively, according to the error-variance method illustrated in FIGS. 10A and 10B.
Figure 12B:
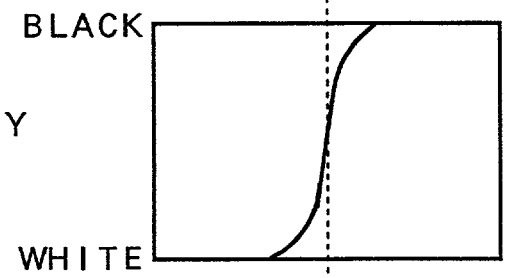
Figure 12C:
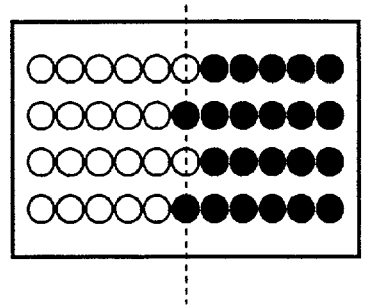
Figure 13A:
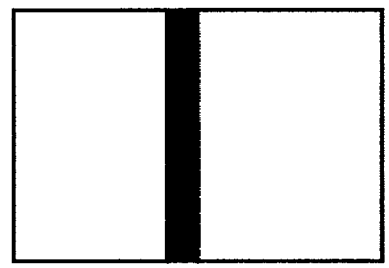
FIGS. 13A to 13C are explanatory views showing a thin-line original image, a multivalue density, and binary black and white pixels, respectively, according to the error-variance method illustrated in FIGS. 10A and 10B.
Figure 13B:
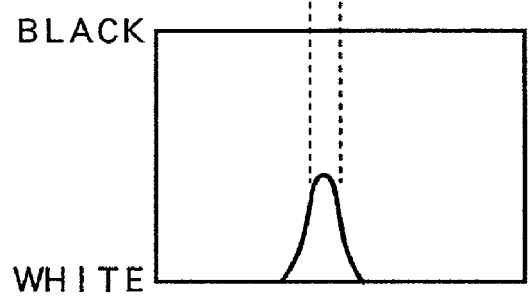
Figure 13C:
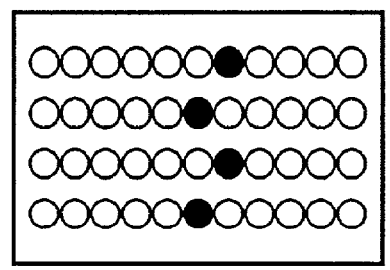
Figure 5:
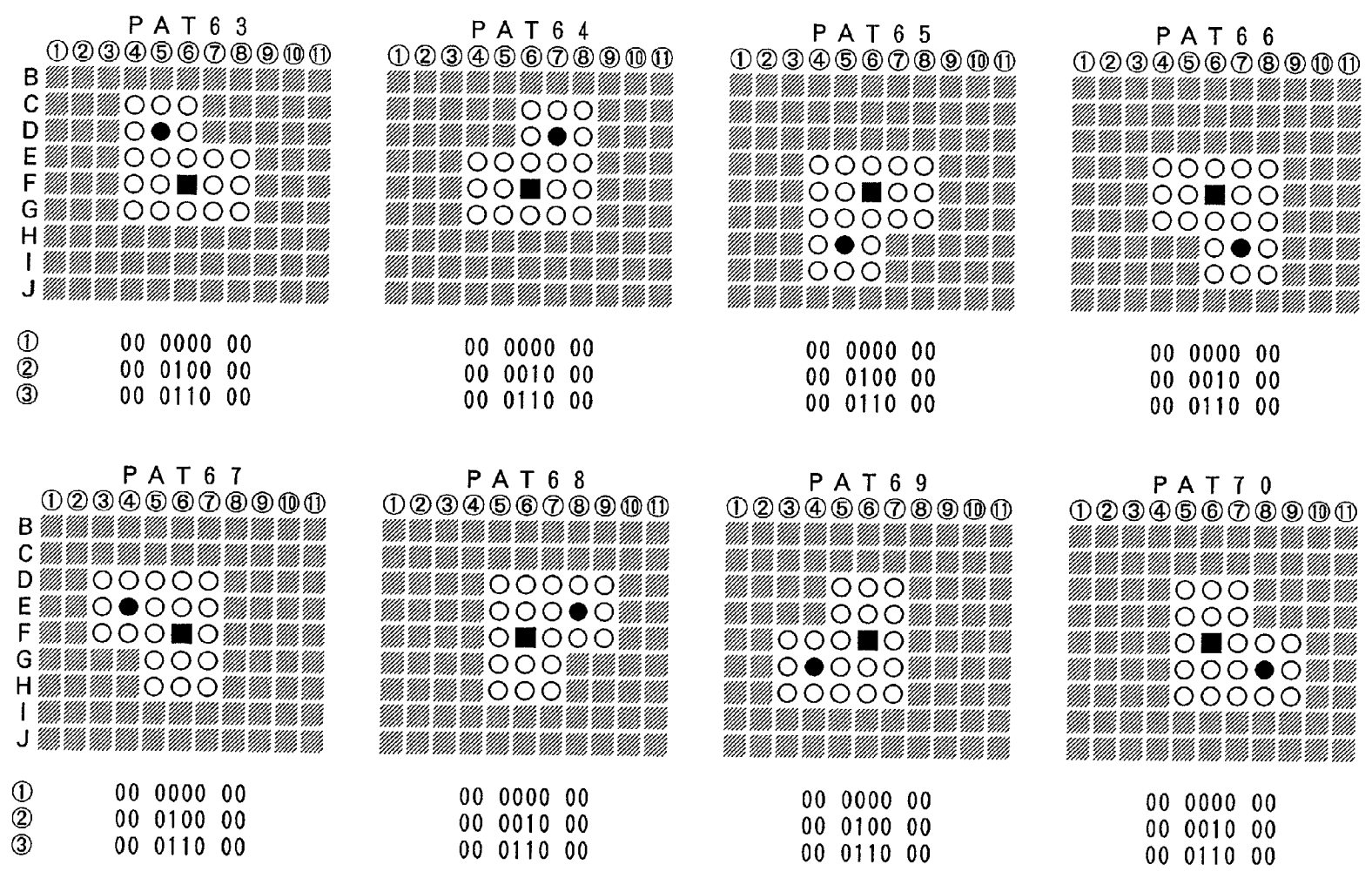

The above-described processing is two-dimensionally repeated for individual pixels in an input image to thereby distribute errors overall in the image. Hereinbelow, the above will be described more specifically by way of practical examples. In the case of an example gray field shown in FIG. 11A, multivalue density levels are represented as shown in FIG. 11B. Through distribution of errors in the overall image according to the error-variance method illustrated in FIGS. 10A and 10B, black pixels are distributed to be substantially uniform to white pixels, as shown in FIG. 11C. For a gray field to be represented as a near-white highlight portion, a small number of black pixels are distributed to be substantially uniform to white pixels corresponding to the lightness of the gray field. In contrast, for a dark gray field, white pixels are scattered to black pixels. However, binary pixel data obtained according to the error-variance method shown in FIGS. 10A and 10B causes error-variance-specific irregularities in black-white border areas in monochromatic line and character portions. FIG. 12A shows an original-image border portion where black changes to white. Multivalue density levels of the original image shown in FIG. 12A are as follows. As shown in FIG. 12B, the multivalue density is at a level substantially representing white in a white portion spaced far from the border. However, portions closer toward the border are gradually grayed because of MTF effects and slight light leakage at the time of reading (scanning) or influence of reflection light from peripheral original sheets. The variation rate in lightness is increased to the maximum on the border of the original image, in which the multivalue density varies to a level substantially representing a halftone image. On the opposing side with respect to the border, that is, in the black field, the multivalue density gradually varies to a level representing black for the same reasons as in the above case. When the original image variable from the white to the black is binary-coded according to the error-variance method shown in FIGS. 10A and 10B, errors are gradually stored according to light gray in the vicinity of the black-white border, the errors reaches a slice level, and black pixels are output. However, the stored errors are cleared by the output of the black pixels. Therefore, no distribution is performed thereafter in the secondary scan direction. As a result, a positional relationship can occur such that the pixel center in the secondary scan direction of an output image shown in FIG. 12C is positioned on the border in the original image shown in FIG. 12A. In this case, the black pixels can easily change to white pixels, and in contrast, the white pixels can easily change to black pixels. Therefore, because of the binary processing according to the above-described error-variance method, the multivalue image data of the original image as shown in FIG. 12A can develop irregularities in the border portion, as shown in FIG. 12C. As above, the error variance and the method therefor has been described by way of the example case where the border is represented by the vertical line in the secondary scan direction. However, also in the case of the black-white border portion of a horizontal line in the primary scan direction, similarly to the above case and for the same reasons as those in the above case, multivalue image data of an original image can cause irregularities in the border portion. When an original image is a thin line constituted of one pixel or the like, as shown in FIG. 13A, a large value cannot be set to the MTF. Therefore, as a result, a signal level of a multivalue density level is small. For the thin-line original image, when the binary processing is performed according to the error-variance method shown in FIGS. 10A and 10B, the small signal level as shown in FIG. 13B is distributed as an error to peripheral pixels. Therefore, as shown in FIG. 13C, omission of pixels for constituting a thin line is easily caused. In addition, because of the error variance, a pattern in which pixels are generated in peripheral portions tends to be output. As a result, for the thin line, because of the binary processing according to the error-variance method shown in FIGS. 10A and 10B, patchiness occurs in the output thin-line image. In addition, suppose the error-variance method shown in FIGS. 10A and 10B is applied to the gray field of the original image shown in FIGS. 11A to 11C. Particularly, suppose the error-variance method is applied to a near-white gray field that is to be a highlight portion. In this case, the small number of black pixels is distributed to white pixels to be substantially uniform corresponding to the lightness. However, when the error-variance (distribution) state is observed through the human eye, as shown in FIG. 5A, the black pixels are recognized as points. Therefore, when observed by the human eye, the image is not recognized overall as a gray-scale image, and the variation in density in the highlight portion cannot be easily recognized; that is, the image appears to be different from the original image. As described above, by the binary processing according to the error-variance method shown in FIGS. 10A and 10B, the image reproductivity is reduced because of defective patterns, such as vertical and horizontal-line irregular patterns, thin-line patchiness, and isolated pixels in light-gray fields. To correct these specific patterns caused by the error-variance method, the present invention comprises the image-quality controller unit 34 provided in the printer controller unit 28, as shown in FIG. 9, and controls it to detect the defective patterns and to smooth the detected patterns.

FIG. 14 is a schematic view of the image-quality controller unit 34 provided in the printer controller unit 28 shown in FIG. 9. The image-quality controller unit 34 is configured to include a buffer 44, a smoothing processor unit 46, and an LD controller unit 48 (laser-diode controller unit). The buffer 44 stores printable binary image data either transmitted from external sources via the scanner 14 or transferred via the communication controller unit 15. From the scanner 14, the buffer 44 receives binary image data processed according to the error-variance method, and stores the data. From the communication controller unit 15, the buffer 44 receives binary image data processed according to the error-variance method, a simple binary processing, or a dither method, and stores the data. Therefore, the smoothing processor unit 46 is required to be capable of performing the most suitable smoothing processing regardless of the data type.

Figure 15:
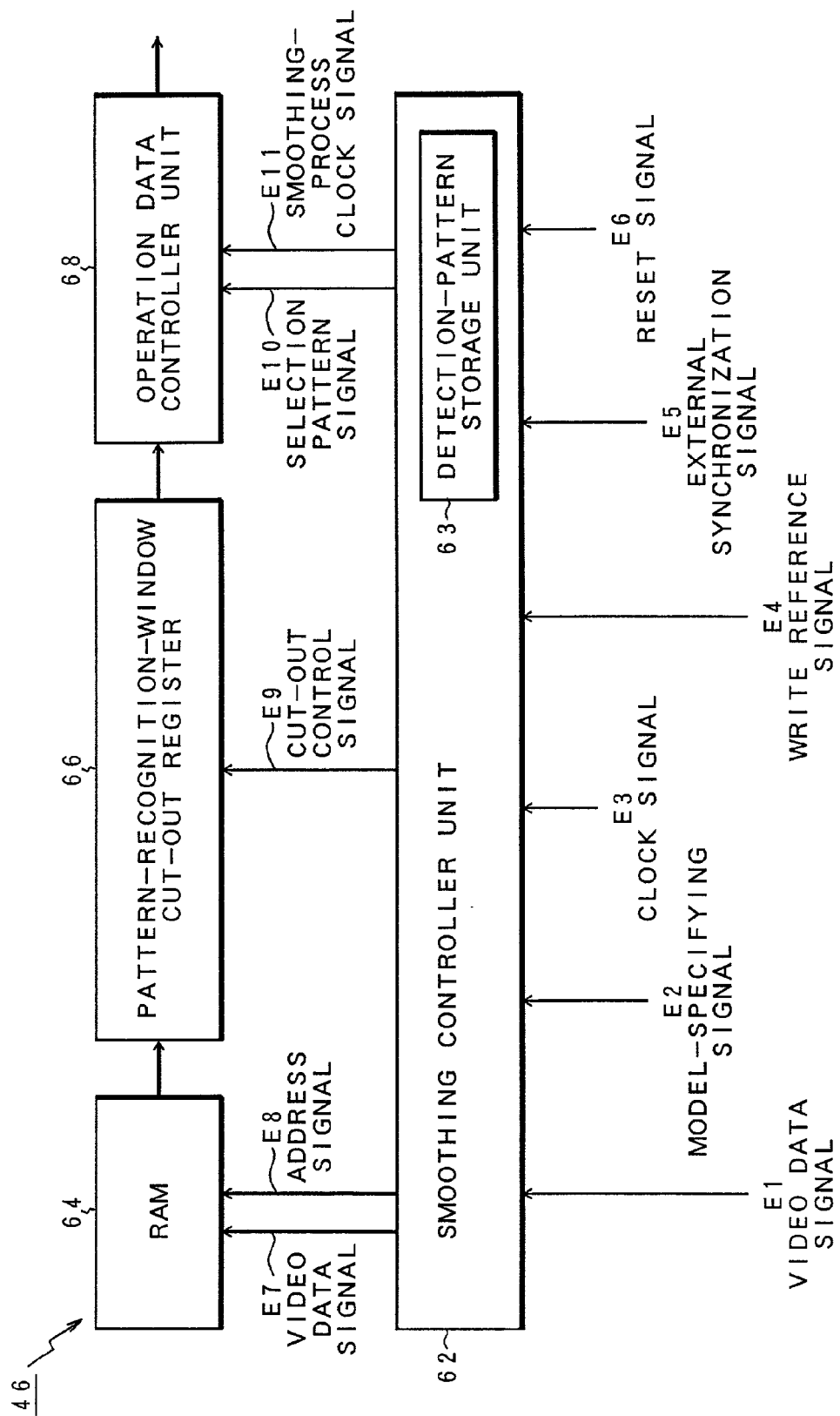
FIG. 15 is a schematic view of a hardware configuration of a smoothing processor unit shown in FIG. 14.

FIG. 15 is a schematic view of a hardware configuration of the smoothing processor unit 46 shown in FIG. 14. The smoothing processor unit 46 is configured to include a smoothing controller unit 62, a random access memory 64 (RAM), a pattern-recognition-window cut-out register 66, and an operation data controller unit 68. The smoothing controller unit 62 stores the following detection patterns (in a detection-pattern storage unit 63):

I) Slanting-line-irregularity detection patterns that are represented by binary data generated according to a method other than the error-variance method;

II) Vertical and horizontal-line-irregularity patterns according to the error-variance method;

III) Thin-line-patchiness detection patterns according to the error-variance method; and IV) Isolated-pixel detection patterns according to the error-variance method.

Each of the above-listed patterns includes a specific detection pattern table corresponding to the model of a supply source of binary data, such as scanner data, facsimile data, and file data. In this connection, a model-specifying signal E2 is fed to the smoothing controller unit 62. According to the model-specifying signal E2 specifying one of scanner data, facsimile data, and file data, a detection pattern table corresponding to the patterns stored in the detection-pattern storage unit 63 is selected. In addition, a video data signal E1 is fed to the smoothing controller unit 62; and according to a video data signal E7 and an address signal E8, processing-object binary image data is stored in the RAM 64 that functions as the buffer 44. Furthermore, the smoothing controller unit 62 is fed with a clock signal E3, a write reference signal E4, an external synchronization signal E5, and a reset signal E6. A cut-out control signal E9 is also fed to the pattern-recognition-window cut-out register 66, and is used to separate (cut out) the binary image data stored in the RAM 64 into pixel data in a predetermined matrix size for registers.

FIG. 16 is an explanatory view showing the pattern-recognition-window cut-out register 66 shown in FIG. 15. The pattern-recognition-window cut-out register 66 has a primary-scan-direction address specification unit 70 and a secondary-scan-direction address specification unit 71, in which an 11×11 matrix ((11 pixels in the primary scan direction)×(11 pixels in the secondary scan direction)) is formed as a register storage position. In the pattern-recognition-window cut-out register 66, input pixel data having a width of 11 bits corresponding to the 11 pixels is shift-input from the right in the secondary scan direction. In the 11×11-pixel matrix, address numbers 1 to 11 are allocated in the primary scan direction, and address symbols A to K are allocated in the secondary scan direction. The position at the primary-scan-direction address "6" and the primary-scan-direction address "F" is a storage position for an attention pixel 72 that is to be currently processed.

Processing will be described referring back to FIG. 15. In the current processing, the operation data controller unit 68 retrieves from the detection-pattern storage unit 63 a detection pattern corresponding in the type to scanner data, facsimile data, or file data that is specified by the model-specifying signal E2 fed to the smoothing controller unit 62. The detection-pattern storage unit 63 then feeds a selection pattern signal E10 to the operation data controller unit 68, and controls it to compare the pattern to current cut-out binary data. If pattern-matching is detected in the comparison, the smoothing processor unit 46 inputs a pixel correction value, which is predetermined corresponding to a pattern matching the current attention pixel, through a smoothing-process clock signal E11. Then, the smoothing processor unit 46 performs correction for smoothing processing, and outputs pixel data of the corrected attention pixel. The smoothing processor unit 46, which is configured to include the hardware shown in FIG. 15, is formed as a large-scale integrated (LSI) circuit, and continues processing of binary data representing one piece of original-image sheet in units of a pixel.

(Smoothing Processing)

Figure 17A:
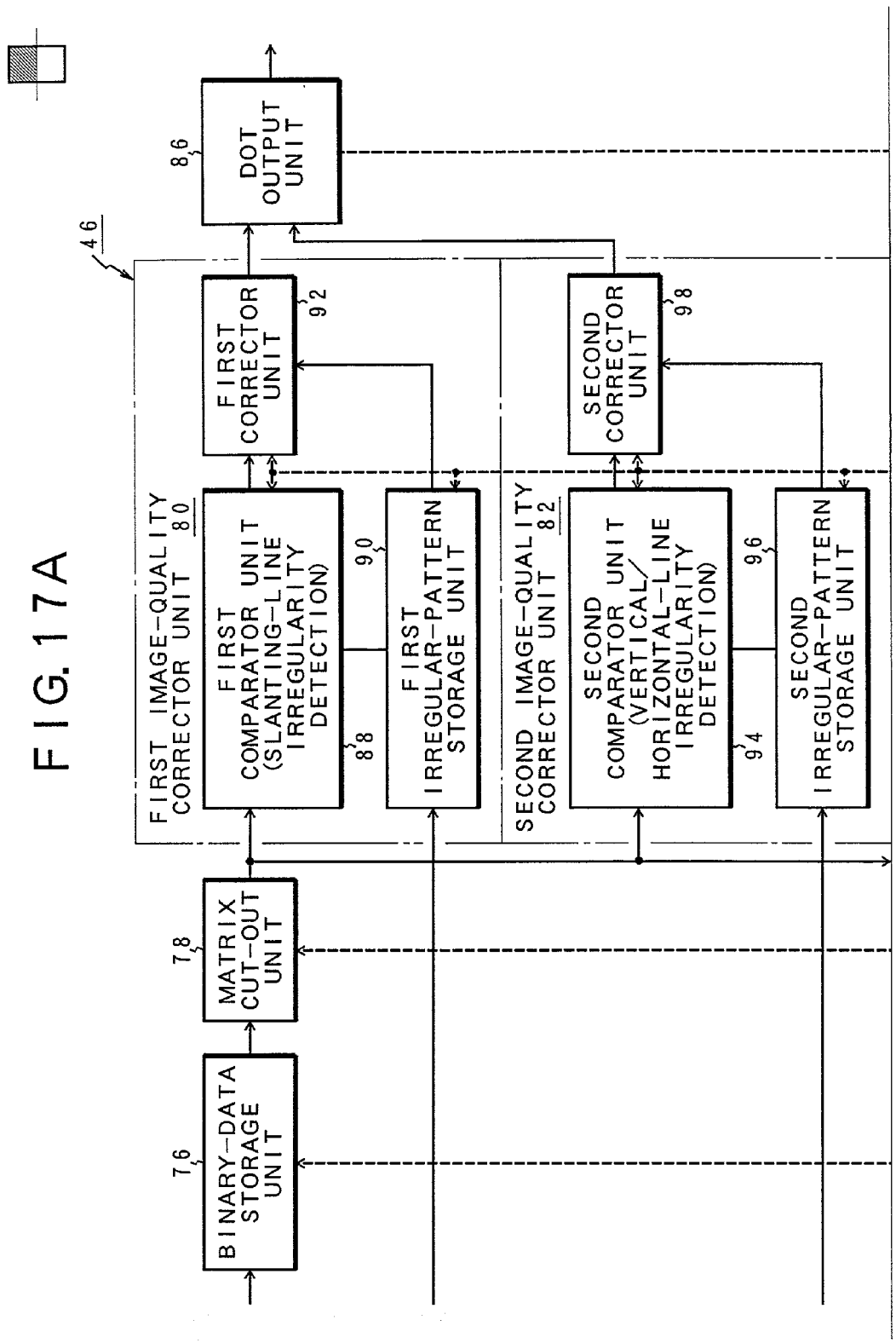
FIGS. 17A and 17B are functional schematic views of the smoothing processor unit shown in FIG. 14, which is implemented in the hardware configuration shown in FIG. 15 and which is referred to as a first embodiment of the present invention.
Figure 17B:
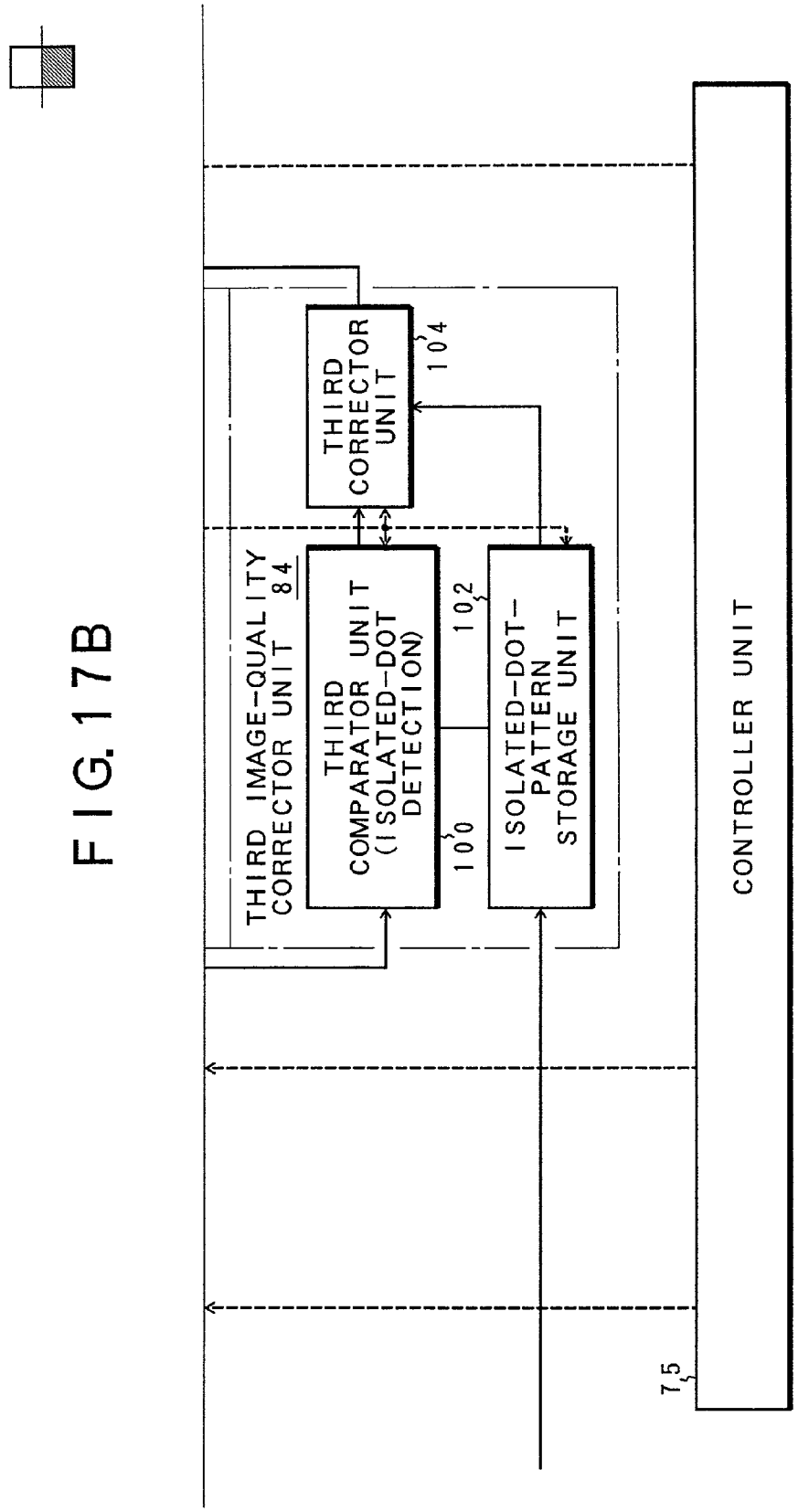

FIGS. 17A and 17B is a functional schematic view of the smoothing processor unit 46 shown in FIG. 14, which is realized in the hardware shown in FIG. 15. The smoothing processor unit 46 is referred to as a first embodiment of the present invention. In FIGS. 17A and 17B, the smoothing processor unit 46 is configured to include a controller unit 75, a binary-data storage unit 76, a matrix cut-out unit 78, a first image-quality corrector unit 80, a second image-quality corrector unit 82, a third image-quality corrector unit 84, and a pixel output unit 86. The binary-data storage unit 76 corresponds to the RAM 64 shown in FIG. 15, and stores various types of binary data. The matrix cut-out unit 78 corresponds to the pattern-recognition-window cut-out register 66 shown in FIG. 15, and uses a matrix-type register similar to that shown in FIG. 16. The first image-quality corrector unit 80 detects slanting-line-irregularity detection patterns, and thereby performs correction for smoothing processing therefor. The slanting-line irregular patterns to be detected are represented by binary data generated according to binary processing in a method other than the error-variance method, for example, the simple binary processing method, or the dither method.

The second image-quality corrector unit 82 detects one of the following types of patterns represented by binary data generated according to the error-variance method:
I) Vertical-line irregular patterns;
II) Horizontal-line irregular patterns; and
III) Thin-line patchy patterns.

Figure 41A:
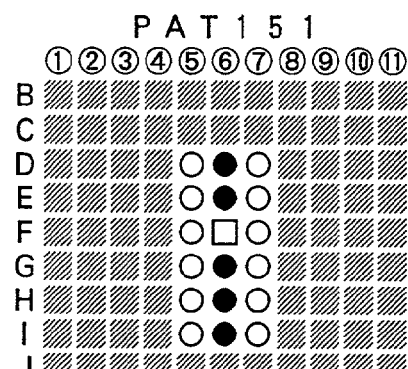
FIGS. 41A to 41C are explanatory views of second irregularity detection patterns PAT151 to PAT153 used in the processing shown in FIGS. 17A and 17B for thin-line patchiness detection, and correction output bit strings.
Figure 41B:
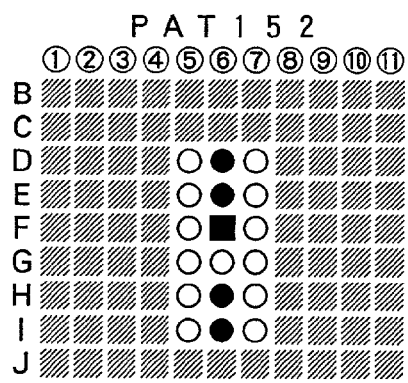
Figure 41C:
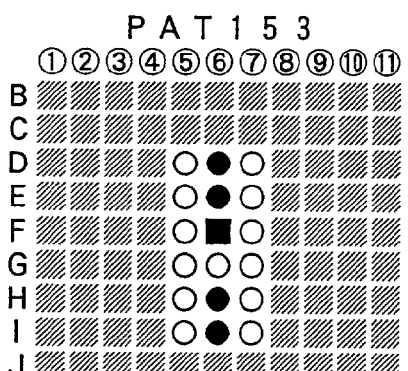

In addition, the third image-quality corrector unit 84 detects isolated pixels generated in light gray areas that are to be highlight portions represented by binary data generated according to the error-variance method. Then, the corrector unit 84 performs smoothing correction for distributing the isolated pixels to peripheral pixels, thereby reducing the sizes of the isolated pixels. The first image-quality corrector unit 80 is configured to include a first comparator unit 88, a first irregular-pattern storage unit 90, and a first corrector unit 92. The first irregular-pattern storage unit 90 stores a number of first irregularity detection patterns (of which examples are shown in FIGS. 20, 21, and 23 to 30.) for detecting slanting-line irregularities caused in binary processing according to a method other than the error-variance method, such as the simple binary processing method or the dither method. In addition, corresponding to the individual patterns, the first irregular-pattern storage unit 90 stores LD-output data representing results of correction of attention pixels that are to be subjected to smoothing processing. The second image-quality corrector unit 82 is configured to include a second comparator unit 94, a second irregular-pattern storage unit 96, and a second corrector unit 98. The second irregular-pattern storage unit 96 stores vertical and horizontal-line-irregularity detection patterns (of which examples are shown in FIGS. 31 to 38 and 39A to 39C) and slanting-line-patchiness detection patterns (of which examples are shown in FIGS. 41A to 41C). The second irregular-pattern storage unit 96 also stores LD-correction data for attention pixels corresponding to the individual patterns. The third image-quality corrector unit 84 is configured to include a third comparator unit 100, an isolated-pixel pattern storage unit 102, and a third corrector unit 104. The isolated-pixel pattern storage unit 102 stores isolated-pixel detection patterns (of which examples are shown in FIGS. 43 to 52). It also stores LD-correction data for attention pixels corresponding to the individual patterns. The controller unit 75 uses the first image-quality corrector unit 80, the second image-quality corrector unit 82, and the third image-quality corrector unit 84 to thereby execute smoothing processing. The smoothing processing is performed according to a procedure summarized in a flowchart shown in FIGS. 18A and 18B. Hereinbelow, the smoothing-processing procedure will be described with reference to the flowchart shown in FIGS. 18A and 18B.

Figure 18B:
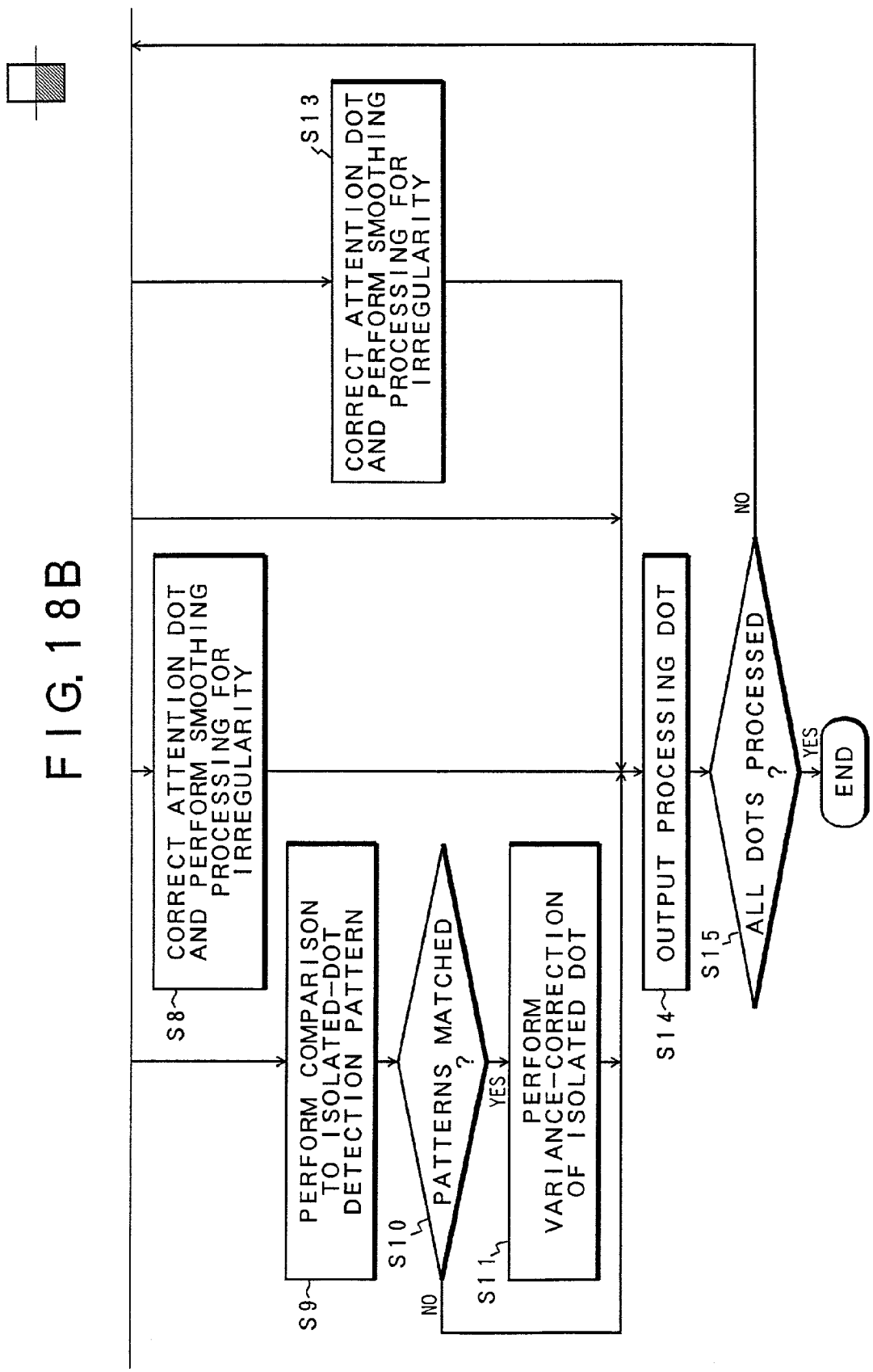

First, in step S1, binary image data to be subjected to the smoothing processing is input to the binary-data storage unit 76 in FIGS. 18A and 18B. In step S2, the matrix cut-out unit 78 is used, and binary data is thereby cut out as a current attention pixel in the position corresponding to an address (6, F) in the 11×11-pixel matrix (as shown in FIG. 16). The data is then fed to the first image-quality corrector unit 80, the second image-quality corrector unit 82, and the third image-quality corrector unit 84. Subsequently, in step S3, the first image-quality corrector unit 80 compares a pattern represented by the data, which has been cut out into a judgment matrix, to first irregularity detection patterns, i.e., slanting-line-irregularity detection patterns specific to binary data generated according to a method other than the error-variance method, such as the simple binary processing method or the dither method. At step S4, in the above comparison, if pattern-matching is not detected, processing proceeds to step S5, and determines whether an interruption flag is turned on. In this case, since the interruption flag is assumed to be off, processing proceeds to step S6. In step S6, the second image-quality corrector unit 82 compares the cut-out pattern of the judgment matrix to second irregularity detection patterns, i.e., vertical and horizontal-line-irregularity detection patterns, and thin-line-patchiness detection patterns, which are specific to binary data according to the error-variance method. In the comparison to the second irregularity detection patterns, if pattern-matching is detected in step S7, processing proceeds to step S8. Step S8 corrects the current attention pixel by using LD-output data (LD: laser diode) predetermined corresponding to the matched pattern, in which smoothing processing for irregularities or corrective connection for patchy thin lines are performed. Then, the processed pixel is output in step S14, and determination is performed at step S15 whether all pixels have been processed. If all pixels are not yet completed, processing returns to step S2 to cut out a judgment matrix for processing a subsequent attention pixel. In the aforementioned comparison in step S6 to the second irregularity detection patterns, if pattern-matching is not detected, processing proceeds to step S9. At step S9, the third image-quality corrector unit 84 compares the pattern to isolated-pixel detection patterns. In the comparison, if pattern-matching is detected at step S10, processing proceeds to step S11, and performs variance correction, in which an isolated pixel is diffused to peripheral pixels. As a matter of course, if pattern-matching is not detected, since no particular smoothing processing needs to be performed, the processing pixel is just output in step S14. Therefore, when binary data generated according to the error-variance method is stored in the binary-data storage unit 76, smoothing processing intended for binary data generated according to the variance correction is performed in the routine of steps S5 to S8.

However, in a state where data stored in the binary-data storage unit 76 includes binary data generated according to a method other than the error-variance method, such as the simple binary processing method or the dither method, when a cut-out pattern is compared in step S3 to the first irregularity detection patterns, pattern-matching is detected in step S4. Therefore, processing proceeds to step S12. In step S12, the interruption flag for the smoothing processing according to the second irregularity detection patterns is turned on. Then, in step S13, the attention pixel corresponding to the matched first irregularity detection pattern is corrected, and irregularity-smoothing processing is performed. Thus, after matching with one of the first irregularity detection patterns is once detected, the interruption flag is turned on in step S12. Therefore, in a state where pattern-matching is detected in comparison to the first irregularity detection patterns in step S4, although processing attempts to proceed to step S6 and the subsequent steps for smoothing processing intended for binary data generated according to the error-variance method, step S5 determines that the interruption flag is already turned on. Accordingly, processing jumps over steps S6 to S11 provided for smoothing processing, and thereafter, only smoothing processing according to only the first irregularity detection patterns is performed. Taking the above into account, the first embodiment shown in FIGS. 17A and 17B is configured to operate as described hereunder. Determination is performed as to what type of binary processing (i.e., binary processing according to the error-variance method) has been substantially performed for smoothing-processing-object binary data. If binary data according to the error-variance method is input, the second image-quality corrector unit 82 and the third image-quality corrector unit 84 distribute vertical and horizontal-line irregular patterns, thin-line patchy patterns, and isolated pixels to peripheral portions. Thereby, smoothing processing is implemented. On the other hand, if binary data according to a method other than the error-variance method is input, the first image-quality corrector unit 80 automatically performs smoothing processing, thereby smoothing slanting-line irregular patterns. As a result, for binary data generated according to methods such as the simple binary processing method and the dither method, smoothing processing can be applied to distribute vertical and horizontal-line irregular patterns, thin-line patchy patterns, and isolated pixels to peripheral pixels. This allows the image quality level to be prevented from being reduced. Concurrently, for binary data generated according to the error-variance method, correction is performed for slanting-line irregularities represented by binary data generated according to the simple binary processing method, the dither method, and the like, thereby allowing reduction in the image quality level to be securely prevented.

FIG. 19 summarizes contents of patterns stored in the first irregular-pattern storage unit 90, the second irregular-pattern storage unit 96, and the isolated-pixel pattern storage unit 102 shown in FIGS. 17A and 17B. As shown in the figure, the first irregular-pattern storage unit 90 stores slanting-line-irregularity detection patterns that are specific to the dither method and the simple binary processing method. The second irregular-pattern storage unit 96 and the isolated-pixel pattern storage unit 102 store slanting-line-patchiness detection patterns, vertical and horizontal-line-irregularity detection patterns, and isolated-pixel detection patterns that are specific to the error-variance method.

FIGS. 20, 21, and 23 to 30 show practical examples of the first irregularity detection patterns used in the smoothing processing by the first image-quality corrector unit 80 shown in FIGS. 17A and 17B. Specifically, these figures show practical examples of slanting-line-irregularity detection patterns that are specific to a method other than the error-variance method, such as the simple binary processing method or the dither method. As the practical examples, 72 slanting-line-irregularity detection patterns are shown with pattern numbers PAT253 to PAT324. The examples will be explained using pattern PAT253 shown on the left-upper corner in FIG. 20. In a 11×10-pixel matrix area formed of pixel positions (1) to (11) in the primary scan direction and pixel positions B to J, slanting-line-detection black and white patters are stored, an attention pixel in pixel position (7, F) is represented by a rectangular black (or white) pixel, and other pixels are represented by black circles or white circles. Corresponding to the detection pattern shown in the 11×10-pixel matrix, items of LD-output data used for smoothing the attention pixel are indicated below the matrix with item numbers (1), (2), and (3). The LD-output data (1), (2), and (3) can be used to represent one pixel by ¼ resolutions. Specifically, when the density of a black pixel is represented by "1", and the density of a white pixel is represented by "0", the black pixel has four stage values "1/4", "2/4", "3/4", and "1". In addition, the LD-output data functions to control positions of the individual pixel in units of 4 bits. For example, a ½-density black pixel can be represented by an intrapixel position represented by one of the 4-bit values of '1100',
'0110', and
'0011'.

In this case, the position corresponding to '11' represents the left side, the center, or the right side. Therefore, the intrapixel positions of the ½-dinsity black pixel can be controlled. Furthermore, the LD-output data (1), (2), and (3) shown below the pattern PT253 separately represent input densities and output densities in the printer engine 30, shown in FIG. 14, at the time of practical printing according to LD emission by three input-device models.

Figure 20:
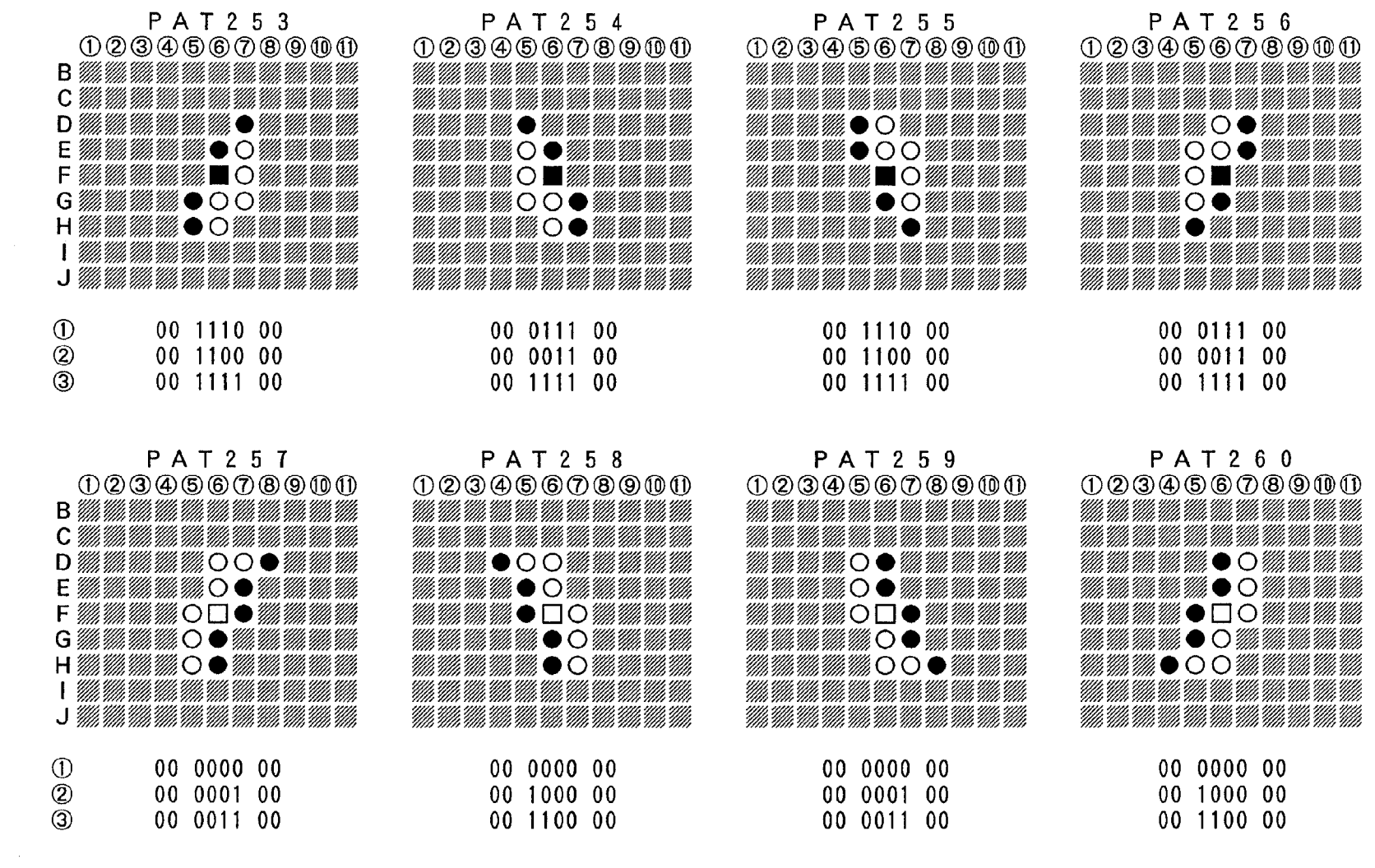
Figure 22A:
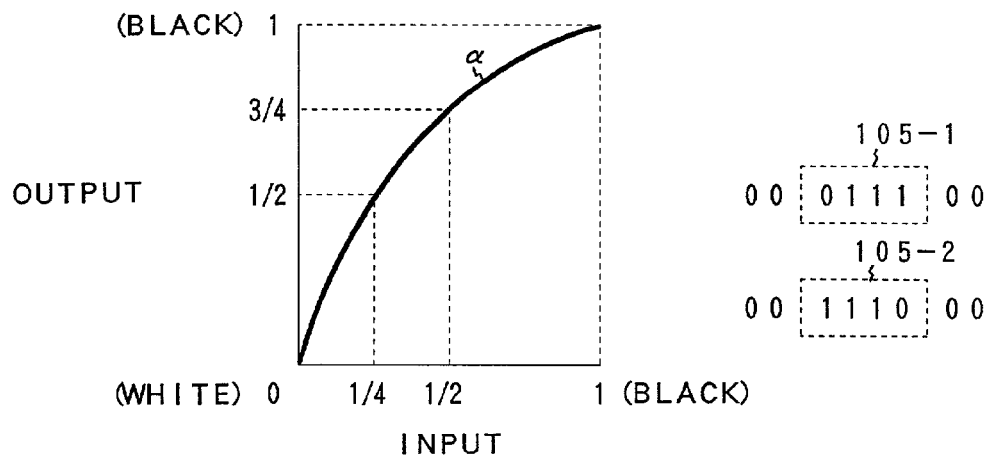
FIGS. 22A to 22C are explanatory views each showing model-dependent input/output pixel density characteristics corresponding to the first irregularity detection patterns shown in FIGS. 20 and 21.
Figure 22B:
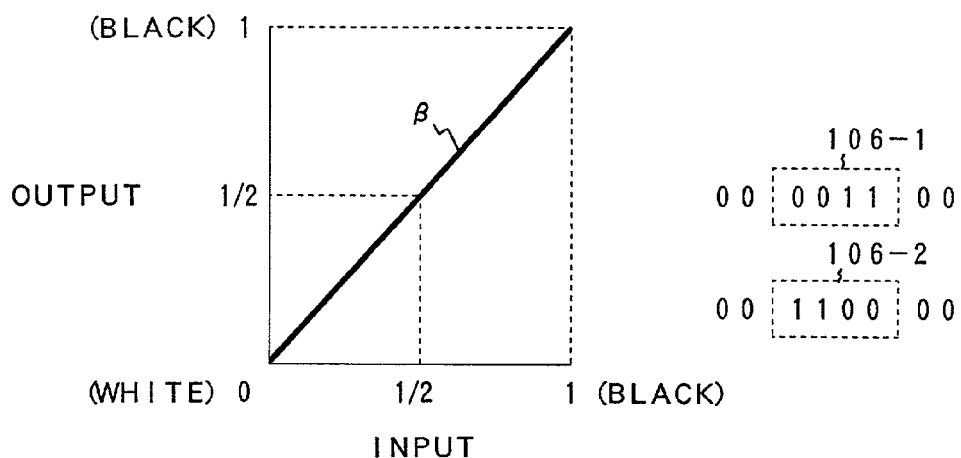
Figure 22C:
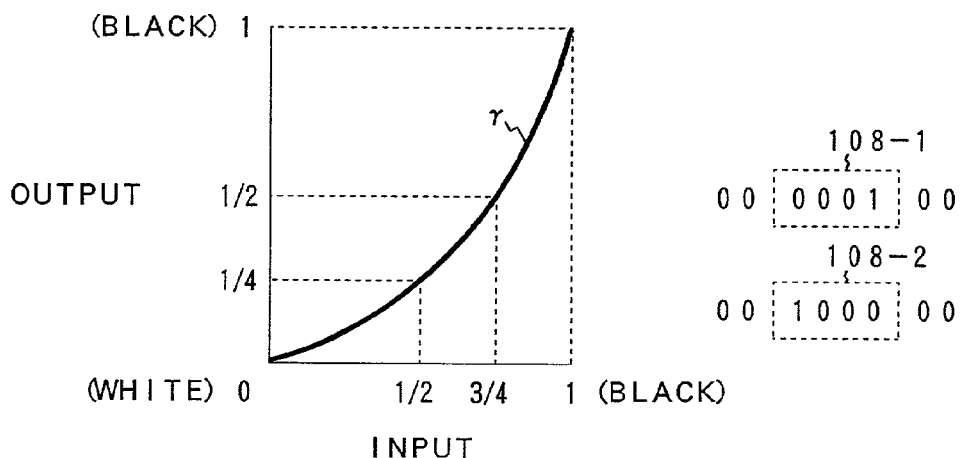
Figure 23:
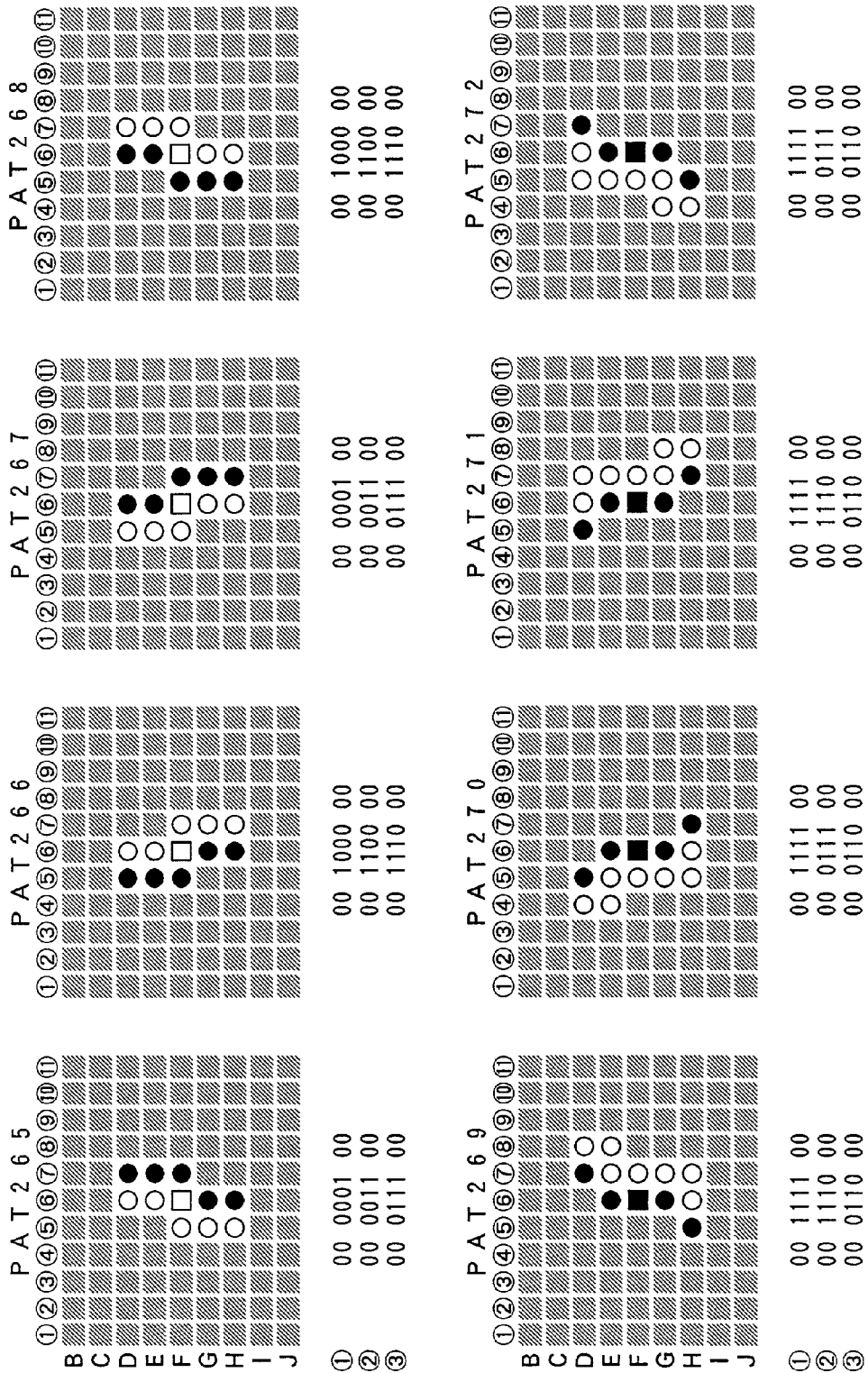
FIG. 23 shows explanatory views (continued to the views in FIG. 21) of first irregularity detection patterns PAT265 to PAT272 used for slanting-line irregularity detection, and correction output bit strings.
Figure 24:
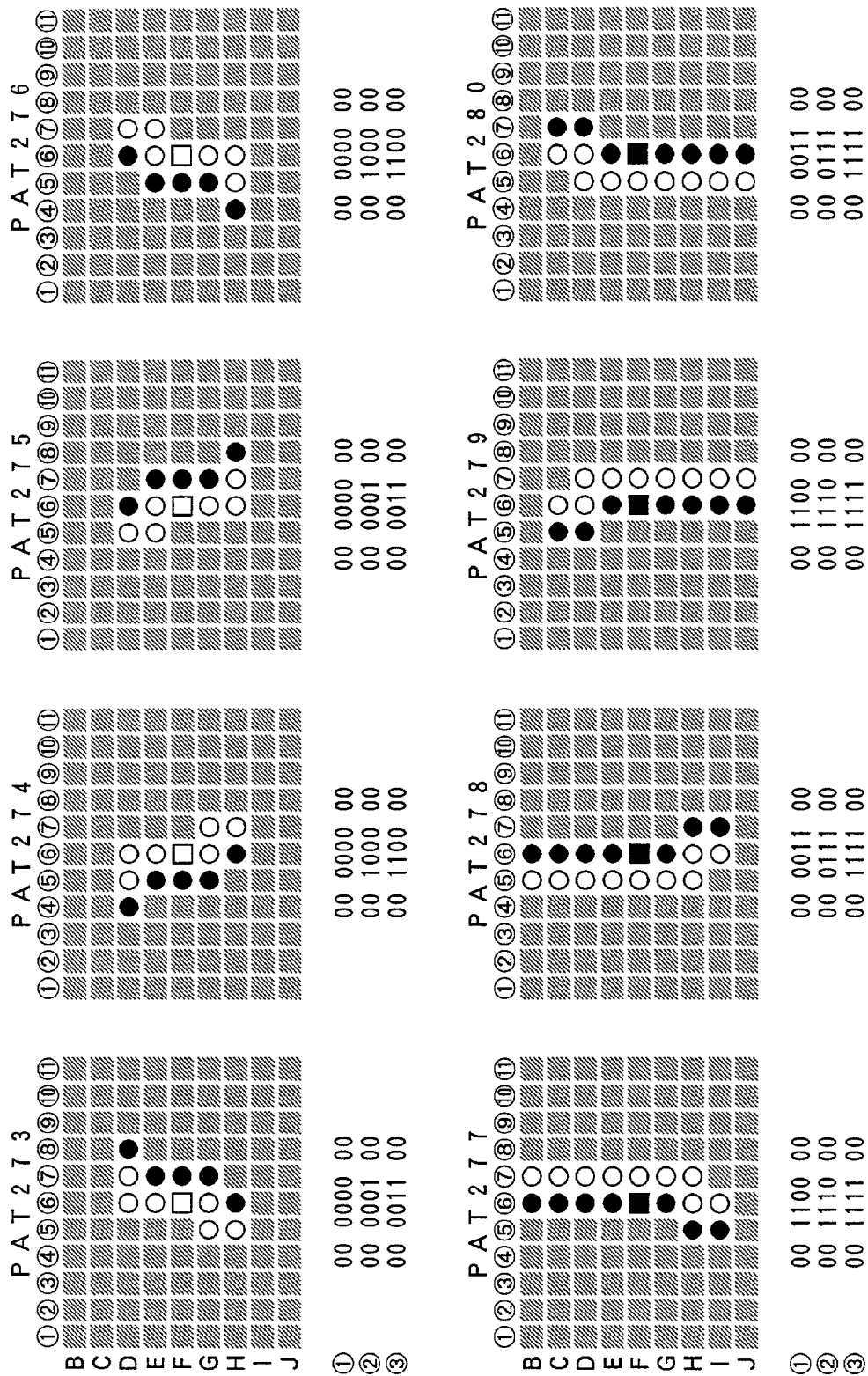
FIG. 24 shows explanatory views (continued to the views in FIG. 23) of first irregularity detection patterns PAT273 to PAT280 used for slanting-line irregularity detection, and correction output bit strings.
Figure 26:
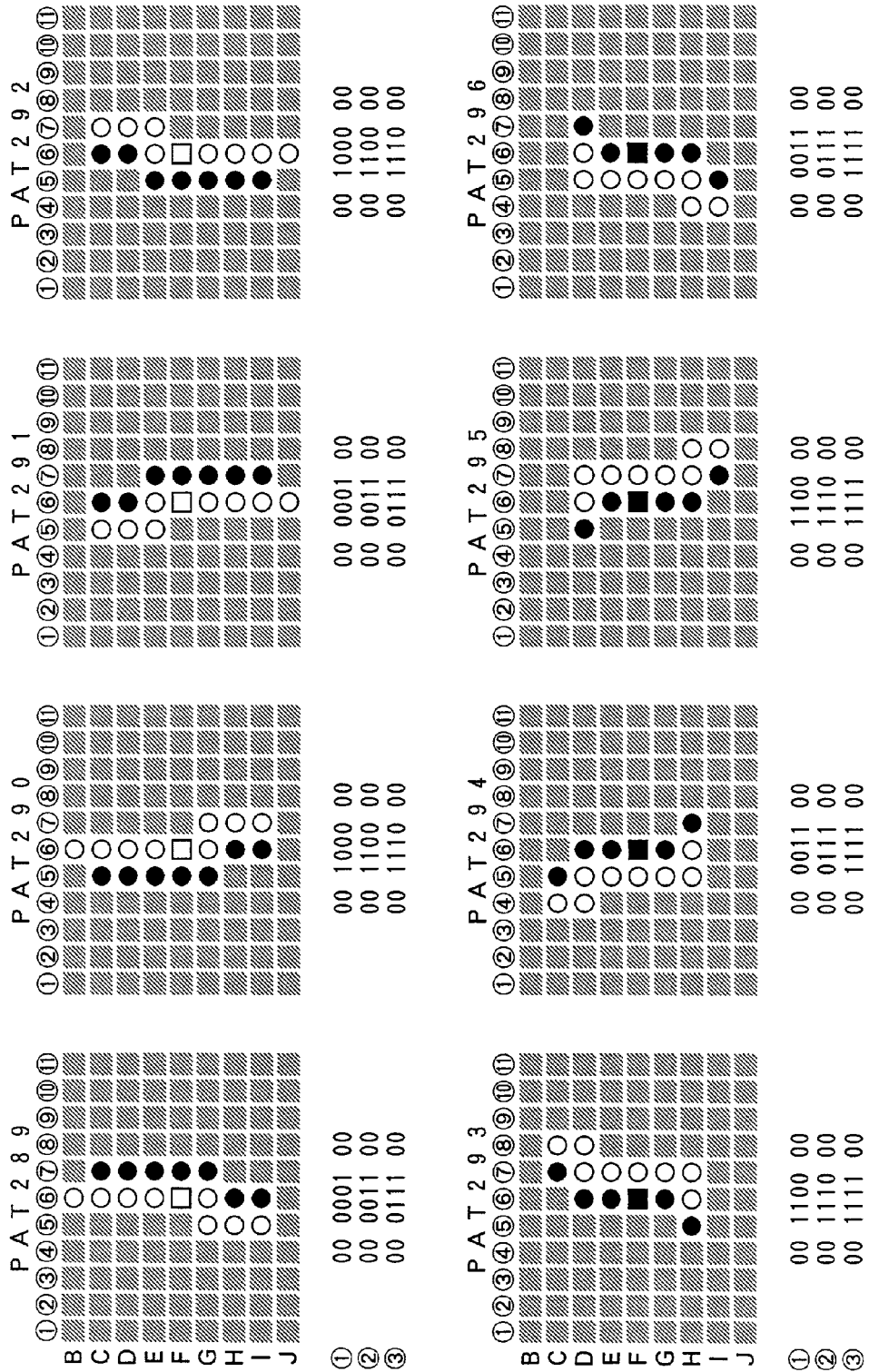
FIG. 26 shows explanatory views (continued to the views in FIG. 25) of first irregularity detection patterns PAT289 to PAT296 used for slanting-line irregularity detection, and correction output bit strings.
Figure 27:
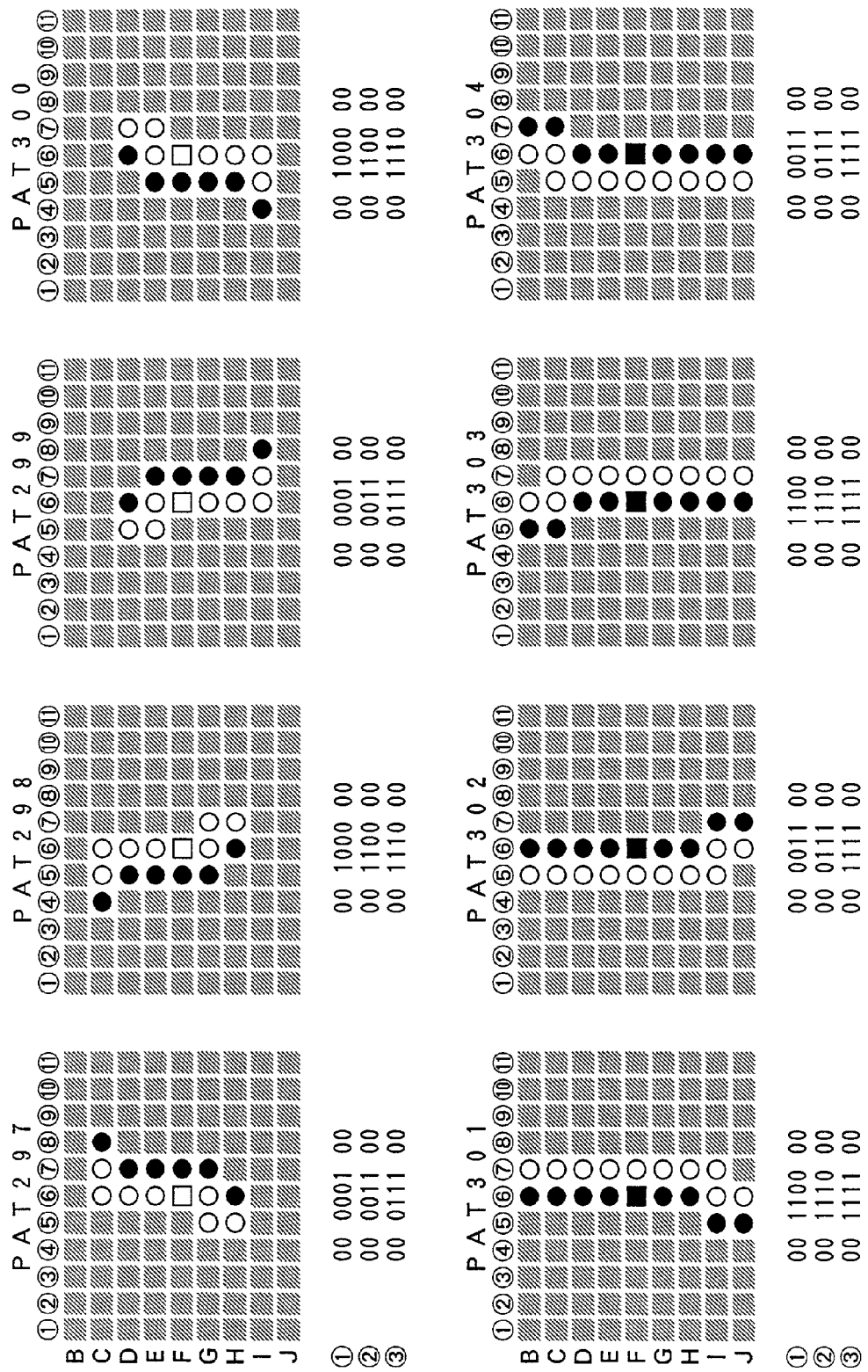
FIG. 27 shows explanatory views (continued to the views in FIG. 26) of first irregularity detection patterns PAT297 to PAT304 used for slanting-line irregularity detection, and correction output bit strings.
Figure 28:
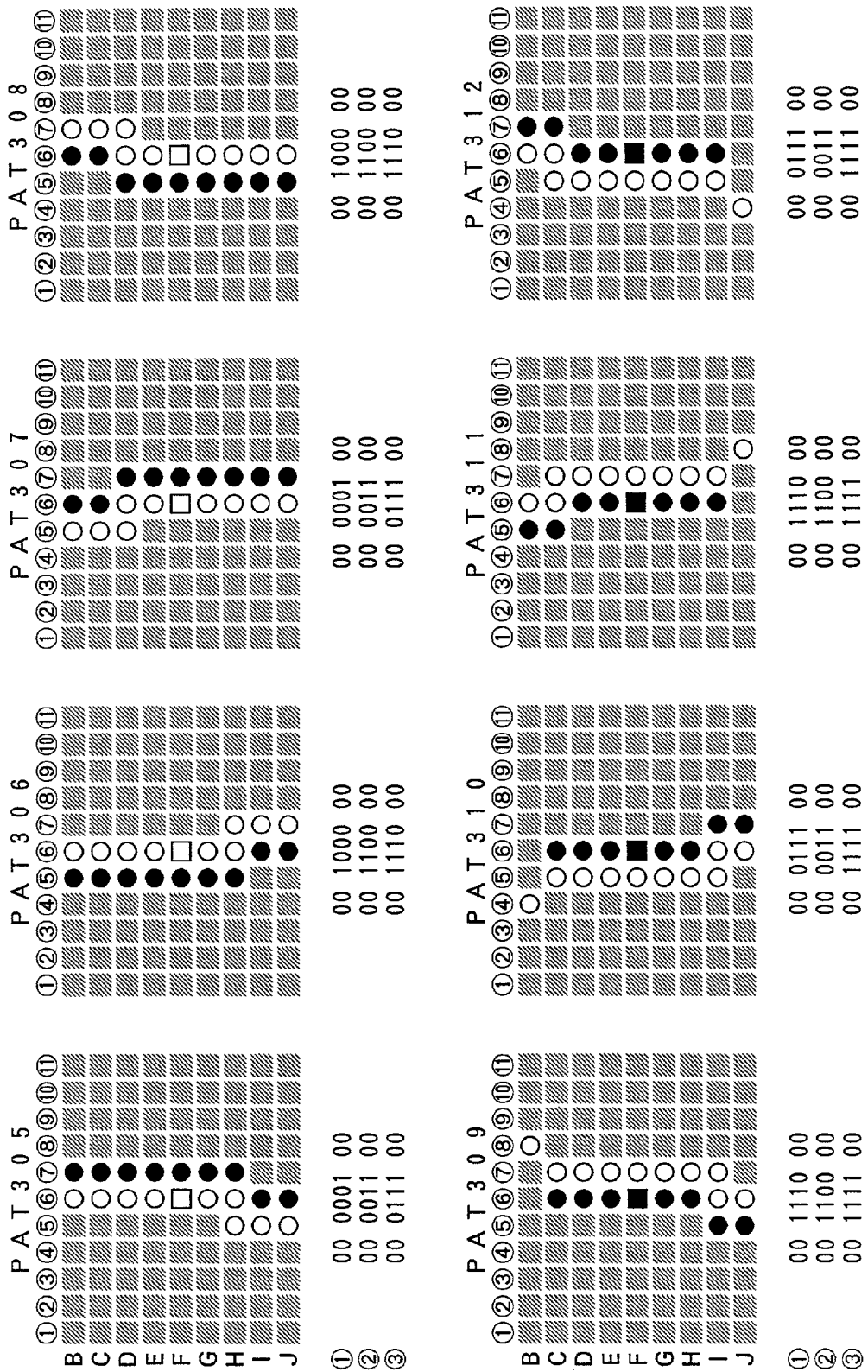
FIG. 28 shows explanatory views (continued to the views in FIG. 27) of first irregularity detection patterns PAT305 to PAT312 used for slanting-line irregularity detection, and correction output bit strings.
Figure 29:
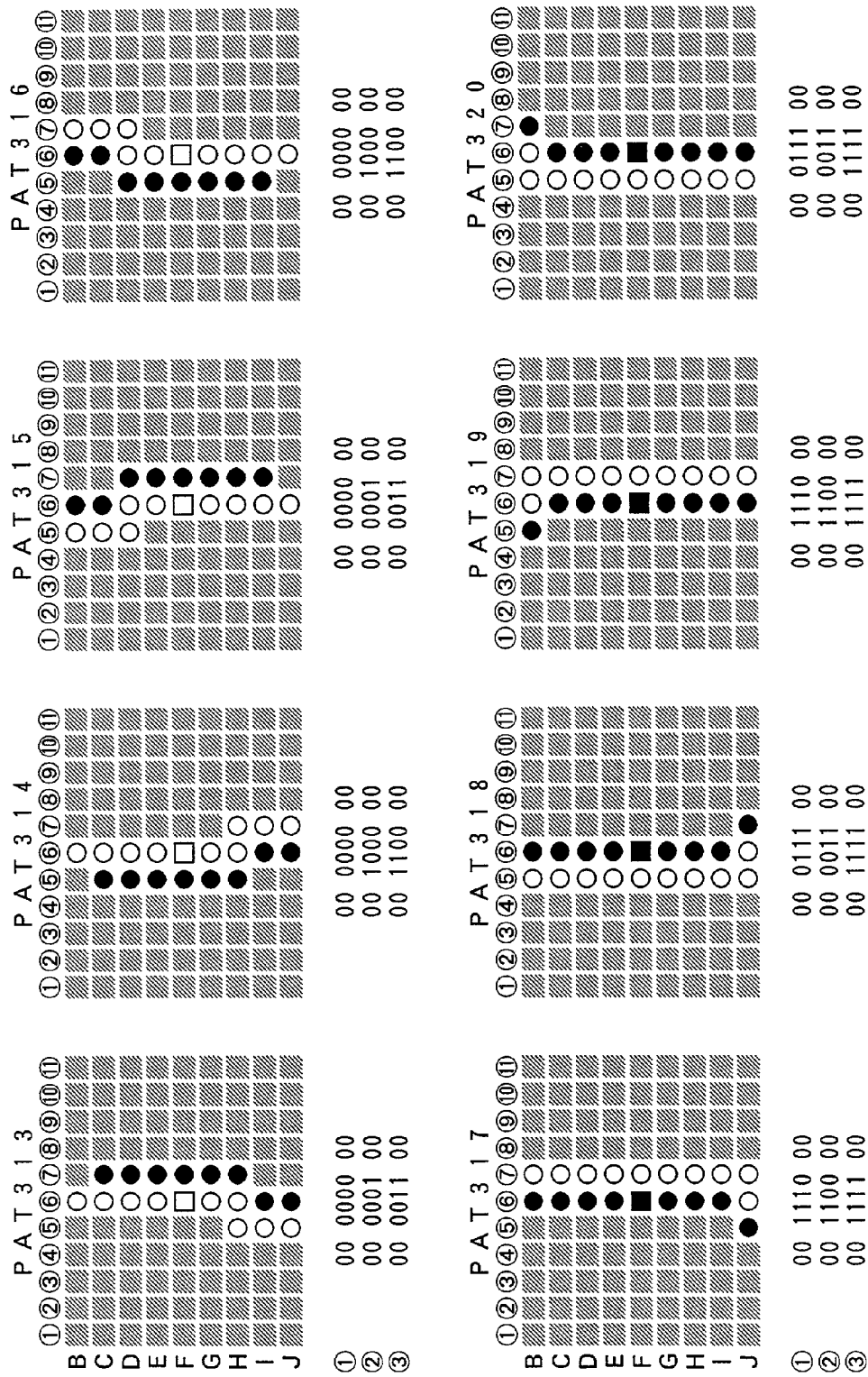
FIG. 29 shows explanatory views (continued to the views in FIG. 28) of first irregularity detection patterns PAT313 to PAT320 used for slanting-line irregularity detection, and correction output bit strings.
Figure 30:
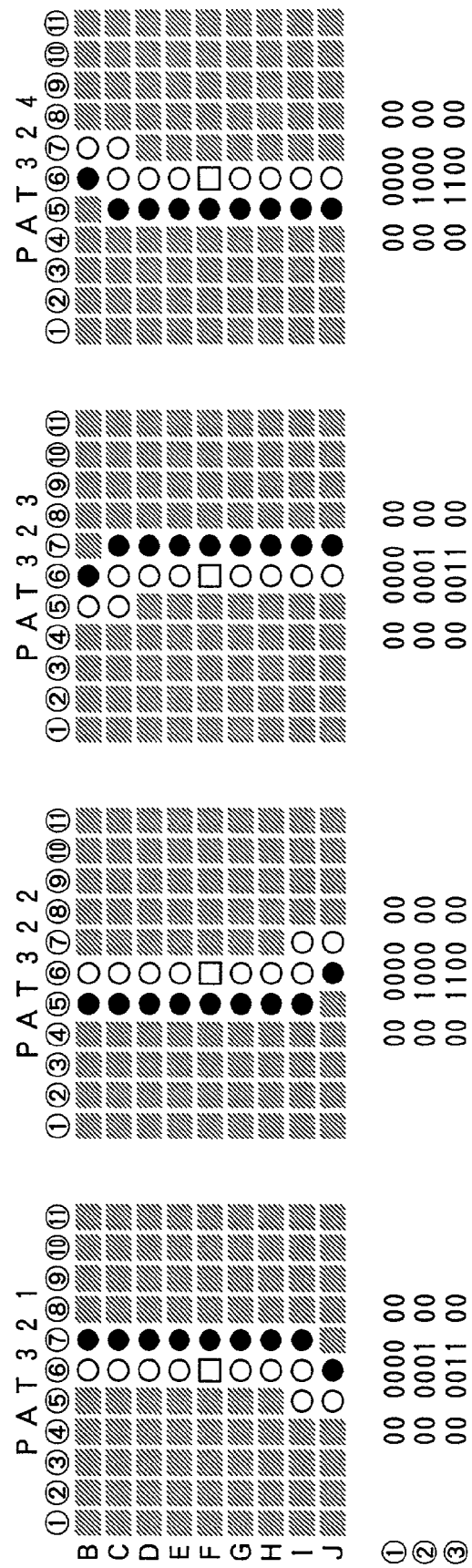
FIG. 30 shows explanatory views (continued to the views in FIG. 29) of first irregularity detection patterns PAT321 to PAT324 used for slanting-line irregularity detection, and correction output bit strings.
Figure 31:
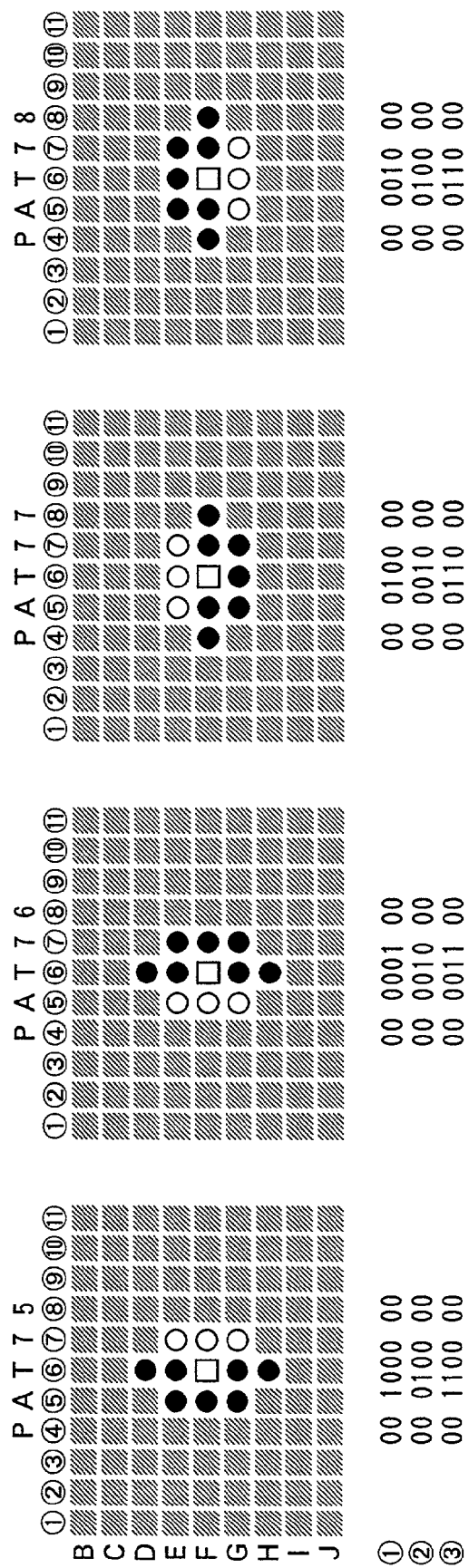
FIG. 31 shows explanatory views of second irregularity detection patterns PAT75 to PAT78 used in the processing shown in FIGS. 17A and 17B for vertical/horizontal-line detection, and correction output bit strings.
Figure 32:
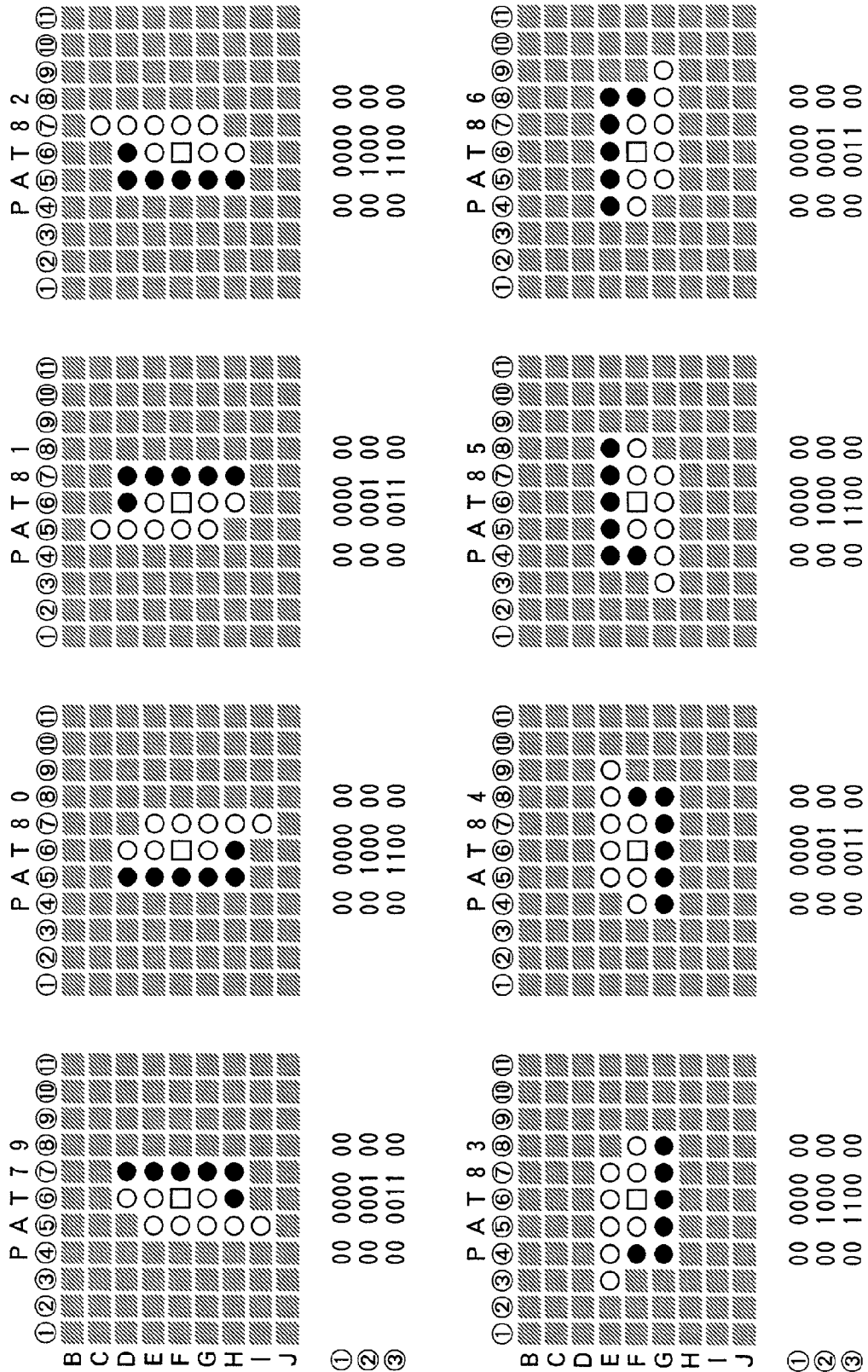
FIG. 32 shows explanatory views (continued to the views in FIG. 31) of second irregularity detection patterns PAT79 to PAT86 used for vertical/horizontal-line detection, and correction output bit strings.

FIG. 22A is a characteristic view showing pixel-density input/output characteristics of a printer using the LD-output data (1) shown in FIG. 20. In an input/output density characteristic α, the output density is 3/4 with respect to the 1/2 input density. Therefore, as LD-output data 105-1 and 105-2 shown on a right portion of the view, the data is represented by either '0111' or '1110'. That is, smoothing-correction value is represented by the 1/2 input density, and the value is converted by the input/output density characteristic α into 3/4 output densities, and the converted value is output. In practice, they are represented by the LD-output data 105-1 and 105-2. The LD-output data 105-1 is printed such that the 3/4 output density is positioned right in the matrix. On the other hand, the LD-output data 105-2 is printed such that the 3/4 densities are positioned left in the matrix. FIG. 22B is a characteristic view showing a pixel-density input/output characteristic β of a printer using the LD-output data (2) shown in FIG. 20. For example, when the density of an attention pixel to be corrected by smoothing processing is input as a ½ density, the output density also retains the ½ density according to the linear characteristic β. As LD-output data 106-1 and 106-2, LD-output data in the above case can control one of the positions of the right side, the left side, and the center (not shown) in the 4 bits. FIG. 22C is a characteristic view showing a pixel-density input/output characteristic γ of a printer using the LD-output data (3) shown in FIG. 20. For example, when the correction density of an attention pixel to be corrected by smoothing processing is set to 1/2, the output density to the LD is converted to a 1/4 density according to the pixel-density input/output characteristic γ. As LD-output data 108-1 and 108-2, at the 1/4 LD-density, 1 bit at the right end or the left end is set. As a matter of course, the position of the 1 bit can be appropriately controlled so as to be set to any one of the 4-bit positions. As in the cases of FIGS. 22A to 22C, the practical LD-output data of the correction value for the attention pixel that is to be subjected to smoothing processing is different depending on the characteristics of print density with respect to the pixel density handled by the printer engine. Therefore, near-original printed images can be obtained through selection of conversion characteristics corresponding to device models. For simplifying purposes, description to be made hereinbelow refers to a case of the linear characteristics shown in FIG. 22B; specifically, description to be made below refers to a case in which a printer mode using the LD-output data (2) shown in FIG. 20 is selected.

Hereinbelow, a description will be made regarding the slanting-line-irregularity detection patterns PAT 253 to PAT324 shown in FIGS. 20, 22A to 22C, and 23 to 30. These slanting-line-irregularity detection patterns are created corresponding to slanting-line tilts. The slanting-line tilt is defined by Tilt=(Secondary-scan-direction interpixel interval)/(primary-scan-direction interpixel interval).

The patterns PAT253 to PAT260 in FIG. 20 are used to detect the cases of tilt=2/1. The patterns PAT261 to PAT276 (16 patterns) in FIGS. 21, 23, and 24 (upper-half portion) are used to detect the cases of tilt=3/1. The patterns PAT277 to PAT284 in FIGS. 24 (lower-half portion) and 25 (upper-half portion) are used to detect the cases of tilt=6/1. The patterns PAT285 to PAT292 in FIGS. 25 (lower-half portion) and 26 (upper-half portion) are used to detect the cases of tilt=5/1. The patterns PAT293 to PAT300 in FIGS. 26 (lower-half portion) and 27 (upper-half portion) are used to detect the cases of tilt=4/1. The patterns PAT301 to PAT308 in FIGS. 27 (lower-half portion) and 28 (upper-half portion) are used to detect the cases of tilt=7/1. The patterns PAT309 to PAT316 in FIGS. 28 (lower-half portion) and 29 (upper-half portion) are used to detect the cases of tilt=6/2. Furthermore, the patterns PAT317 to PAT324 in FIGS. 29 (lower-half portion) and 30 are used to detect the cases of tilt=8/1 or greater. As described above, these slanting-line-irregularity detection patterns PAT253 to PAT324 are intended for the tilts of 2/1, 3/1, 4/1, 5/1, 6/1, 7/1, and 8/1 or grater when the primary-scan-direction interpixel interval is represented by 1. However, detection cases when the secondary-scan-direction interpixel interval is represented 1 can be similarly defined for the slanting-line-irregularity detection patterns at the tilts of 1/2, 1/3, 1/4, 1/5, 1/6, 1/7, and 1/8 or less.

(Vertical and Horizontal-Line-Irregularity Detection Patterns)

Patterns PAT75 to PAT150 in FIGS. 31 to 38 are practical example patterns that are used for detection of vertical and horizontal-line irregularities specific to the error-variance method and that are used for smoothing processing to be performed by the second image-quality corrector unit 82. Also for the patterns used to detect vertical and horizontal-line irregularities, similarly to the slanting-line-irregularity detection patterns shown in FIGS. 21 and 23 to 30, the individual detection pattern is shown in an 11×10 matrix. Below the individual matrix, there are shown LD-output data (1), (2), and (3) of correction values for the corresponding attention pixel having conversion characteristics corresponding to printer models.

Figure 33:
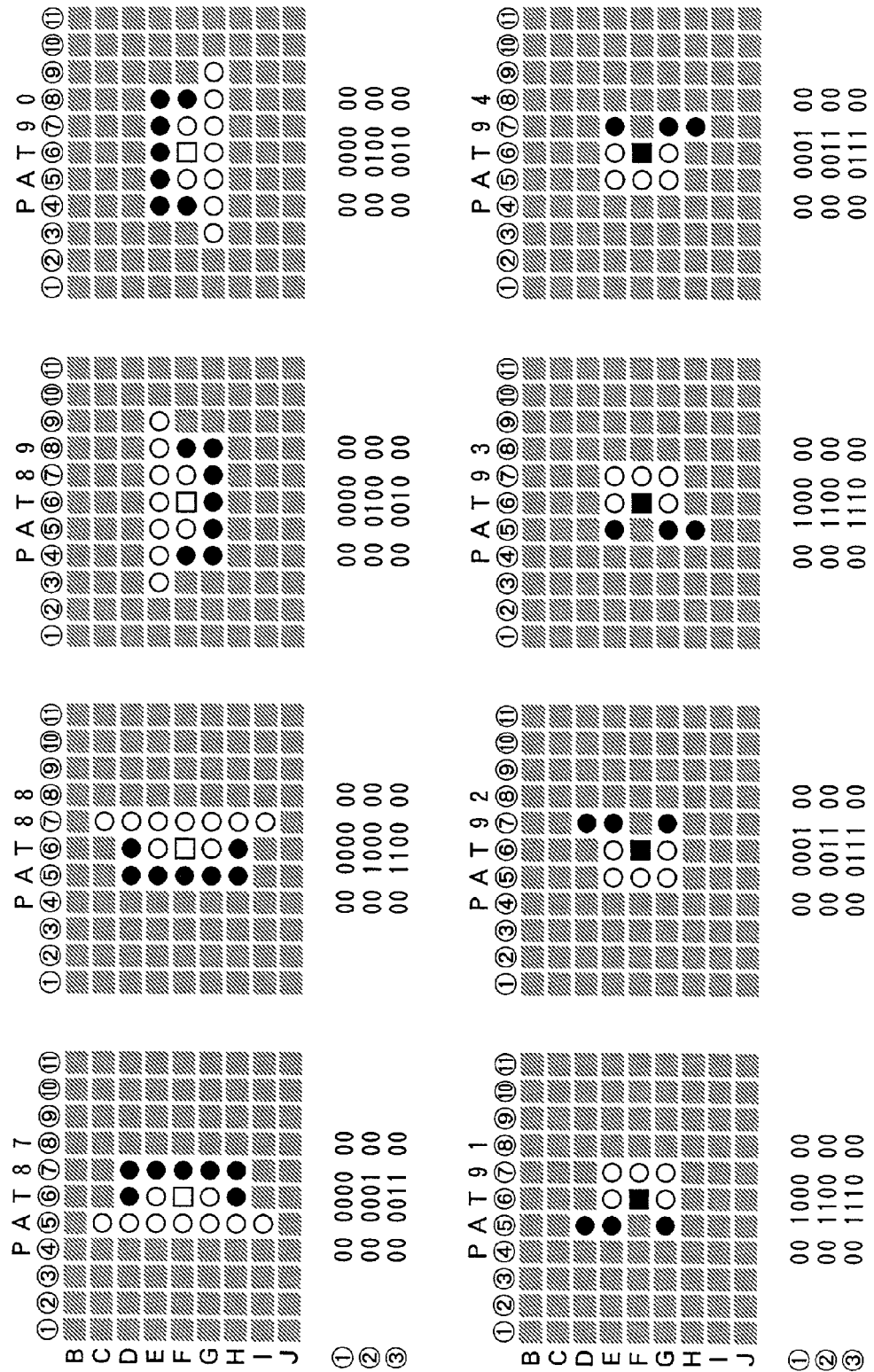
FIG. 33 shows explanatory views (continued to the views in FIG. 32) of second irregularity detection patterns PAT87 to PAT94 used for vertical/horizontal-line detection, and correction output bit strings.
Figure 34:
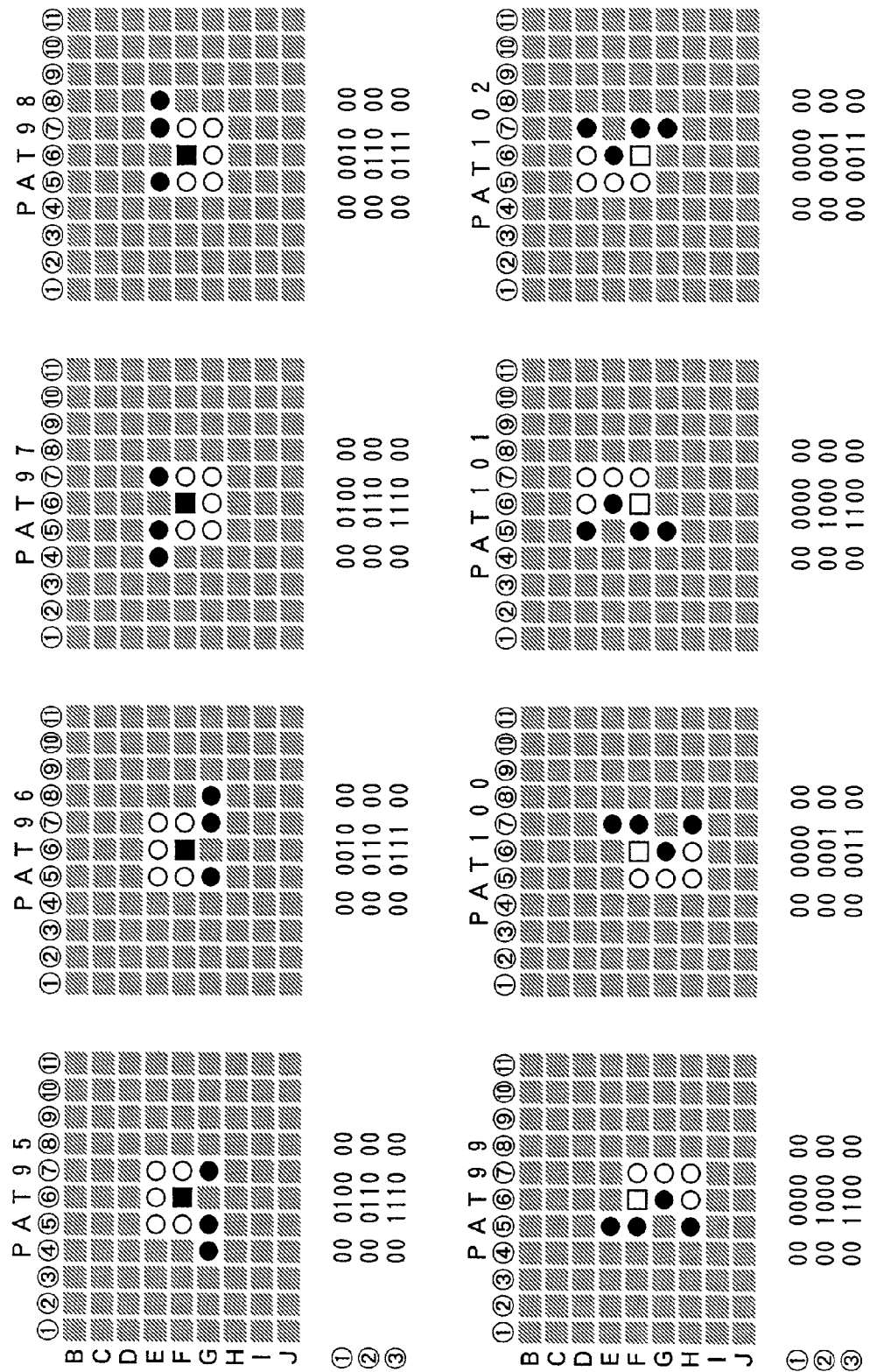
FIG. 34 shows explanatory views (continued to the views in FIG. 33) of second irregularity detection patterns PAT95 to PAT102 used for vertical/horizontal-line detection, and correction output bit strings.
Figure 35:
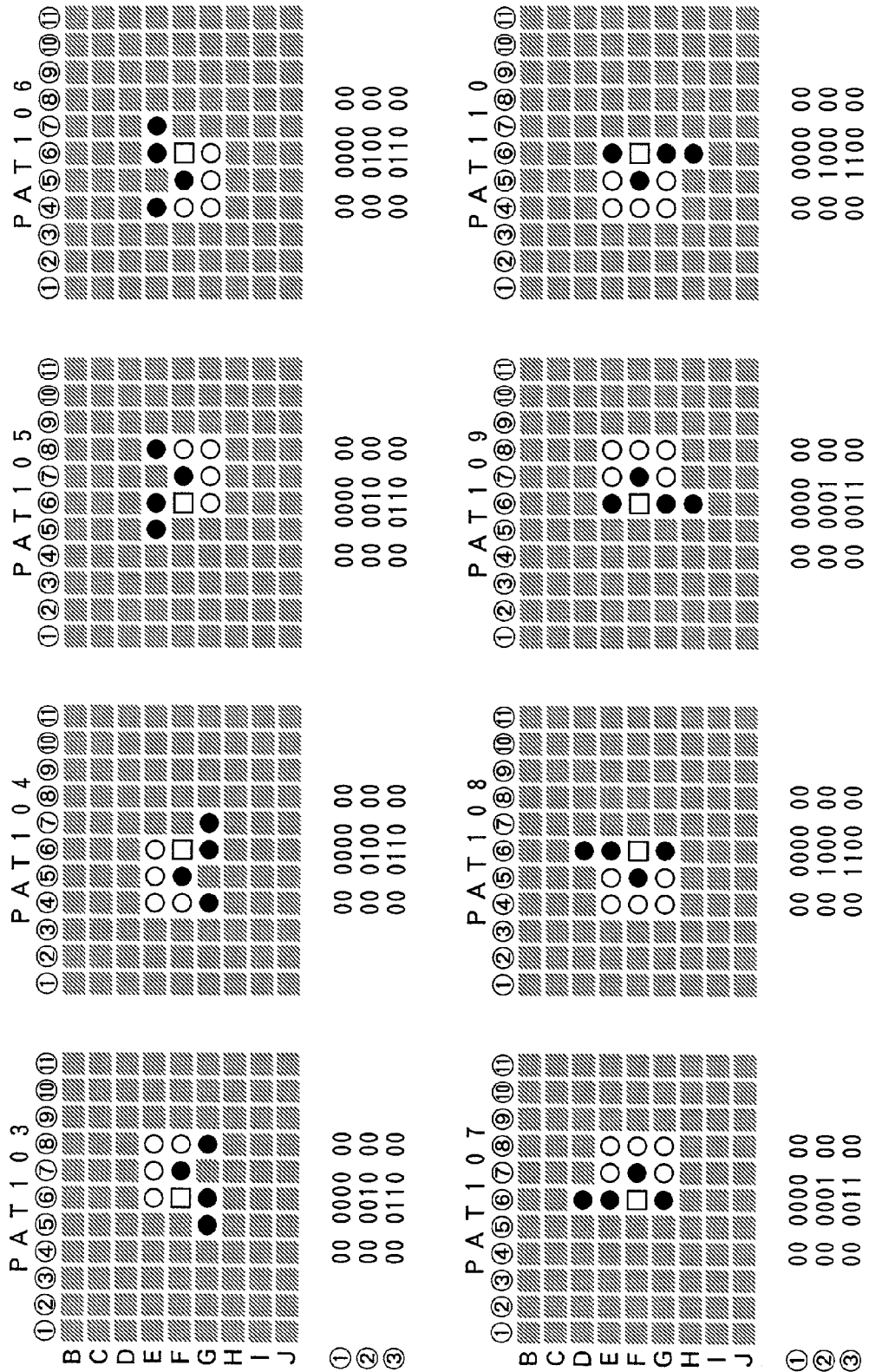
FIG. 35 shows explanatory views (continued to the views in FIG. 34) of second irregularity detection patterns PAT103 to PAT110 used for vertical/horizontal-line detection, and correction output bit strings.
Figure 36:
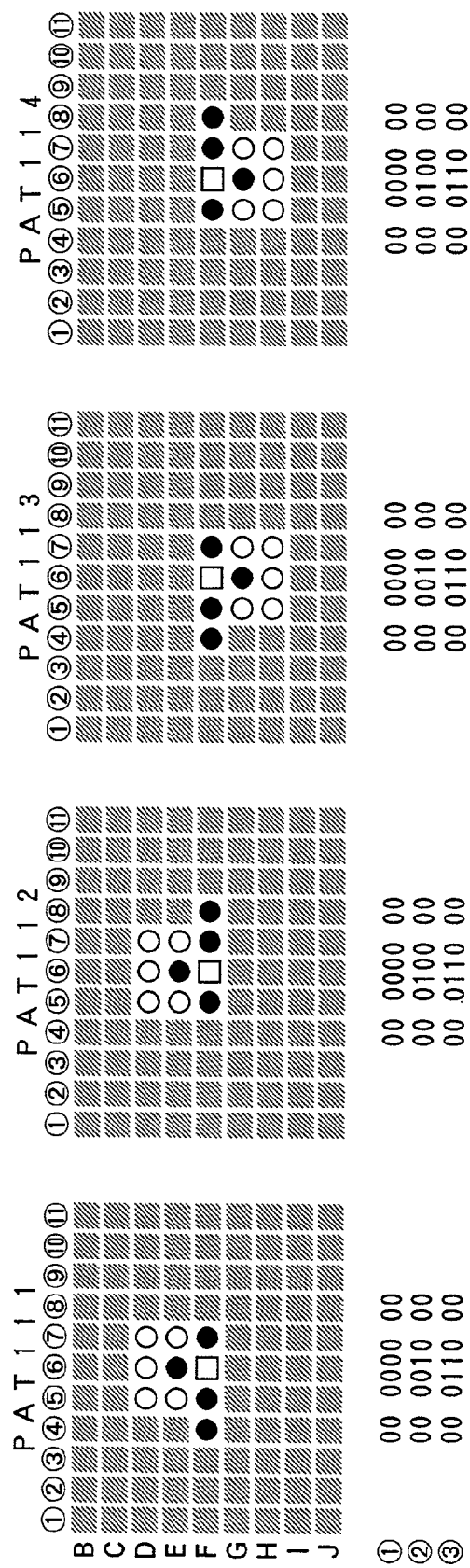
FIG. 36 shows explanatory views (continued to the views in FIG. 35) of second irregularity detection patterns PAT111 to PAT114 used for vertical/horizontal-line detection, and correction output bit strings.
Figure 37:
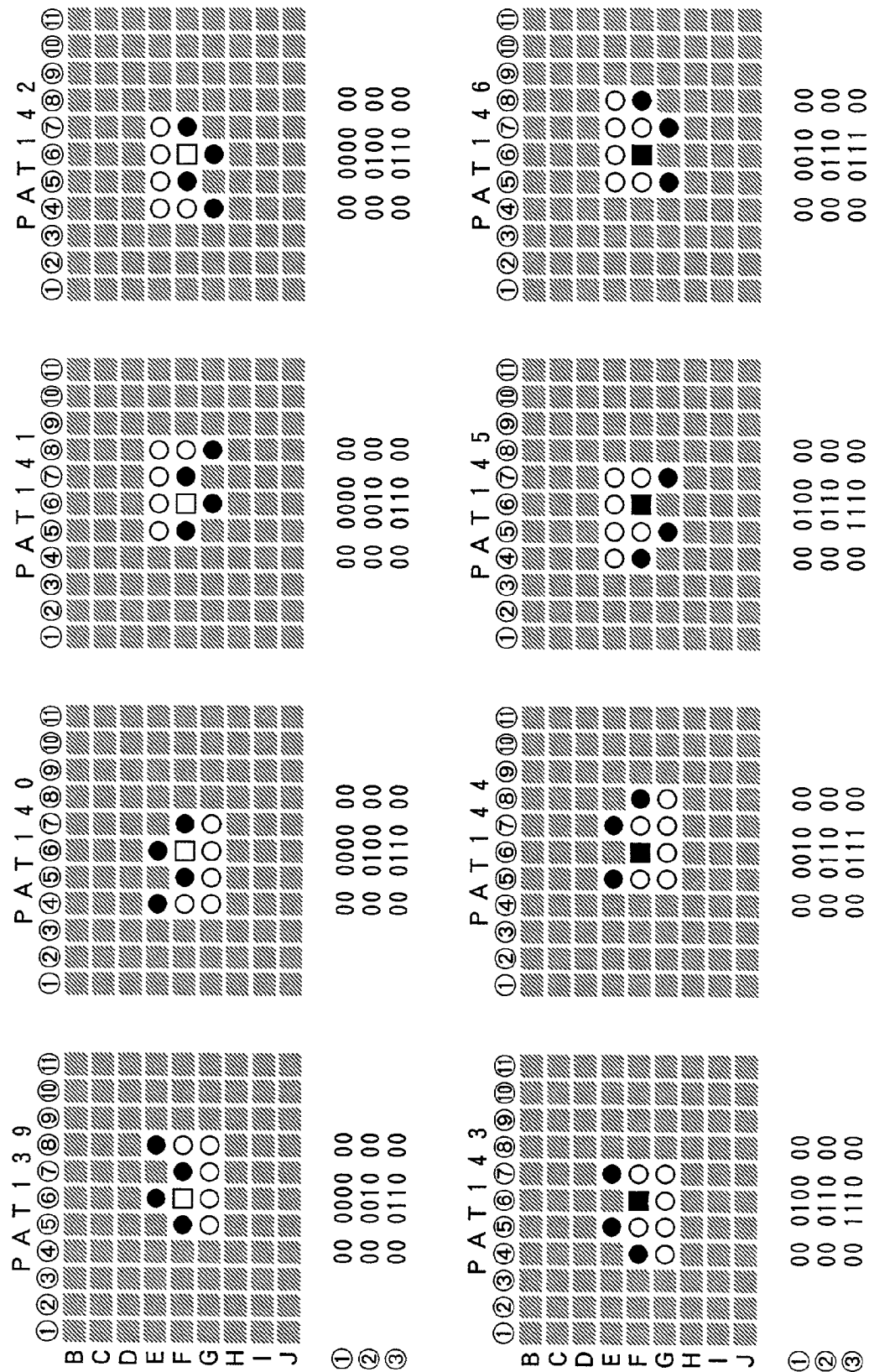
FIG. 37 shows explanatory views (continued to the views in FIG. 36) of second irregularity detection patterns PAT139 to PAT146 used for vertical/horizontal-line detection, and correction output bit strings.
Figure 38:
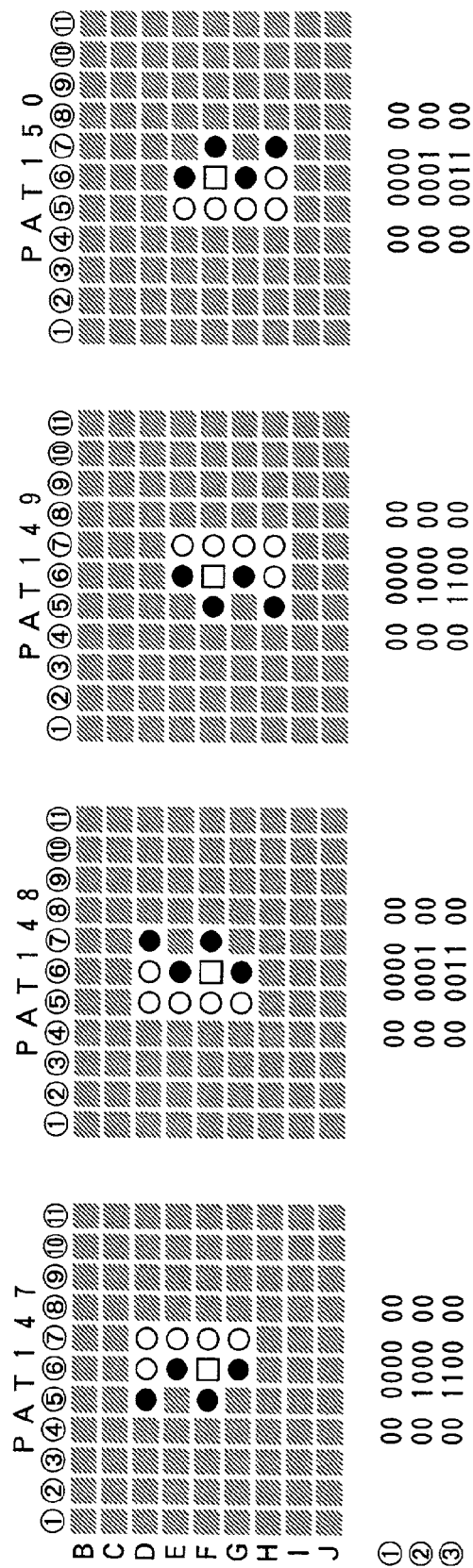
FIG. 38 shows explanatory views (continued to the views in FIG. 37) of second irregularity detection patterns PAT147 to PAT150 used for vertical/horizontal-line detection, and correction output bit strings.
Figure 39A:
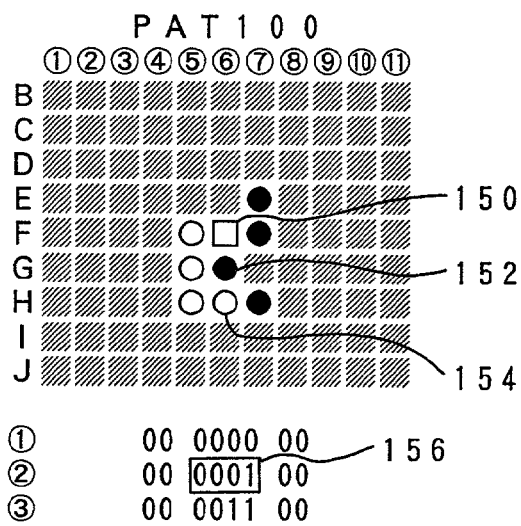
FIGS. 39A to 39C are explanatory views of density-preserving pixel correction values in the group of the patterns PAT100, PAT92, and PAT102 shown in FIGS. 33 and 34.
Figure 39B:
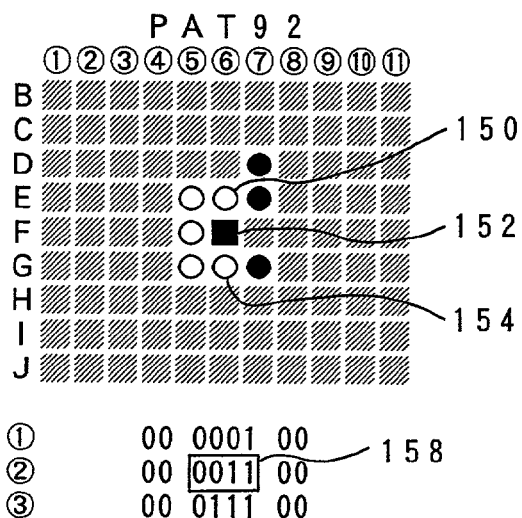
Figure 39C:
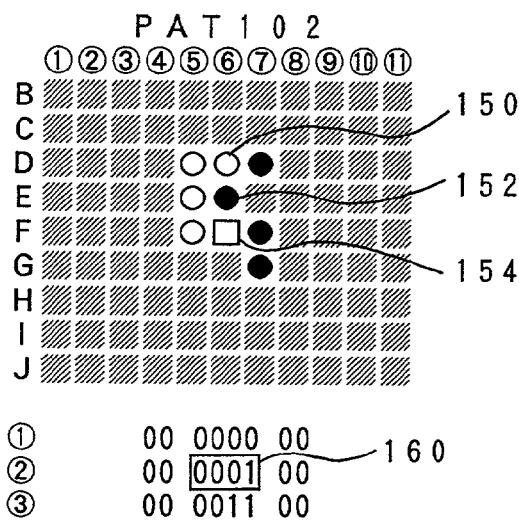

FIGS. 39A to 39C show three example patterns PAT100, PAT92, and PAT102 shown in FIGS. 33 and 34. These patterns are shown to explain density-preserving processing executed to correct vertical and horizontal-line irregularities. The patterns PAT100, PAT92, and PAT102 shown in FIGS. 39A to 39C are different from each other in the matrix positions, but are identical to each other in the irregular portions. Attention is solicited to three pixels—a white pixel 150, a black pixel 152, and a white pixel 154—aligned in the secondary scan direction (vertical direction) at a primary-scan-direction address "6". In the pattern PAT100 shown in FIG. 39A, the white pixel 150 is an attention pixel. In the pattern PAT92 shown in FIG. 39B, the black pixel 152 is an attention pixel. In the pattern PAT102 shown in FIG. 39C, the white pixel 154 is an attention pixel. That is, in FIG. 39A, the white pixel 150 is corrected as the attention pixel; in FIG. 39B, the black pixel 152 is corrected as the attention pixel; and in FIG. 39C, the black pixel 154 is corrected as the attention pixel. In the correction of the three patterns of the white pixel 150, the black pixel 152, and the white pixel 154, the density of the black pixel 152 is reduced by ½, and the ½ density is distributed by ¼ to the white pixel 150 and the white pixel 154 that are positioned at two sides of the black pixel 152. For example, when the above cases are considered with reference to the linear characteristics and the LD-output data (2) as examples, the white pixel 150, that is, the attention pixel in FIG. 39A, is given '0001' as an LD-output data 156. In this case, a ¼ density is allocated, and the position in the ¼-size pixel is controlled to the side of the black pixels aligned on the line of the primary-scan-direction position (7). For the black pixel 152, which is the attention pixel in FIG. 39B, the density is reduced by ½; and the density represented by '0011' as in an LD-output data 158 and the position are controlled. Furthermore, for the white pixel 154, which is the attention pixel in FIG. 39C, similarly to the white pixel 150 in FIG. 39A, a ¼ density is allocated; and the density represented by '0001' as in an LD-output data 160 and the position are controlled. As a result, the density of the three pixels 150, 152, and 154 (in FIGS. 39A to 39C) corrected through the smoothing processing becomes equal to "¼+½+¼=1", whereas the density of the three pixels before the smoothing processing is performed is "0+1+0=1", and these densities are preserved. Thus, even when smoothing processing is performed, irregularities are smoothed, but no variation in the density occurs overall in the pixels. Thus, density-preservation pattern combinations can be established, and examples thereof are shown in FIG. 40 for the patterns shown in FIGS. 33 and 34.

FIGS. 41A to 41C show three example thin-line-irregularity detection patterns PAT151 to PAT153. Each of these example patterns has an area of 3×6 pixels ((three primary-scan-direction pixels)×(six secondary-scan-direction pixels)) in which one black pixel is omitted from a line of black pixels sandwiched by lines of white pixels.

In the patter PAT151, a white pixel in the position wherefrom the black pixel is omitted is an attention pixel. In each of the patterns PAT152 and PAT153, a black pixel that is located in the position wherefrom the same white pixel as above is omitted and that is adjacent to a white pixel is an attention pixel. Also with LD-output data, that is, correction values, for smoothing irregularities of the attention pixel in the individual case, similarly to the case of the irregularity-smoothing processing shown in FIG. 32, correction is performed so that the density is preserved. That is, the density of the black pixels positioned on two sides of the white pixel omitted in the black-pixel string forming a thin line is reduced to ¾, and the ¼ densities are added to the white pixels from the two sides to thereby correct the density to ½. The slanting-line-patchiness detection pattern is similarly formed of six primary-scan-direction pixels for the horizontal thin line and three secondary-scan-direction pixels. As described above, FIGS. 41A to 41C show the example cases where one of the black pixels constituting the thin line is omitted to be converted to the white pixel. However, different patterns are also prepared, including those in which two continuous black pixels are omitted and those in which black pixels are alternately omitted.

(Smoothing Processing for Isolated Pixels)

Figure 42A:
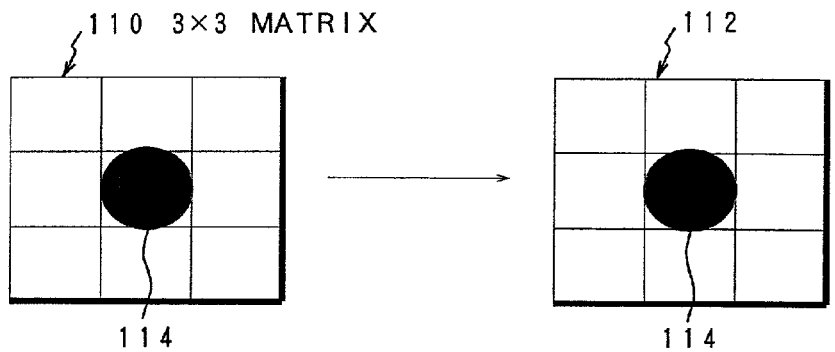
FIGS. 42A to 42C are explanatory views showing isolated-pixel detection by a third image-quality corrector unit shown in FIGS. 17A and 17B and variance correction to peripheral pixels.
Figure 42B:
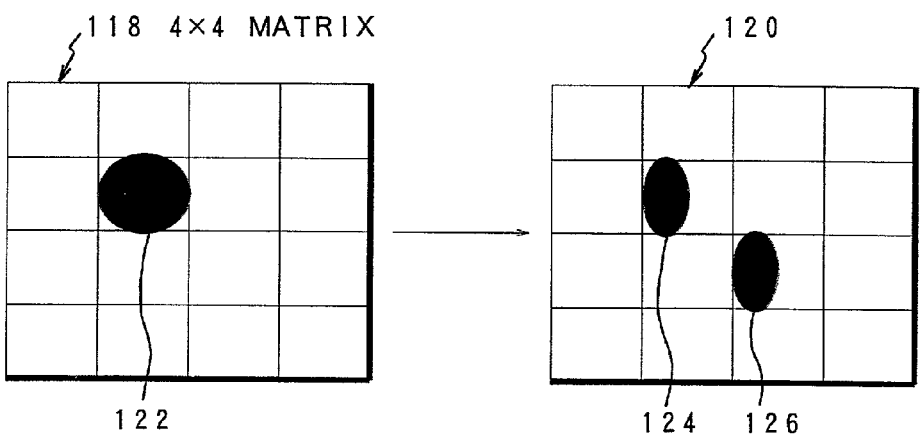
Figure 42C:
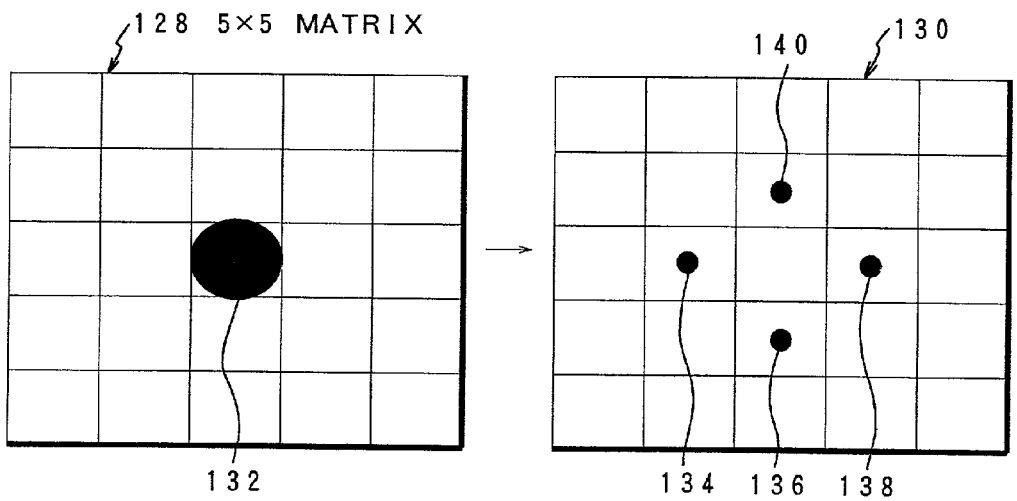
Figure 45:
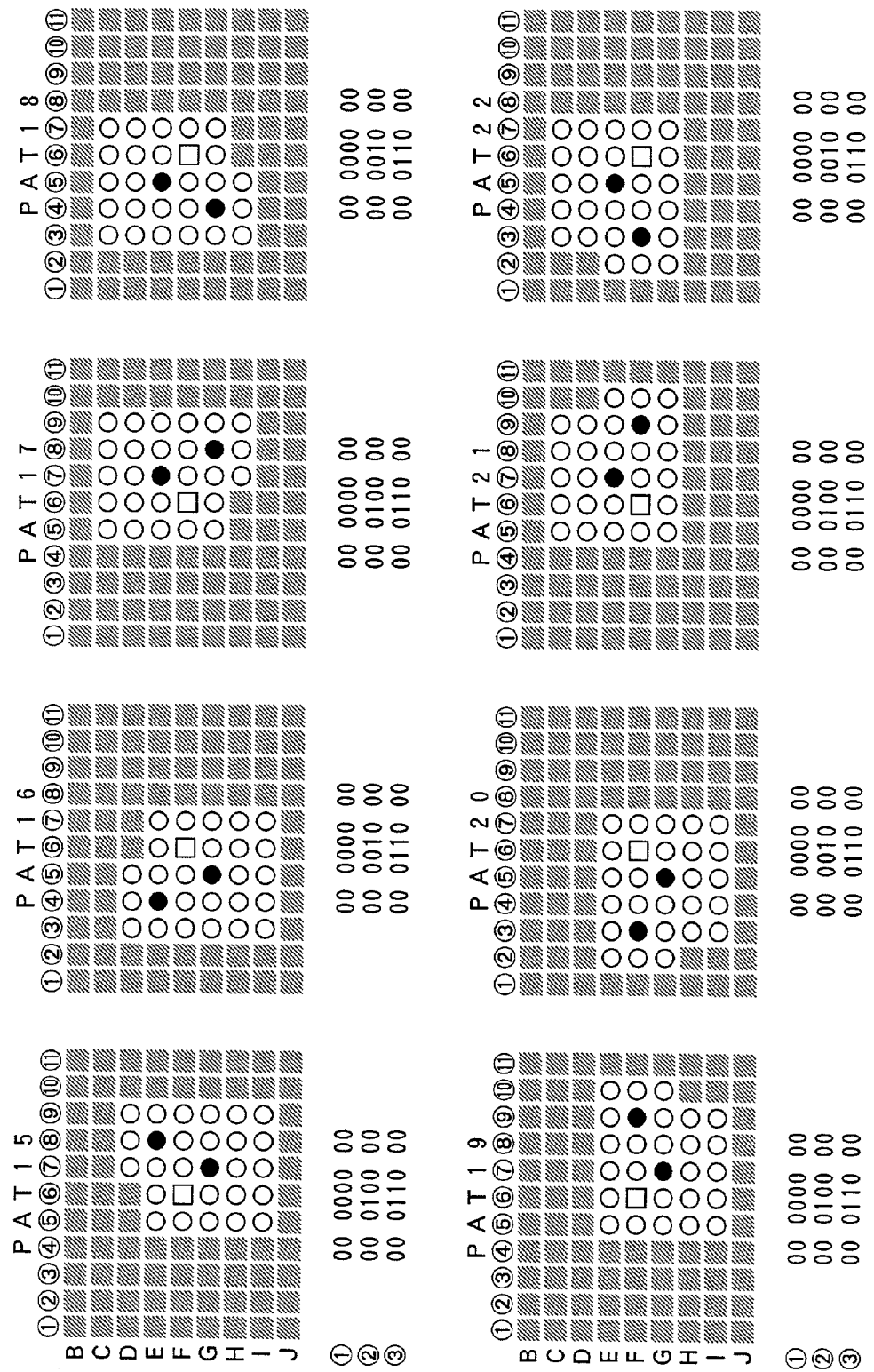
FIG. 45 shows explanatory views (continued to the views in FIG. 44) of isolated-pixel-detection patterns PAT15 to PAT22 and correction output bit strings.
Figure 46:
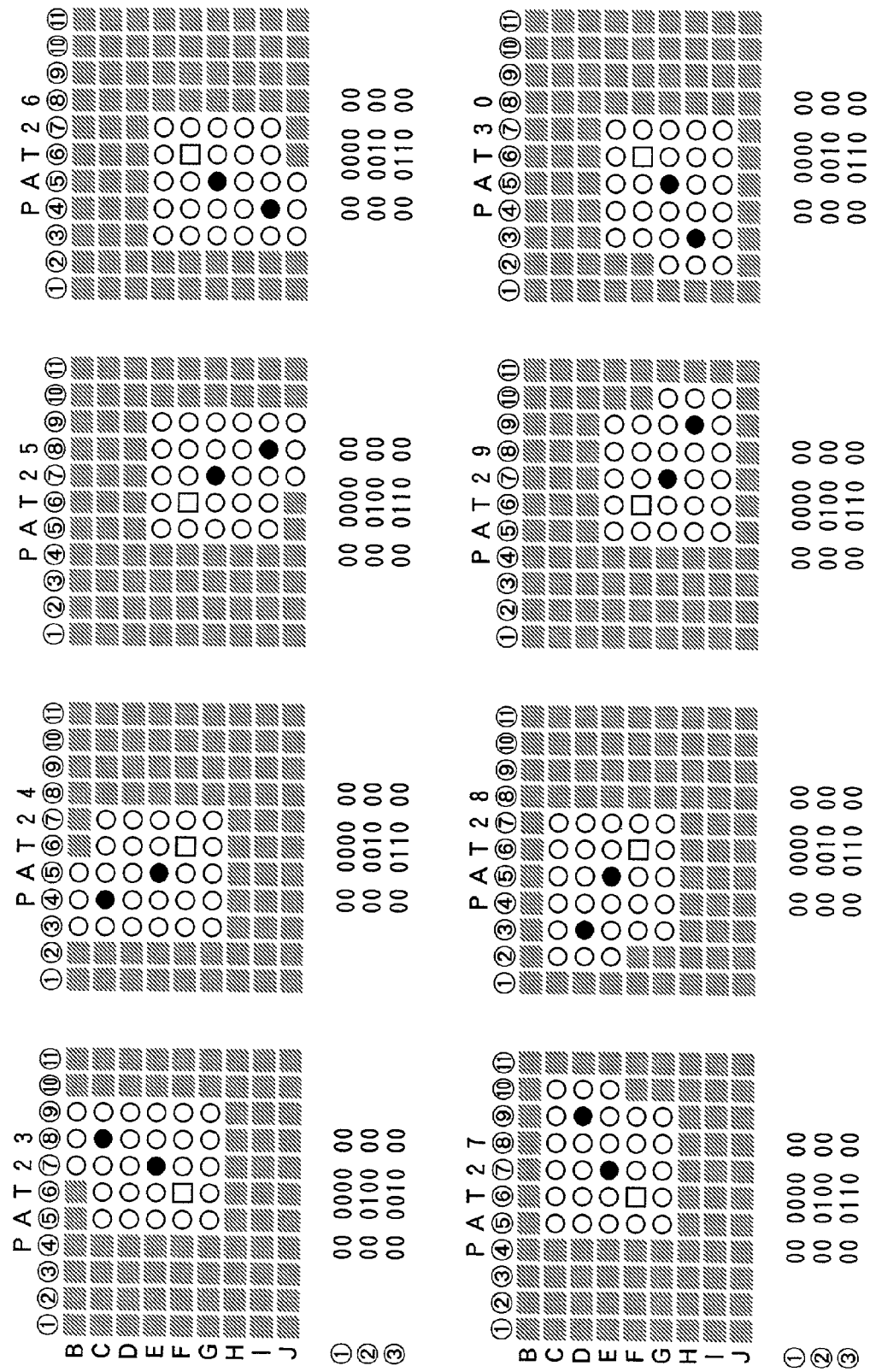
FIG. 46 shows explanatory views (continued to the views in FIG. 45) of isolated-pixel-detection patterns PAT23 to PAT30 and correction output bit strings.
Figure 47:
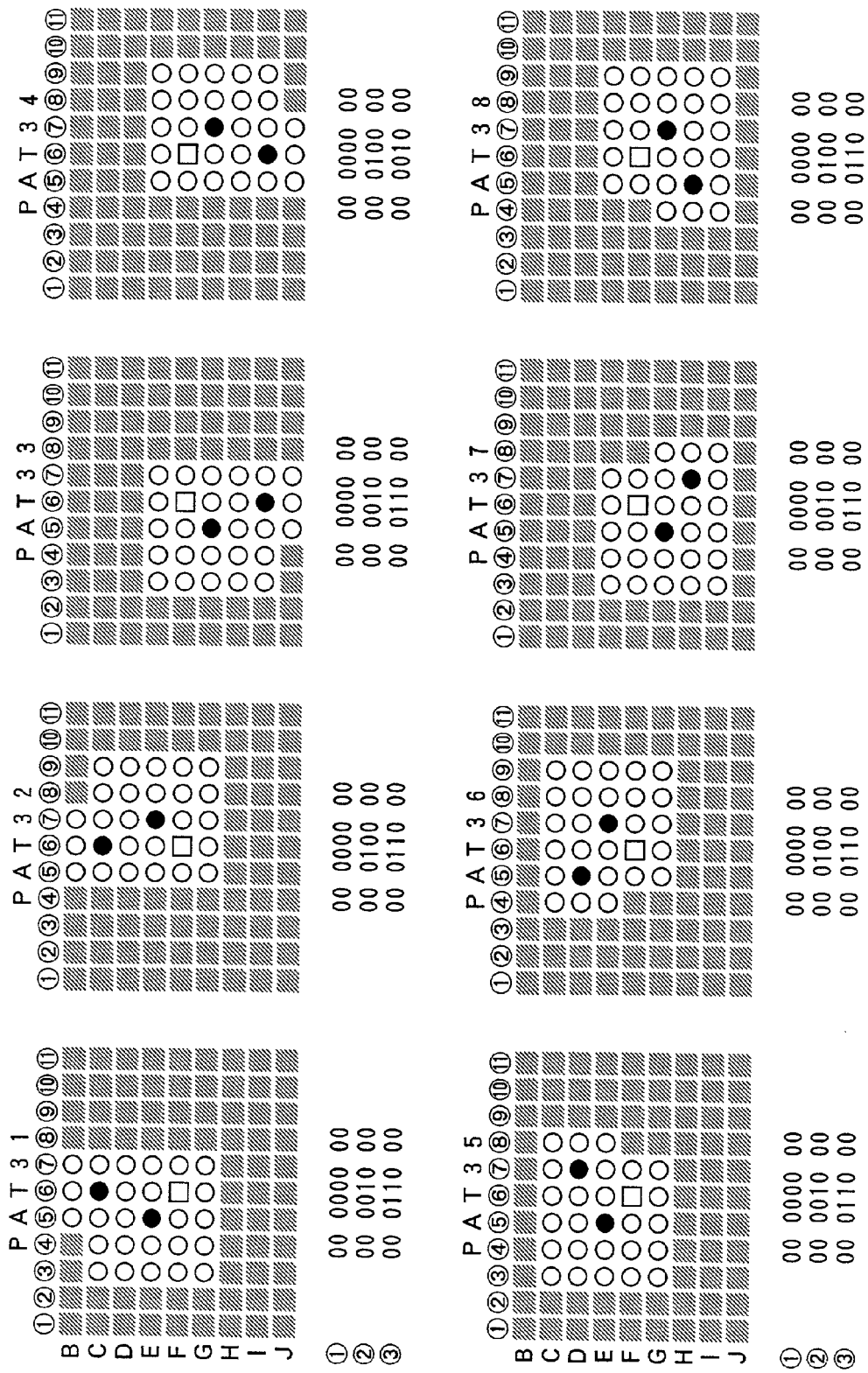
FIG. 47 shows explanatory views (continued to the views in FIG. 46) of isolated-pixel-detection patterns PAT31 to PAT38 and correction output bit strings.
Figure 48:
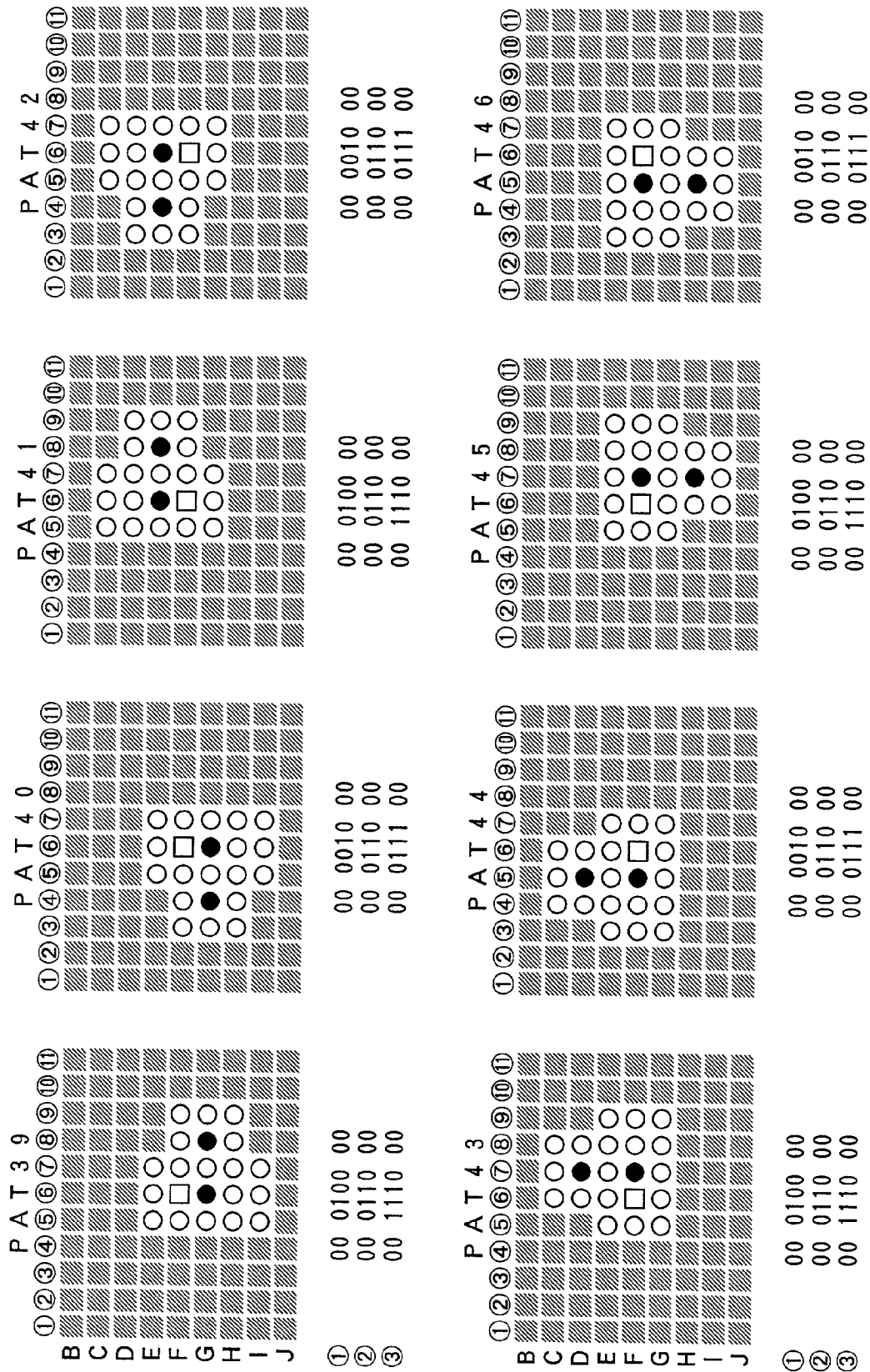
FIG. 48 shows explanatory views (continued to the views in FIG. 47) of isolated-pixel-detection patterns PAT39 to PAT46 and correction output bit strings.
Figure 49:
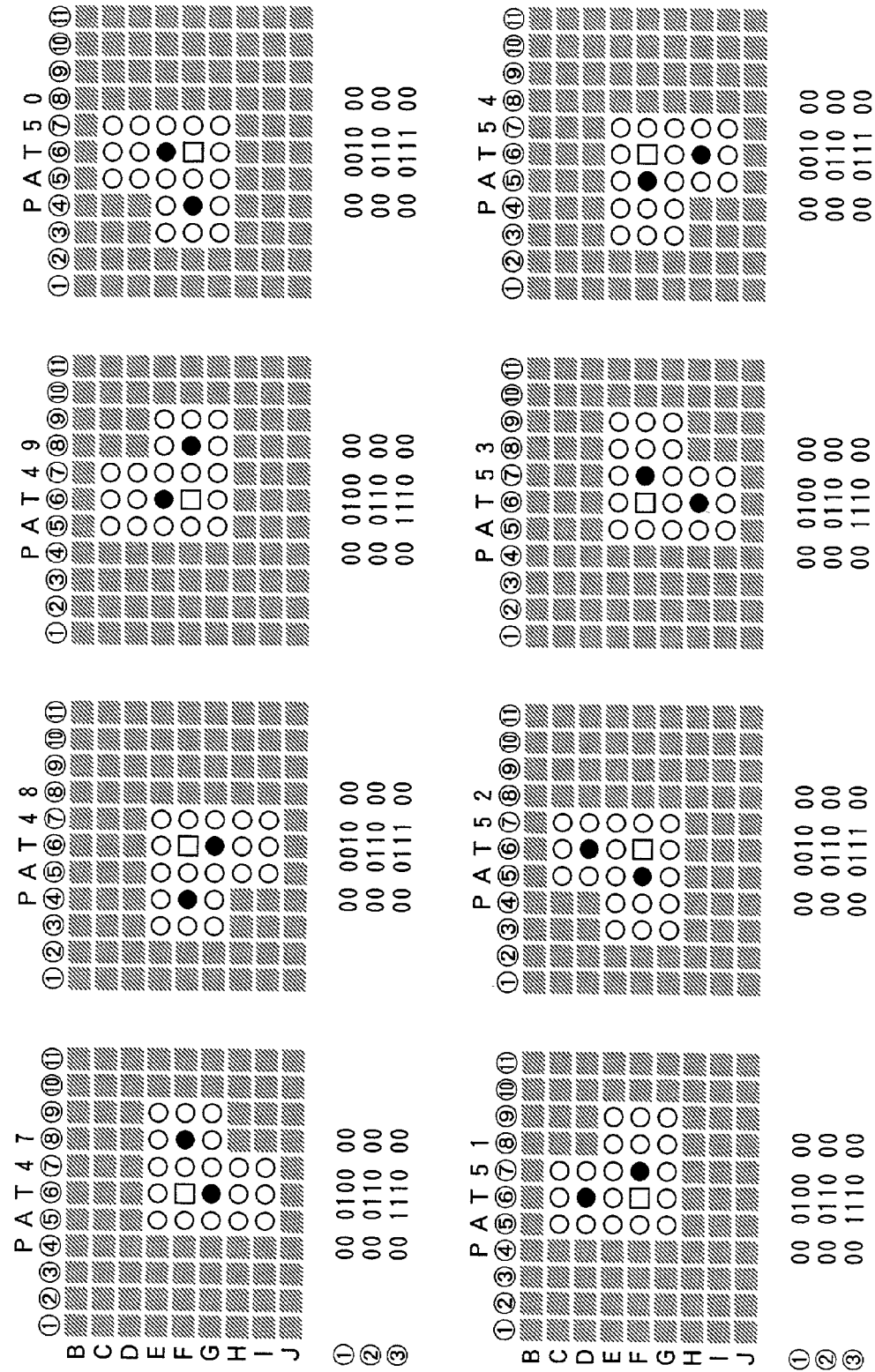
FIG. 49 shows explanatory views (continued to the views in FIG. 48) of isolated-pixel-detection patterns PAT47 to PAT54 and correction output bit strings.
Figure 52:
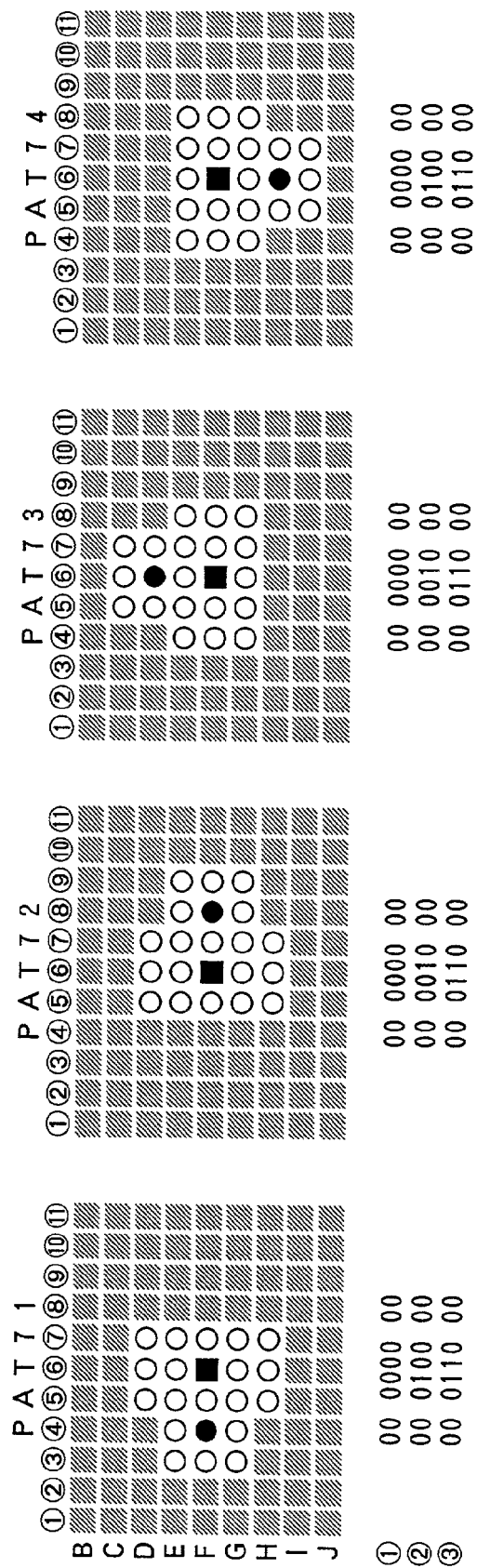
FIG. 52 shows explanatory views (continued to the views in FIG. 51) of isolated-pixel-detection patterns PAT71 to PAT74 and correction output bit strings.

FIGS. 42A to 42C are views for explaining the principle of smoothing processing performed for increasing the image reproductivity by distribution of isolated pixels occurring in relatively bright gray fields, such as photograph backgrounds, represented by binary data generated by the third image-quality corrector unit 84 shown in FIGS. 17A and 17B according to the error-variance method. As shown in FIGS. 42A to 42C, in the smoothing processing, for example, matrixes 110, 118, and 128 having different sizes are prepared. The matrix 110 has the size of 3×3 pixels; the matrix 118 has the size of 4×4 pixels; and the matrix 128 has the size of 5×5 pixels. Thus, the matrixes having the different sizes are prepared, and they are applied in the order of larger sizes to detect isolated pixels. As shown in FIG. 42C, when only a black pixel 132 is positioned in the 5×5 matrix 128, the isolation is highest. As shown in FIG. 42B, when only a black pixel 122 is positioned in the 4×4 matrix 118, the isolation is second highest. As shown in FIG. 42A, when only a black pixel 114 is positioned in the 3×3 matrix 110, the isolation is lowest. In right portions of FIGS. 42A to 42C, there are shown results of correction performed such that the isolated black pixel is reduced in size, and fragments thereof are distributed to peripheral pixels at the time of detection of the isolated pixel. In the distribution thereof to the peripheral pixels of the isolated pixel, the higher the isolation, the greater the number of the peripheral pixels; and concurrently, the higher the isolation, the less the distribution pixel size. Specifically, in the 5×5 matrix 128, as in a corrected matrix 130, the black pixel 132 is reduced in size so that each fragment thereof has a ¼ density, and the fragments are distributed to peripheral pixels as corrected pixels 134, 136, 138, and 140. Also in this case, the predistribution density of the isolated pixel and the postdistribution density of the corrected pixels are preserved. In FIG. 42B, as in a corrected matrix 120, the isolated black pixel 122 detected in the 4×4 matrix 118 is divided into ½ fragments so that the individual ½ fragments have ½ densities, and the fragments are disposed in the original position and in a slantly lower position as corrected pixels 124 and 126. In the 3×3 matrix 110 shown in FIG. 42A in which the isolation is lowest, the black pixel 114 remains, as in a corrected matrix 112.

FIGS. 43 to 52 show practical examples of detection patterns PAT1 to PAT74 created according to the principles shown in FIGS. 42A to 42C for use in smoothing processing that is performed by the third image-quality corrector unit 84 shown in FIGS. 17A and 17B according to distribution of isolated pixels. Among these examples, in each of the patterns PAT1 and PAT3 to PAT6 shown in FIG. 43, a 5×5 matrix is used for an attention pixel, detection is performed for the isolation in the case where one black pixel exists therein, and correction is then performed. In each of the patterns PAT7 to PAT74 shown in FIGS. 44 to 48, a black isolated pixel exists in a 3×3 matrix, and two black pixels exist in a 5×5 matrix.

Figure 53:
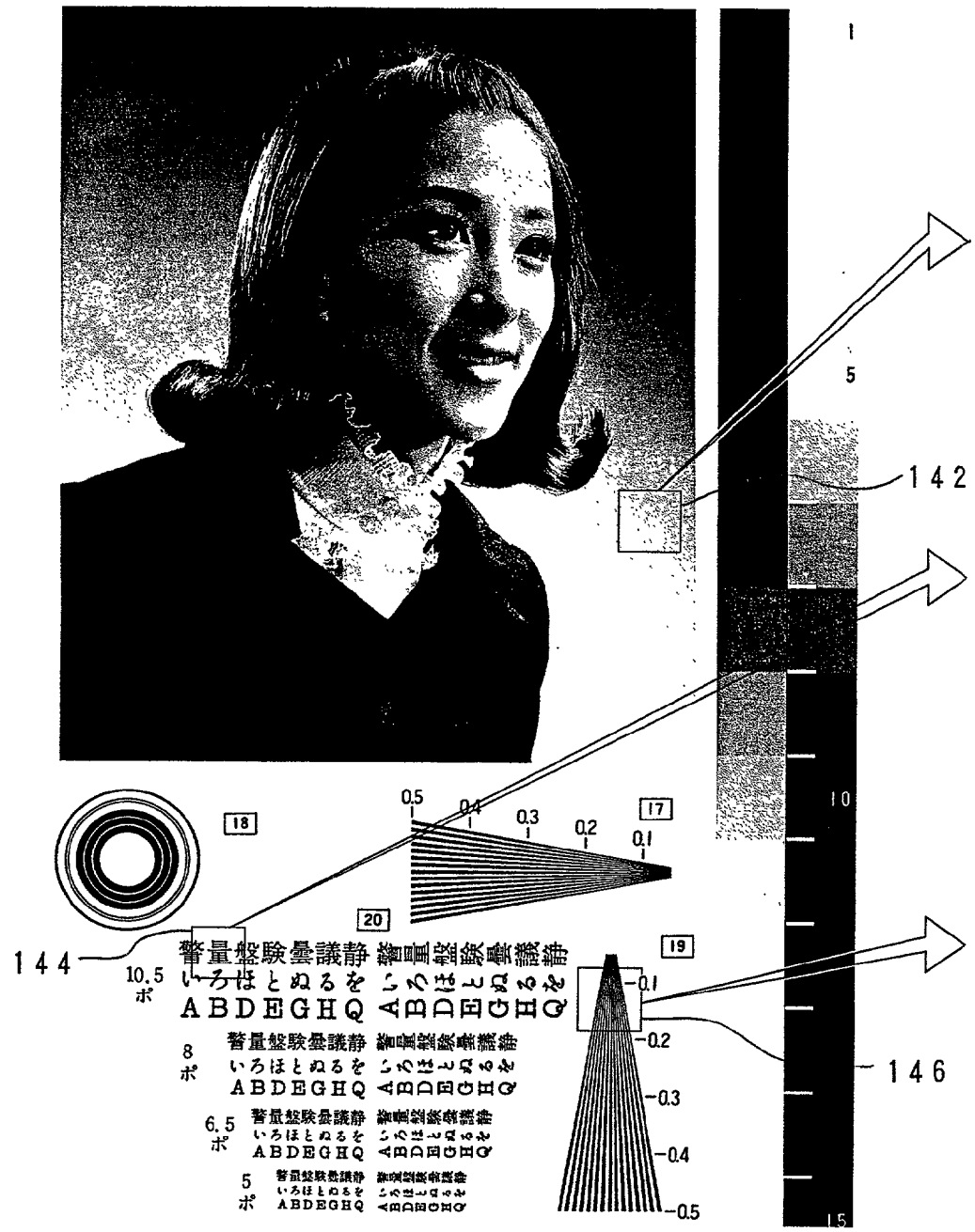
FIG. 53 is an explanatory view of print results of error-variance binary images after smoothing processing performed by the embodiment shown in FIGS. 17A and 17B.

FIG. 53 shows an example printed image. The printed image is obtained such that multivalue data is read (scanned) by the scanner 14 and is thereby converted into binary data according to the error-variance method, the converted binary data is stored in the binary-data storage unit 76 shown in FIGS. 17A and 17B, and smoothing processing according to the present invention is performed. The example printed image includes a halftone photograph, characters, and lines.

FIG. 54 shows comparison printed images 142-1 and 142-2 of light-gray fields in backgrounds in the photograph shown in FIG. 53. The printed image 142-1 was obtained without performing the smoothing processing according to the present invention, whereas the printed image 142-2 was obtained after performing the smoothing processing. In the printed image 142-1, isolated black pixels are scattered, the black pixels are conspicuous to the human eye, and the reproductivity in density of the gray field is proved low. In the printed image 142-2, however, the isolated black pixels, for which the smoothing processing is not performed, are distributed to peripheral portions, thereby proving significant improvement in the reproductivity regarding the density of the bright gray field.

FIG. 55 shows comparison printed images 144-1 and 144-2 of a character portion 144 shown in FIG. 53. The image 144-1 was obtained without performing the smoothing processing according to the present invention, whereas the image 144-2 was obtained after performing the smoothing processing. In the image 144-1, error-variance-method dependent irregularities are caused in the horizontal-line portions of the character. However, in the image 144-2 smoothed according to the invention, the horizontal-line irregularities are minimized, thereby proving improvement in the image quality.

FIG. 56 shows comparison printed images 146-1 and 146-2 of a line portion 146 shown in FIG. 53. The image 146-1 was obtained without performing the smoothing processing according to the present invention, whereas the image 146-2 was obtained after performing the smoothing processing. In the image 146-1, irregularities are caused in the black-white border portions of the lines. However, in the image 146-2 smoothed according to the invention, the border-portion irregularities are minimized, thereby proving improvement in the line image resolution.

OTHER EMBODIMENTS

Figure 57:
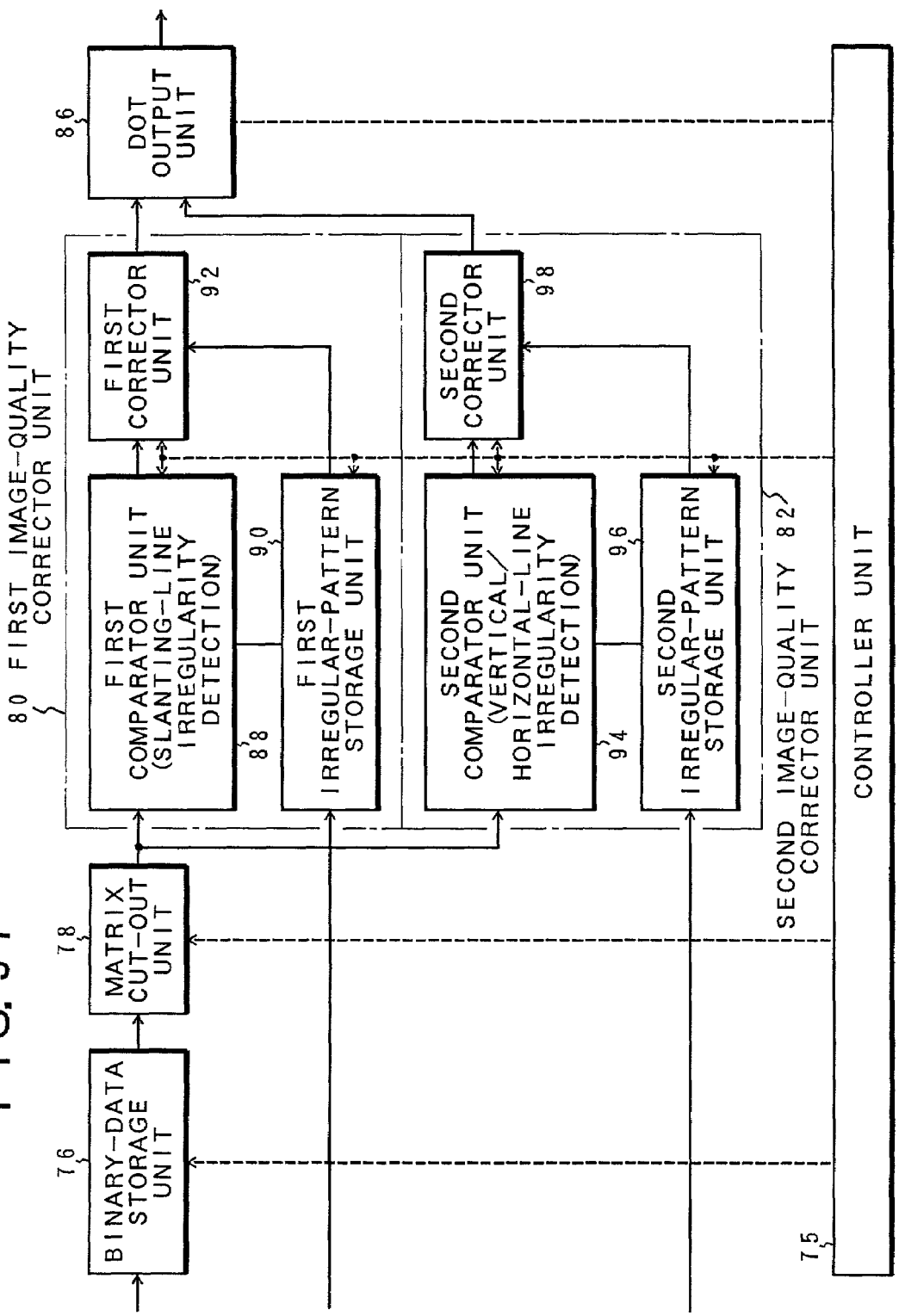
FIG. 57 is a functional schematic view of a second embodiment according to the present invention, in which after detection of vertical and horizontal-line irregularities and thin-line patchiness in binary images according to error variance, smoothing processing is performed.

FIG. 57 is a functional schematic view of a smoothing processor unit 46 according to a second embodiment of the present invention. The smoothing processor unit 46 is realized in the hardware configuration shown in FIG. 15. The second embodiment is configured equivalent to the configuration of the first embodiment shown in FIGS. 17A and 17B from which the third image-quality corrector unit 84 is eliminated. That is, the second embodiment is configured of the first image-quality corrector unit 80 and the second image-quality corrector unit 82 of the first embodiment shown in FIG. 17. Therefore, for binary data obtained according to the error-variance method, the second image-quality corrector unit 82 is used to detect vertical and horizontal-line irregular patterns and thin-line patchy patterns, and performs smoothing processing therefor; however, smoothing processing is not performed by the third image-quality corrector unit 84 shown in FIGS. 17A and 17B according to the isolated-pixel distribution. Therefore, the second embodiment is preferably used to handle binary data that is constituted of line and character image data, but that does not include halftone photographic image data. The first image-quality corrector unit 80 and second image-quality corrector unit 82 according to the second embodiment individually operate in the same manners as those of the first embodiment shown in FIGS. 17A and 17B.

Figure 58A:
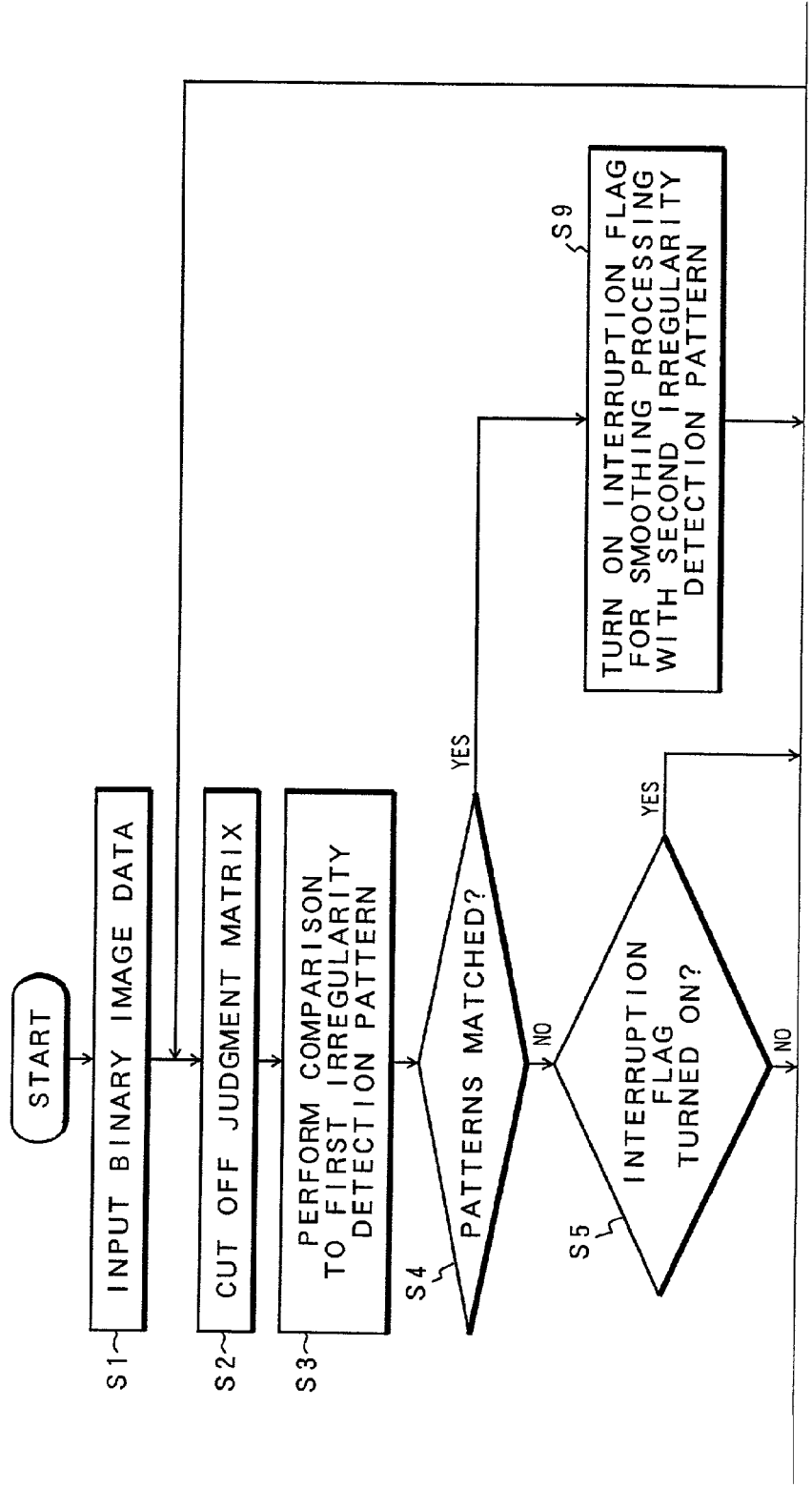
FIGS. 58A and 58B are flowcharts of smoothing processing performed by the second embodiment shown in FIG. 57.
Figure 58B:
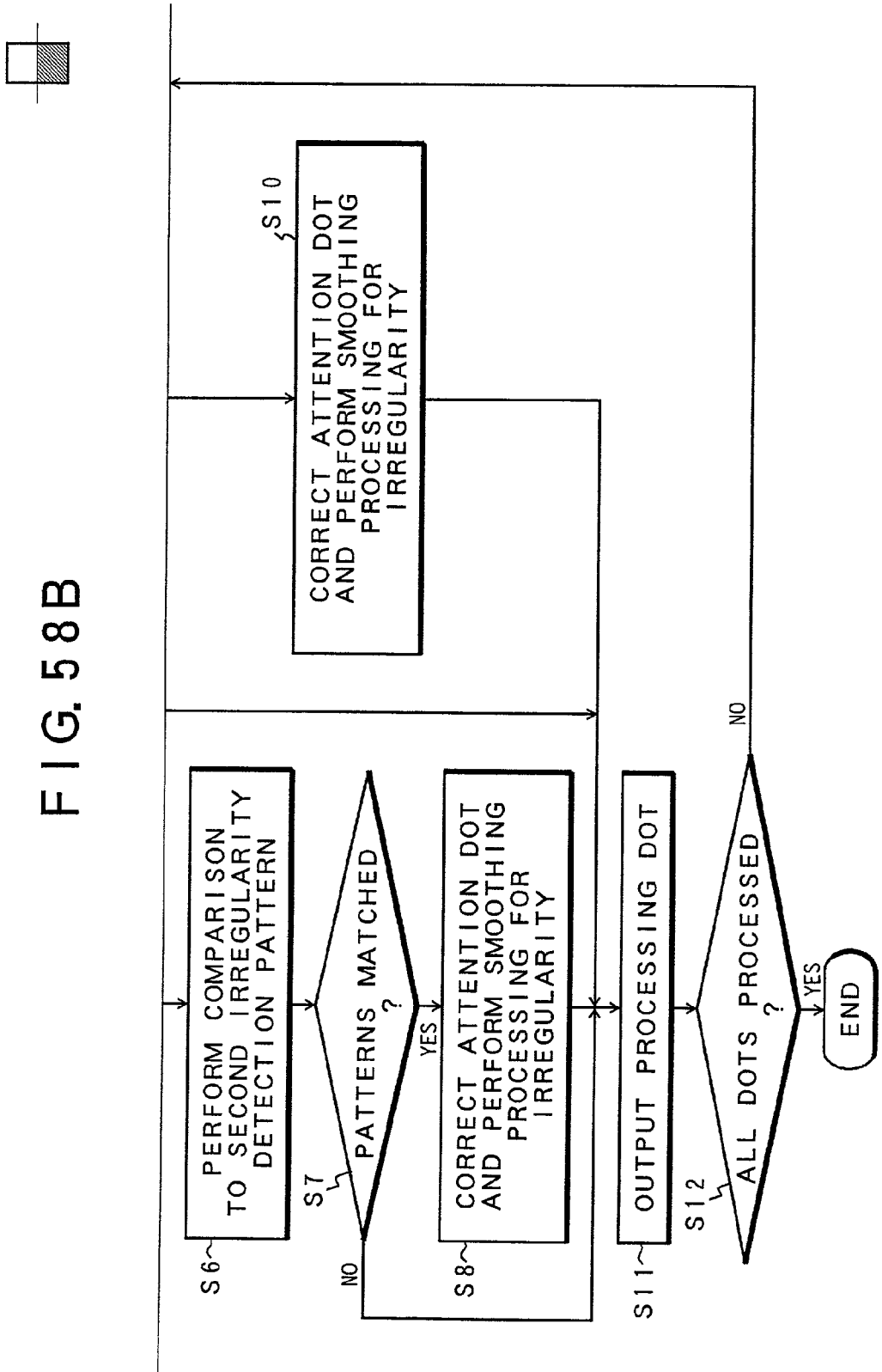

FIGS. 58A and 58B are flowcharts of smoothing processing performed by the second embodiment shown in FIG. 57. The flowchart shown in FIGS. 58A and 58B is equivalent to the flowchart shown in FIGS. 18A and 18B for the smoothing processing according to the first embodiment. However, it excludes steps S9 and S11 for detecting isolated pixels and performing variance correction therefor.

Figure 59:
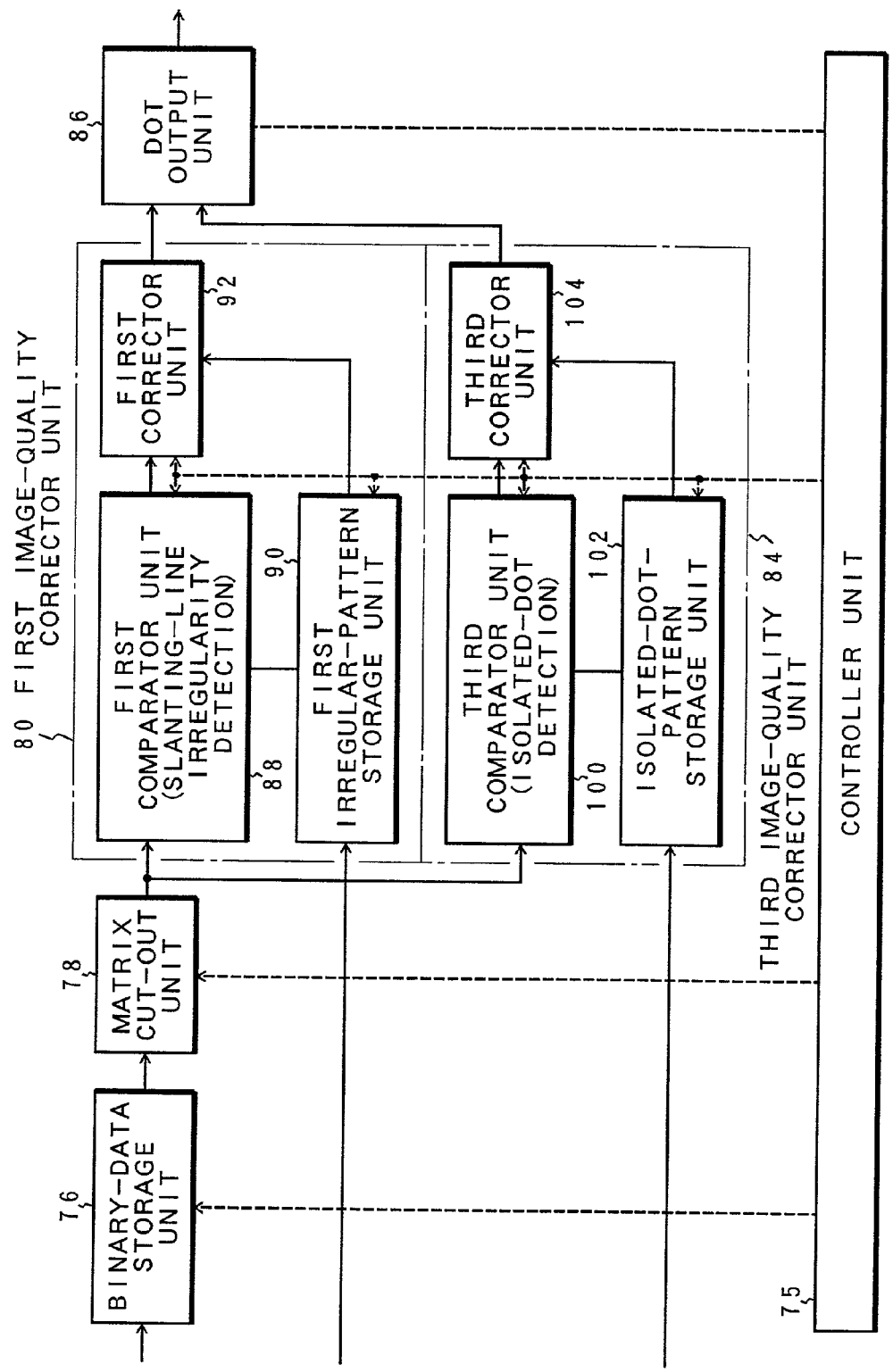
FIG. 59 is a functional schematic view of a third embodiment according to the present invention, in which after detection of isolated pixels according to error variance, the isolated pixels are distributed to the peripheral portions, and smoothing processing is then performed.

FIG. 59 shows a third embodiment of the present invention. The third embodiment is characterized by having a configuration equivalent to that first embodiment shown in FIGS. 17A and 17B from which the second image-quality corrector unit 82 is eliminated. That is, the third embodiment is equivalent to the first embodiment configured of the first image-quality corrector unit 80 and the third image-quality corrector unit 84. Therefore, for binary data obtained according to the error-variance method, the third embodiment performs only smoothing processing by using the third image-quality corrector unit 84 for detecting isolated pixels in gray fields, such as photograph backgrounds, and for distributing the pixels to peripheral portions. Therefore, the third embodiment is suitable to smoothing processing for binary data obtained through the conversion of data representing halftone images, such as photographs, according to the error variance. The first image-quality corrector unit 80 and the third image-quality corrector unit 84 are the same in detail as those of the first embodiment shown in FIGS. 17A and 17B.

Figure 60A:
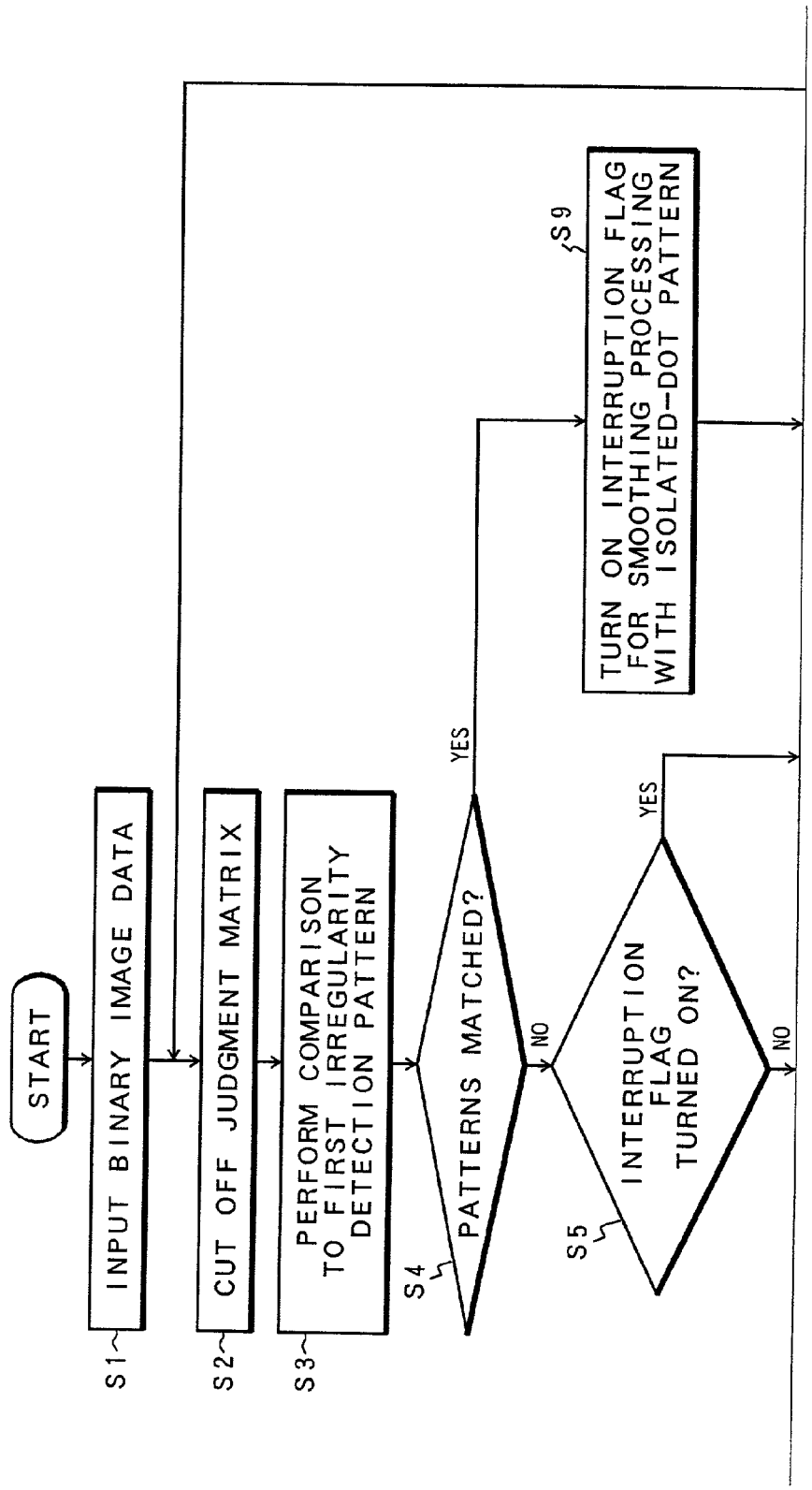
FIGS. 60A and 60B are flowcharts of the smoothing processing performed by the second embodiment shown in FIG. 59.
Figure 60B:
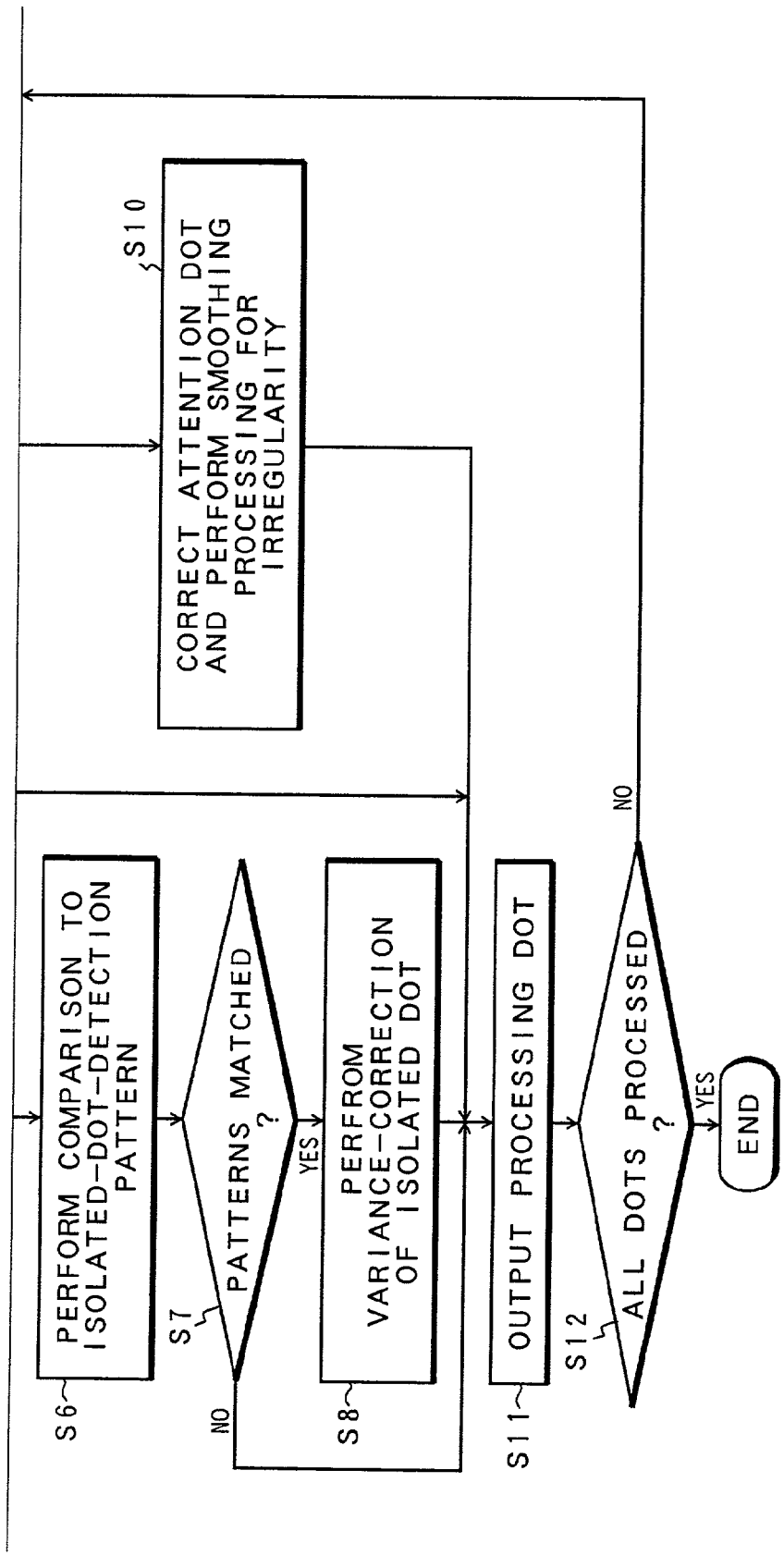

FIGS. 60A and 60B are flowcharts of the smoothing processing performed by the second embodiment shown in FIG. 59. This flowchart is equivalent to the flowchart shown in FIGS. 18A and 18B for the smoothing processing according to the first embodiment. However, it excludes steps S6 to S8 corresponding to the second image-quality corrector unit 82. Another difference is that the interruption flag in step 9 that functions when pattern-matching with one of the first irregularity detection patterns is detected is used as an interruption flag for interrupting smoothing processing performed according to isolated-pixel patterns.

(Image-Size Reduction by Pixel-Removal Method)

Figure 61:
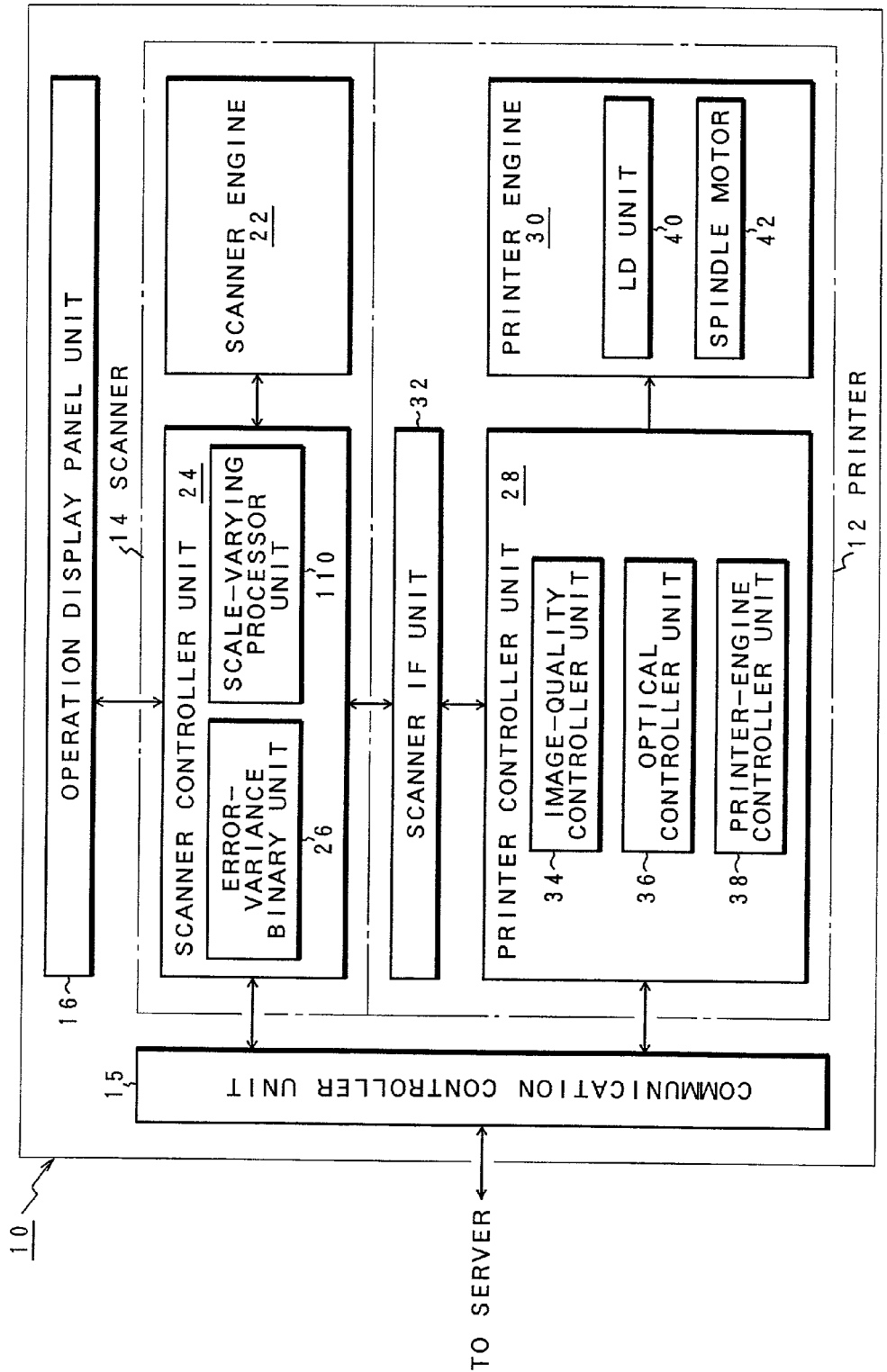
FIG. 61 is a schematic view of still another embodiment of an interior configuration of the composite-image printing apparatus shown in FIG. 9.

FIG. 61 is a schematic view of still another embodiment of an interior configuration of the composite-image printing apparatus shown in FIG. 6, to which the printer and the printing method of the present invention are applied. Basically, the interior configuration of the composite-image printing apparatus is the same as that shown in FIG. 9. The present embodiment has features in a scale-varying processor unit 110 provided in a scanner controller unit 24 of the scanner 14. The scale-varying processor unit 110 has a scale-varying mechanism for varying the size of an original image scanned by a scanner engine 22 to an image size according to a user-specified scale factor. For example, the size of an original image scanned by the scanner engine 22 is reduced by the scale-varying processor unit 110 to a 90% image size; thereafter, the image thus reduced in size is binary-coded, and is then transferred to a printer 12. Basically, a scale-varying algorithm employed in the scale-varying processor unit 110 operates such that after an original image scanned by the scanner engine 22 is magnified to a predetermined size at a predetermined scale-magnification factor (which hereinbelow will be simply referred to as a "magnification factor"), the magnified image is reduced to an image size specified by a user for the original image. In this case, the original image is magnified through pixel-interpolation processing according to the magnification factor. The reduction conversion from the magnified image to a target reduced image is performed according to pixel-removal processing.

While the present embodiment has features in the scale-varying processor unit 110, it is the same as the embodiment shown in FIG. 9 for others. Specifically, an error-variance binary unit 26 of the scanner controller unit 24 is the same as that described in the embodiment shown in FIGS. 10A, 10B to 13. An image-quality controller unit 34 of a printer controller unit 28 is the same as that described in detail with reference to FIGS. 14 to 60. The present embodiment is characterized as follows. Also for an image reduced (in size) by the scale-varying processor unit 110 (provided in the scanner controller unit 24) through the pixel-removal processing from an original-image size to a predetermined size, binary processing is performed for a reduced gradation image reduced by the error-variance binary unit 26 through the removal processing performed according to an error-variance binary-coding algorithm. Then, the binary image generated according to the error variance method is transferred to the printer controller unit 28. Thereby, smoothing processing is performed to compensate for omitted portions of thin lines and white-void lines that were caused in the removal processing performed for image-size reduction, vertical and horizontal-line jaggy portions that are caused in the removal processing, and vertical and horizontal-edge jaggy portions caused in the removal processing.

Figure 62:
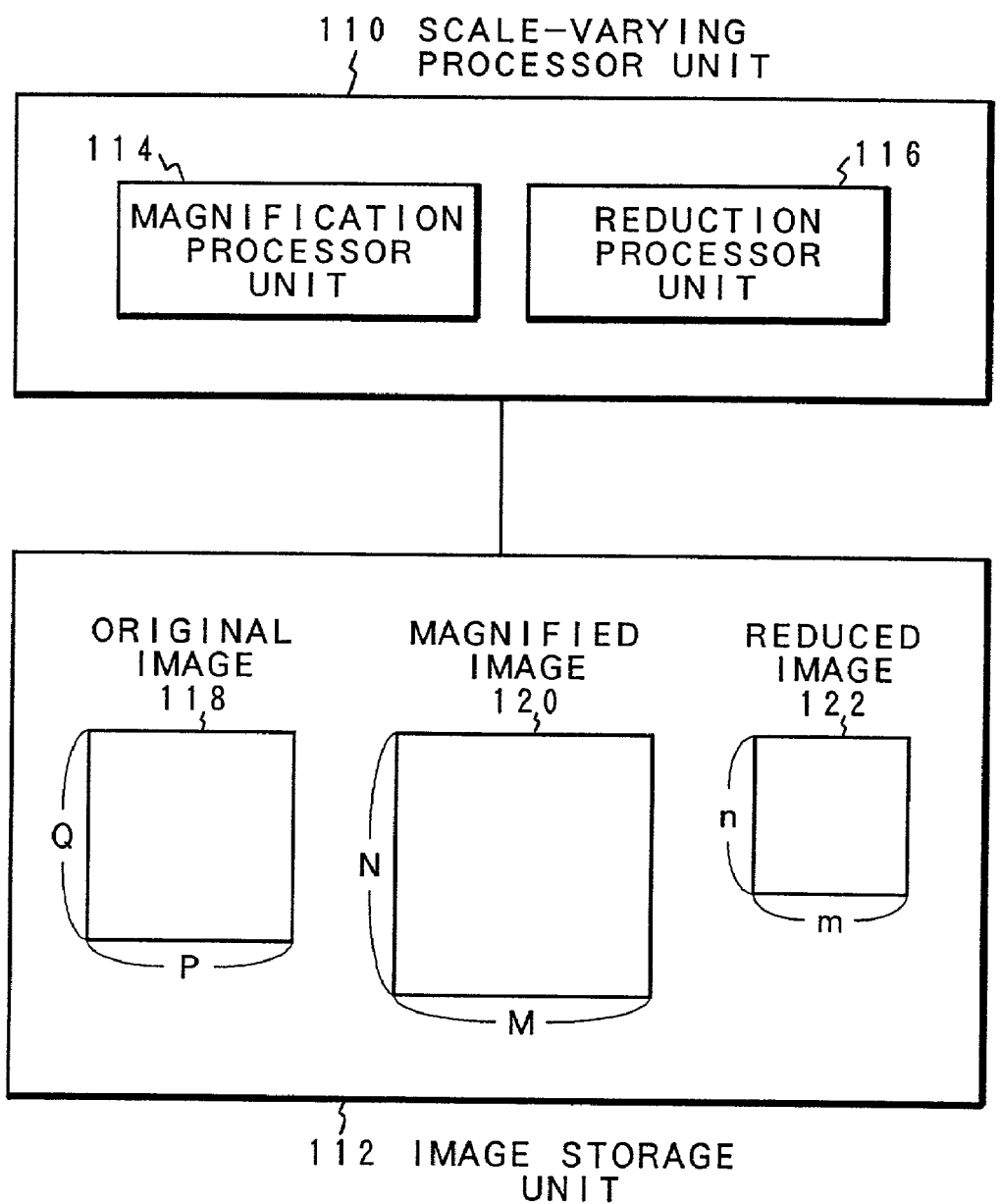
FIG. 62 is a functional schematic view of a scale-varying processor unit shown in FIG. 61.

FIG. 62 is a functional schematic view of the scale-varying processor unit 110 provided in the scanner controller unit 24 shown in FIG. 61. In FIG. 62, the scale-varying processor unit 110 has a scale-varying processor unit 110, a magnification processor unit 114, and a reduction processor unit 116. Data of images processed by the scale-varying processor unit 110 is stored in image storage 112. The image storage 112 stores the data of an original image 118 scanned by the scanner engine 22 shown in FIG. 61, a magnified image 120 magnified through pixel-interpolation, and a reduced image 122 reduced through pixel-removal from the magnified image 120. The magnification processor unit 114 converts the original image 118 into the magnified image 120 by using a predetermined magnification factor. For example, the original image 118 has the size of (P×Q) pixels, and the magnified image 120 has the size of (M×N) pixels corresponding to a specified scale-magnification factor (magnification factor). The reduced image 122 has the size of (m×n) pixels proportionally reduced at a predetermined reduction ratio. When the magnification factor for magnifying from the original image 118 to magnified image 120 is represented by K1, and the reduction factor for reduction from the magnified image 120 to the reduced image 122 is represented by K2, a conversion factor K0 for converting from the original image 118 to the reduced image 122 is expressed by $$K0 = K1 \times K2.$$

Ordinarily, the magnification factor K1 is larger than "1", the reduction factor K2 is less than "1", and the original image 118 is reduced in the scanner 14. Therefore, the conversion factor K0 for conversion from the original image 118 to the reduced image 122 has the ratio of, for example, 90%.

Figure 63:
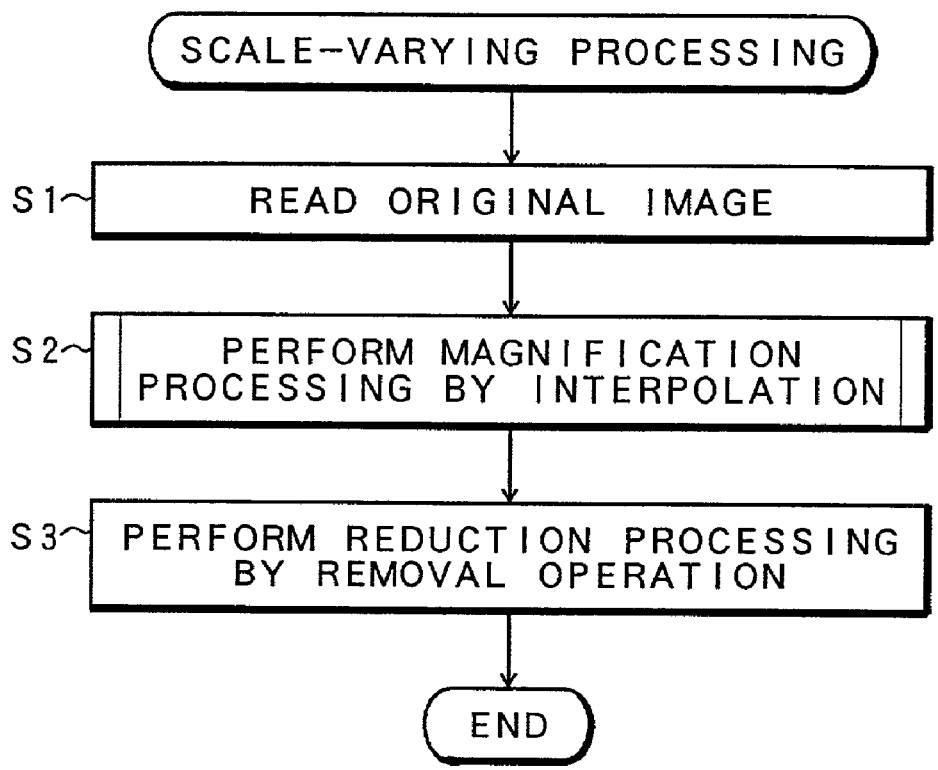
FIG. 63 is a flowchart of scale-varying processing performed by the scale-varying processor unit shown in FIG. 62.

FIG. 63 is an outline flowchart of scale-varying processing performed by the scale-varying processor unit 110 shown in FIG. 62. In the scale-varying processing, an original image is read in step S1, and magnification processing is performed in step S2 according to pixel-interpolation. After completion of the magnification processing, scale-reduction processing is performed through pixel-removal from the original image in step S3.

Figure 64A:
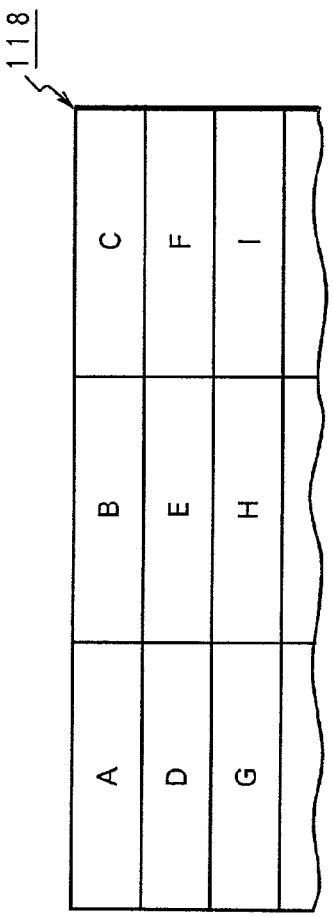
FIGS. 64A and 64B are explanatory views of magnification processing according to pixel-interpolation shown in FIG. 63.
Figure 64B:
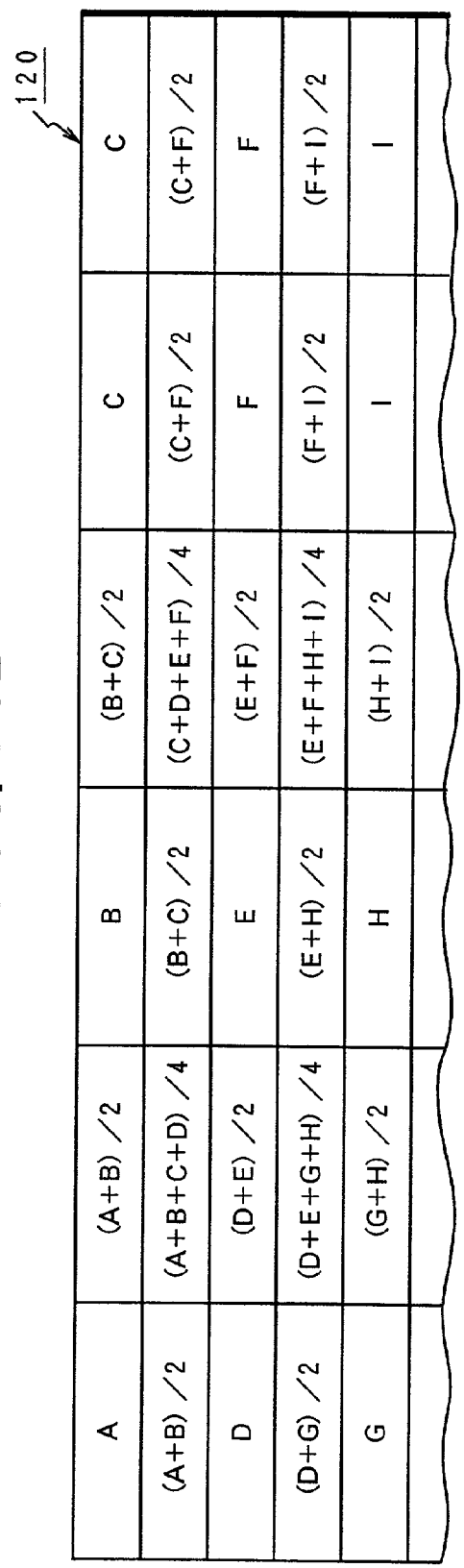

FIGS. 64A and 64B are explanatory views of magnification processing according to the pixel-interpolation (shown in FIG. 63) performed on an original image. The example shows a case where an original image 118 shown in FIG. 64A is magnified to a magnified image 120 in FIG. 64B according to pixel-interpolation; and to simplify description, in the example case, the magnification factor K1 is set as K1=2 (=200%).

In the original image 118 shown in FIG. 64A, pixels represented by rectangular boxes individually have gradation values A, B, C, . . . . The gradation value assumes, for example, a value ranged from 0 to 255. When the size of the original image 118 is doubled, as the magnified image 120 in FIG. 64B, new pixels are interpolated between pixels of the original image 118 to magnify the size thereof. For the gradation value of the pixel interpolated between the pixels of the original image 118, a matrix with the interpolated pixel in the center, such as a 3×3 matrix is used, a mean value of gradation values of the pixels of the original image 118 that are included in the matrix is used as a gradation value of the interpolated pixel. For example, in the case of an interpolated pixel between the gradation values A and B, since original-image pixels having the gradation values A and B are included in the 3×3 matrix with the interpolated pixel in the center, (A+B)/2 is used as the mean value thereof. In the case of a pixel therebelow, when the 3×3 matrix is used, since four original-image pixels individually having the gradation values A to B, (A+B+C+E)/4 is used as a gradation value of the interpolated pixels. For other interpolated pixels, similarly to the above, 3×3 matrixes are defined to thereby obtain gradation values of interpolated pixels. As a matter of course, the sizes of the individual matrixes to be used for the calculation of gradation values of the interpolated pixels can appropriately be determined depending on the necessity.

Figure 65B:
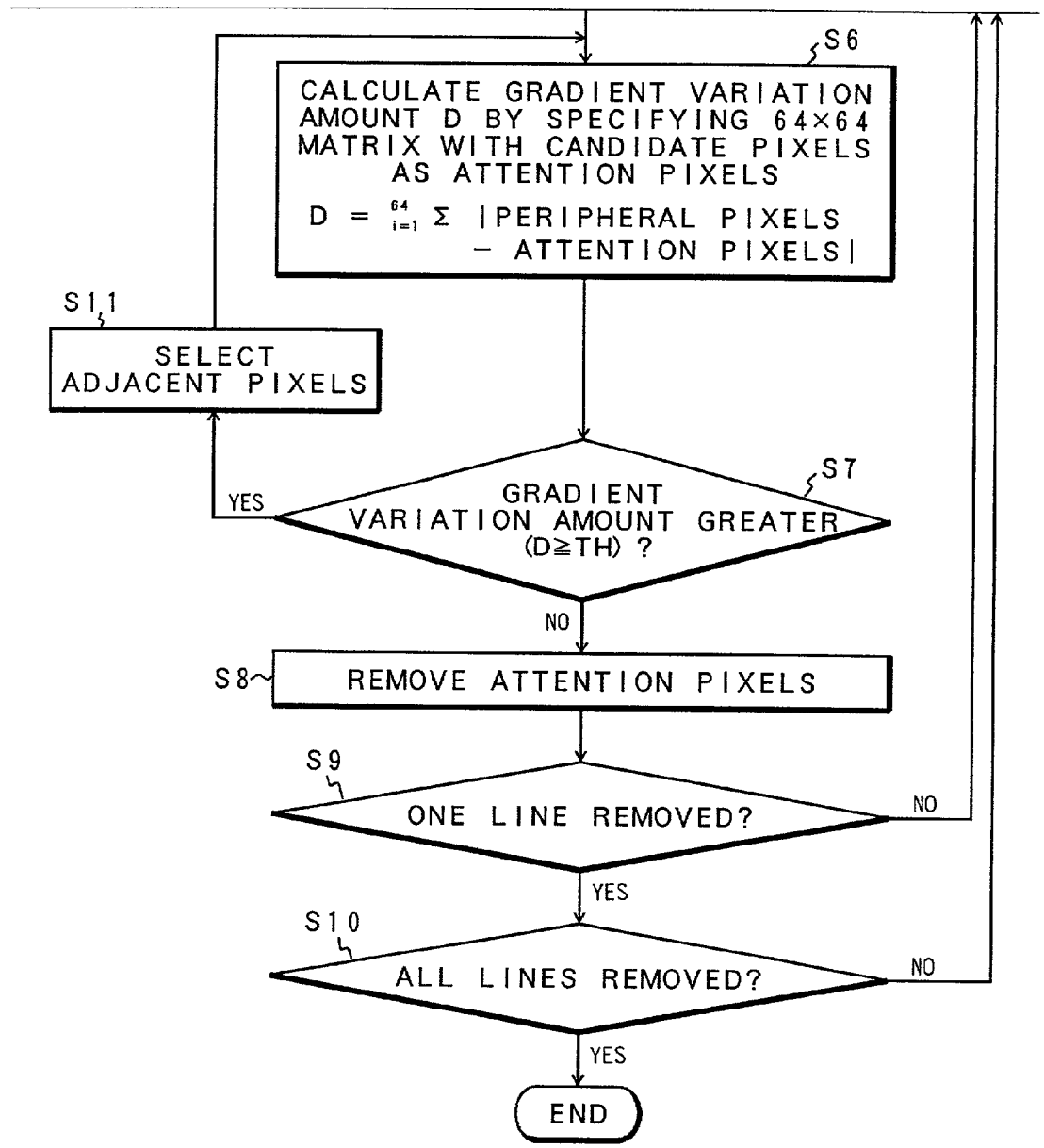

FIGS. 65A and 65B are flowcharts of the pixel-removal scale-scale-reduction processing that is performed by the reduction processor unit 116 shown in FIG. 62. In FIGS. 65A and 65B, first, in step S1, the magnification processor unit 114 retrieves the magnified image 120, which was magnified from the original image 118, as an object image for pixel-removal reduction (removal reduction). As described in the above for the image storage 112 shown in FIG. 62, the image storage 112 has the image size of, for example, (M×N) pixels. Subsequently, in step S2, according to the reduction factor K2 for reduction from the magnified image 120 to the reduced image 122, calculation is performed to obtain a line number HN, that is, the number of lines for which primary-scan-direction pixel-removal is to be performed; and calculation is performed to obtain a line number VN, that is, the number of lines for which secondary-scan-direction pixel-removal is to be performed. Specifically, the numbers may be obtained using the following expressions:

$$HN = \text{primary-scan-direction line number } N \times (1-K2)$$

$$VN = \text{secondary-scan-direction line number } N \times (1-K2)$$

Figure 66:
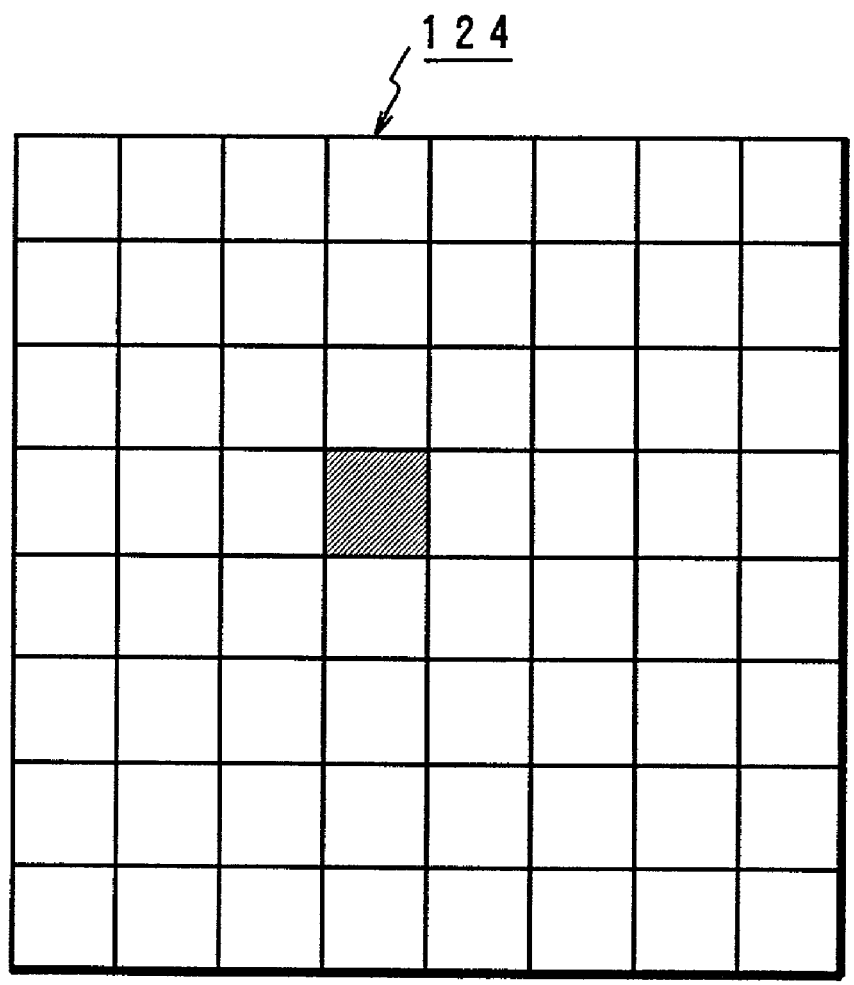
FIG. 66 is an explanatory view of a matrix used to determine removal pixels in the processing shown in FIG. 65.

Subsequently, in step S3, for the line numbers HN and VN, pixel-removal is performed in the respective primary scan direction and secondary scan direction at equal line intervals. Therefore, X and Y values are calculated and specified for removing the lines in the primary scan direction in units of the Y line, and concurrently, in the secondary scan direction in units of the X line. Each of the X and Y values for removing of HN lines in the primary scan direction and VN lines in the secondary scan direction at equal line intervals can be obtained by dividing the total line number in the individual direction by the removal line number that is based on the reduction factor K2 obtained in step S2. Subsequently, in step S4, one line in the primary scan direction or the secondary scan direction is selected. For example, in the present embodiment, selection is performed for one line, which is the first removal object, in the primary scan direction. Subsequently, in step S5, a candidate pixel on the selected one line selected as a removal object is selected. Ordinarily, since the processing of the magnified image 120 in the primary scan direction is started from a left-upper corner, the first pixel at the left end on a primary-scan-direction line selected as the first-removal-object line is selected as the candidate pixel. Subsequently, in step S6, a gradient-variation-amount-detection 64×64 matrix 124 having the candidate pixel as an attention pixel is defined as shown in FIG. 66. A gradient variation amount D is calculated from the following expression:

$$D = \sum_{i=1}^{64} |(\text{peripheral pixels}) - (\text{attention pixels})|$$

That is, the gradient variation amount D is calculated as the sum of absolute values representing differences between the peripheral pixel and the attention pixel. Accordingly, the gradient variation amount D represents the magnitude of the gradient variation of the attention pixel, that is, the removal object, with respect to the peripheral pixel.

Subsequently, in step S7, determination is performed whether or not the gradient variation amount D of the attention pixel is greater with respect to the peripheral pixel. Specifically, determination is performed whether or not the gradient variation amount D calculated in step S6 is equal to or greater than a predetermined threshold TH. If the gradient variation amount D is less than the threshold TH, the attention pixel is removed at step S8. However, if the gradient variation amount D is equal to or greater than the threshold TH, that is, if the gradient variation amount D of the removal-object attention pixel is greater with respect to the peripheral pixel, the probability is high in that the removal-candidate attention pixel constitutes a thin line or a black-void line. That is, if the attention pixel is removed, a thin line or a white-void line may be omitted. Therefore, the attention pixel is not removed, and processing proceeds to step S11. After selecting an adjacent pixel as another candidate pixel in step S11, processing returns to step S6. At step S11, when a primary-scan-direction removal line is selected for removal, a pixel adjacent in the perpendicular secondary scan direction is selected. When a secondary-scan-direction removal line is selected subsequent to the selection in the primary scan direction, a pixel adjacent in the perpendicular primary scan direction is selected. Even when the adjacent pixel is selected, step S7 determines that the gradient variation amount D thereof is still equal to or greater than the threshold TH, a further adjacent pixel is selected.

If the gradient variation amount D of an attention pixel is determined at step S7 to be equal to or greater than the threshold TH, and the attention pixel is removed at step S8, step S9 determines whether all pixels of the current one primary-scan-direction line is removed. If all lines are not yet selected, processing returns to step S5. In step S5, another pixel is selected, and the same processing is repeated. If all pixels of the one line are removed, processing proceeds to step S10. Step S10 determines whether all lines in the primary scan direction and the secondary scan direction are removed; and the routine from step S4 is repeatedly executed until all the lines are processed.

Figure 67A:
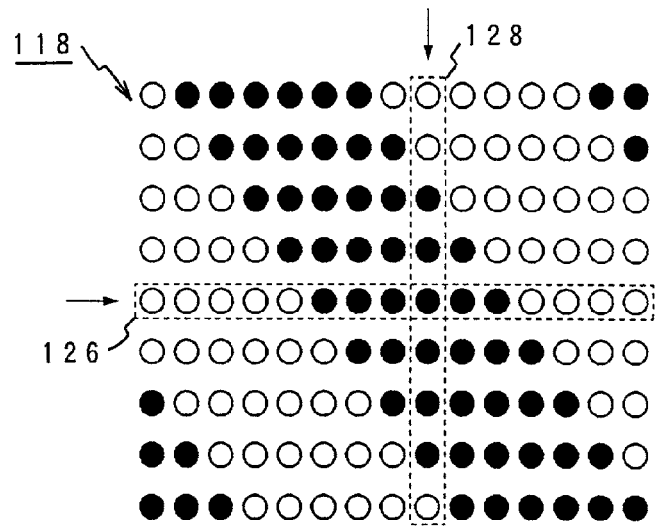
FIGS. 67A to 67C are explanatory views showing conventional removal processing and the removal processing according to the present invention.
Figure 67B:
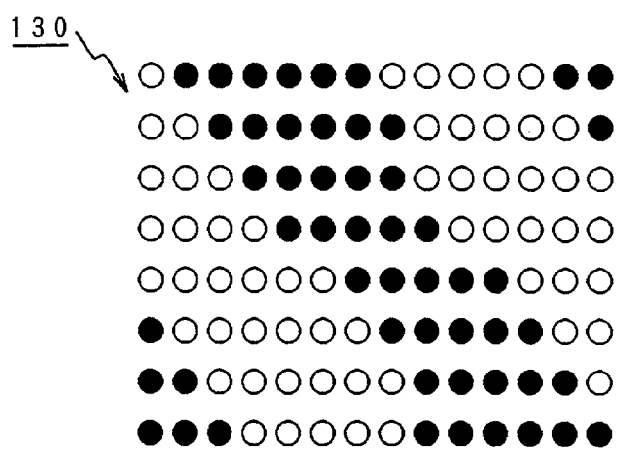
Figure 67C:
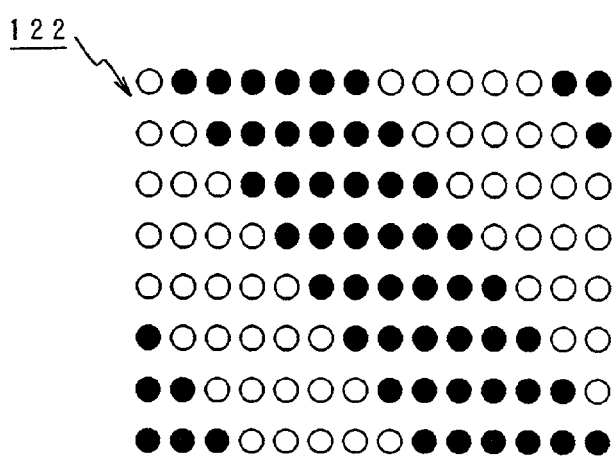

FIGS. 67A to 67C show the pixel-removal scale-reduction processing shown in FIGS. 65A and 65B with example slanting-line images represented black and white pixels. FIG. 67A shows the magnified image 120 in a state prior to scale-reduction processing, and shows the image size of (M×N)=(8×8) to simplify description. Description refers to an example case where the magnified image 120 is reduced to an image in the size of (m×n)=(7×7). To achieve the reduction, pixels of one line in each of the primary scan direction and secondary scan direction must be removed. For example, as shown in FIG. 67A, a primary-scan-direction line 126 and a secondary-scan-direction line 128 are selected as removal object lines. According to the conventional pixel-removal processing, as shown in FIG. 67A, if the same removal-object primary-scan-direction line 126 and secondary-scan-direction line 128 were selected, pixels of the individual lines 126 and 128 would simply be removed to thereby obtain a reduced image 130 in the size of (7×7), as shown in FIG. 67B. However, in the reduced image 130, because of the simple removal of the lines in the primary scan direction and in the secondary scan direction, step-like jaggy portions would be caused at edge portions of slanting lines formed of black pixels.

According to the present invention, however, when the removal-object primary-scan-direction line 126 and the secondary-scan-direction line 128, as shown in FIG. 67A, are selected, the 64×64 matrix 124 shown in FIG. 66 is specified for each pixel of each of the lines to thereby obtain the gradient variation amount D for a peripheral pixel. If the gradient variation amount D is less than the predetermined threshold TH, the pixel is removed. If the gradient variation amount D is equal to or greater than the threshold TH, the pixel is not removed, an adjacent pixel positioned perpendicular to the object line is selected as a candidate, and the similar processing is repeated to determine whether or not the removal is performed for the subsequently selected pixel.

Accordingly, when the pixels of the magnified image 120 shown in FIG. 67A are removed according to the method of the present invention, the image 120 is reduced to a reduced image 122 shown in FIG. 67C. In this case, the slanting lines formed of the black pixels are preserved as they are; one of the white pixels of each line therebetween is removed in the slant direction; and even after the removal, no step-like jaggy portions are caused on the slanting lines formed of the aligned black pixels. In addition, according to the conventional scale-reduction processing as shown in FIG. 67B, only one thin line constituted of black pixels aligned in a slant direction would be omitted. However, according to the pixel-removal scale-reduction processing of the present invention, which is shown in FIG. 67C, no thin line is omitted even after the pixel-removal. Furthermore, while the pixel-removal scale-reduction processing cannot completely avoid indent portions caused by the pixel-removal on slanting lines, irregular or jaggy portions can be effectively corrected according to the present invention as summarized in the following paragraph. As shown in FIG. 61, an image is reduced by the scale-varying processor unit 110 according to the pixel-removal scale-reduction processing, and is binary-coded by the error-variance binary unit 26. Before the binary data is transferred to the printer controller unit 28 and is printed thereby, the smoothing processing is performed by the image-quality controller unit 34 for the binary data. By the smoothing processing, slanting-line jaggy portions caused by pixel-removal scale-reduction processing are corrected. Furthermore, according to the smoothing processing performed by the image-quality controller unit 34 for the image data obtained through the error-variance binary processing, effective correction can be performed for jaggy portions caused through the pixel-removal scale-reduction processing performed by the scale-varying processor unit 110.

The present invention allows various modifications to be made. For example, in the invention, the printer may either be configured such that the second image-quality corrector unit 82 shown in FIGS. 17A and 17B is provided independently or be configured such that the third image-quality corrector unit 84 shown in FIGS. 17A and 17B is provided independently.

In the above-described embodiments, description has been made with reference to the example cases where the present invention is applied to the composite-image printing apparatus that includes the photocopy-reproduction mechanism, a printer mechanism, a facsimile mechanism, and a filing mechanism. However, the invention may be appropriately applied to various other apparatuses as long as they are printers that input binary data generated by one of the simple binary processing method, the dither method, and the error-variance method, and print the data.

In addition, the detection pattern numbers prefixed by "PAT" for the smoothing processing are used for the convenience of description; therefore, the invention is not thereby restricted.

Furthermore, while the above-described embodiment of the pixel-removal scale-reduction processing has been described with reference to the example of the composite-image printing apparatus, the scale-varying processor unit 110 of the present invention may also be used as it is for image processors configured to include only the scanner 14 and the scanner controller unit 24 that are shown in FIG. 61.

Furthermore, unless the objects and the advantages of the invention are impaired, the invention includes all modifications made within the scope of the invention. Still furthermore, the invention is not limited by the numeric values used in the description of the embodiments.

INDUSTRIAL APPLICABILITY

As described above, the invention can perform various types of correction for defects specific to black and white pixel data that are generated by binary processing performed according to an error-variance method. For example, detection is performed for vertical-line irregularity patterns, horizontal-line irregularity patterns, thin-line patchy patterns, and isolated pixels (in light-gray fields). The detected defects are appropriately corrected according to smoothing-correction processing of the invention such that irregular patterns are smoothed, patchy patterns are connected, and isolated pixels are distributed to peripheral pixels. Therefore, according to the smoothing correction of the invention, degradation in image quality can be prevented for halftone images, character images, and line (line-drawing) images, thereby allowing the provision of print images having high reproductivity with respect to original images.

In addition, according to processing algorithms of the present invention, interruption is controlled to occur in smoothing correction performed by the detection of patterns specific to the error-variance method to allow smoothing correction, for example, slanting-line irregularities to be implemented. This avoids unnecessary over-operation of the smoothing processing intended for binary image data generated according to the error-variance method. Thereby, degradation in quality can be prevented for print images represented by binary data generated according to a method other than the error-variance method.

Furthermore, according to the present invention, the smoothing correction can also be implemented for images of which the sizes are varied through scale-varying processing that varies an original image size to a predetermined image size by removal of pixels constituting the original image that is optically scanned and input. In this case, after data representing the original image is converted to a binary unit to black and white pixel data according to the error-variance method by means of binary unit, defective patterns specific to the error-variance method are detected and smoothed. Therefore, jaggy patterns caused through the pixel-removal processing can be effectively corrected, thereby allowing the image to be printed to have an improved quality level.

Still furthermore, a scale-varying processor unit provided in the invention is controlled to operate such that decision is made for the variation in the gradation of a pixel-removal-candidate attention pixel with respect peripheral pixels thereof, and pixel-removal processing is waved therefor if the variation in the variation is determined to be relatively great. This operation securely prevents omission of thin lines, white-void lines, and the like, which can be caused through the pixel-removal processing.

The invention claimed is:

1. A printer for performing correction to improve the quality of images represented by input binary black and white pixel data and for printing the images, comprising;
   an image-quality corrector unit for detecting isolated pixels that are specific to an error-variance method and that are represented by data included in the input black and white pixel data and for distributing the detected isolated pixel to peripheral pixels to thereby reduce isolated pixel dot size, and
   wherein said image-quality corrector unit comprises a plurality of matrix patterns having different sizes, uses the matrix patterns in the order of larger sizes to detect isolated pixels, and distributes the isolated pixels to peripheral pixels according to the sizes of the matrix patterns used to detect the isolated pixels.

2. The printer according to claim 1, wherein said image-quality corrector unit allows the number of distributed peripheral pixels to be increased in proportion to the increase in the size of the matrix pattern used to detect an isolated pixel, and concurrently, allows the dot size of a reduced distribution pixel to be reduced in inverse proportion thereto.

3. The printer according to claim 1, wherein said image-quality corrector unit uniformly distributes reduced pixels obtained through reduction in the dot size of the detected isolated pixel to peripheral pixels in a plurality of directions.

4. A printer for performing correction to improve the quality of images represented by input binary black and white pixel data and for printing the images, comprising:
   a first image-quality corrector unit for detecting first irregular patterns that are represented by data included in the black and white pixel data and specific to binary processing (binary coding) to thereby smooth the detected first irregular patterns;
   a second image-quality corrector unit for detecting second irregular patterns that are represented by data included in the input black and white pixel data and specific to an error-variance method, wherein said second image-quality corrector unit detects at least one type of substantially vertical vertical-line irregular patterns, substantially horizontal horizontal-line irregular patterns, and thin-line patchy patterns to thereby smooth the detected second irregular patterns;
   a controller unit for operating such that the black and white pixel data input to said first image-quality corrector unit is input to said second image-quality corrector unit to be processed thereby when the black and white pixel data does not match one of the first irregularity detection patterns, and said first image-quality corrector unit is used to process the input black and white pixel data when the black and white pixel data matches one of the first irregularity detection patterns; and
   a third image-quality corrector unit for detecting isolated pixels included in said input black and white pixel data, and causing diffusion of the detected isolated pixels into surrounding pixels to thereby reduce isolated pixel dot size; and
   wherein said third image-quality corrector unit has a plurality of matrix patterns having different sizes, detects the isolated pixels by use of said matrix patterns in a descending sequence of size, and causes diffusion of the isolated pixels into the surrounding pixels in response to the size of the matrix patterns having said isolated pixels.

5. The printer according to claim 4, wherein said first image-quality corrector unit and said second image-quality corrector unit sequentially input the black and white pixel data representing groups of an attention pixel and a plurality of peripheral pixels, and compares the input data to the first irregular patterns and the second irregularity detection patterns; and when pattern-matching is detected, said first image-quality corrector unit and said second image-quality corrector unit perform area gradation correction for converting an area at a predetermined position in an n-divisional pixel (n=natural number) of the attention pixel and a predetermined number of intrapixel divisional areas to black areas.

6. The printer according to claim 4, wherein said first image-quality corrector unit allows the number of distributed peripheral pixels to be increased in proportion to the increase in the size of the matrix pattern used to detect an isolated pixel, and concurrently, allows the dot size of a reduced distribution pixel to be reduced in inverse proportion thereto.

7. The printer as according to claim 4, wherein said third image-quality corrector unit uniformly distributes reduced pixels obtained through reduction in the dot size of the detected isolated pixel to peripheral pixels in a plurality of directions.

8. The printer according to claim 4, wherein said controller unit operates such that the black and white pixel data input to said first image-quality corrector unit is input to said second image-quality corrector unit and subsequently to said third image-quality corrector unit to be processed thereby when the black and white pixel data does not match one of the first irregularity detection patterns, and said first image-quality corrector unit is used to process the input black and white pixel data by prevention processing being performed by said second image-quality corrector unit and processing being processed by said third image-quality corrector unit when the black and white pixel data matches one of the first irregularity detection patterns.

9. A printer, according to claim 4, further comprising a scale-varying processor unit for varying the size of an original image optically scanned to a predetermined image size by performing pixel-removal processing.

10. The printer according to claim 9, wherein said scale-varying processor unit magnifies the size of the original image to a first predetermined image size according to pixel-interpolation, and then reduces the magnified image size to a second predetermined image size by performing the pixel-removal processing.

11. The printer according to claim 9, wherein said scale-varying processor unit detects a gradient variation of a pixel-removal-candidate attention pixel with respect to peripheral pixels, does not perform pixel-removal processing when the gradient variation is relatively great, and performs pixel-removal processing when the gradient variations are relatively small.

12. The printer according to claim 9, wherein said scale-varying processor unit defines a matrix having a predetermined size for a pixel-removal-candidate attention pixel, calculates the sum of absolute values representing the difference between the pixel-removal-candidate attention pixel and peripheral pixels belonging to the matrix as a gradient variation amount, does not perform the pixel-removal processing when the gradient variation amount is equal to or greater than a predetermined threshold, and performs pixel-removal processing when the gradient variation amount is less than the threshold.

13. The printer according to claim 9, wherein said scale-varying processor unit does not perform remove a removal-candidate pixel either when the level of the removal-candidate pixel is bright, and the overall tone of peripheral pixels thereof is dark; or when the level of the removal-candidate pixel is dark, and the overall tone of peripheral pixels thereof is bright.

14. A printer for performing correction to improve the quality of images represented by input binary black and white pixel data and for printing the images, comprising:
   a first image-quality corrector unit for detecting first irregular patterns that are represented by data included in the black and white pixel data to thereby smooth the detected first irregular patterns;
   a second image-quality corrector unit for detecting isolated pixels that are represented by data included in the input black and white pixel data and for distributing the detected isolated pixel to peripheral pixels to thereby reduce isolated pixel dot size; and
   a controller unit for operating such that the black and white pixel data input to said first image-quality corrector unit is input to said second image-quality corrector unit to be processed thereby when the black and white pixel data does not match one of the first irregularity detection patterns, and said first image-quality corrector unit is used to process the input black and white pixel data by preventing processing being performed by said third image-quality corrector unit when the black and white pixel data matches one of the first irregularity detection patterns; and
   wherein said second image-quality corrector unit has a plurality of matrix patterns having different sizes, detects isolated pixels by use of said matrix patterns in a descending sequence of size, and causes diffusion of the isolated pixels into surrounding pixels in response to the size of the matrix patterns having said isolated pixels.

15. A printing method for performing correction to improve the quality of images represented by input binary black and white pixel data and for printing the images, comprising performing detection for isolated pixels that are specific to error-variance method and that are represented by data included in the input black and white pixel data; and distributing the detected isolated pixel to peripheral pixels to thereby reduce isolated pixel dot size; and
   wherein said performing uses a plurality of matrix patterns having different sizes, detects isolated pixels by use of said matrix patterns in a descending sequence of size, and causes diffusion of the isolated pixels into surrounding pixels in response to the size of the matrix patterns having said isolated pixels.

16. A printing method for performing correction to improve the quality of images represented by input binary black and white pixel data for printing the images, comprising:
   a first image-quality correction step for detecting first irregular patterns that are represented by data included in the black and white pixel data to thereby smooth the detected first irregular patterns;
   a second image-quality correction step for detecting second irregular patterns that are represented by data included in the input black and white pixel data and that are specific to an error-variance method, wherein said image-quality correction step detects at least one type of substantially vertical vertical-line irregular patterns, substantially horizontal horizontal-line irregular patterns, and thin-line patchy patterns to thereby smooth the detected second irregular patterns;
   a third image-quality correction step for detecting isolated pixels that are represented by data included in the input black and white pixel data and for distributing the detected isolated pixel to peripheral pixels to thereby reduce isolated pixel dot size; and
   a control step for operating such that the black and white pixel data input to said first image-quality correction step is input to said third image-quality correction step to be processed therein when the black and white pixel data does not match one of the first irregularity detection patterns, and said first image-quality correction step is used to process the input black and white pixel data by preventing processing being performed in said second image-quality correction step and said third image-quality correction step when the black and white pixel data matches one of the first irregularity detection patterns; and wherein said third image-quality correction step uses a plurality of matrix patterns having different sizes, detects isolated pixels by use of said matrix patterns in a descending sequence of size, and causes diffusion of the isolated pixels into surrounding pixels in response to the size of the matrix patterns having said isolated pixels.

17. A printing method for performing correction to improve the quality of images represented by input binary black and white pixel data for printing the images, comprising:

an image-quality correction step for detecting irregular patterns that are represented by data included in the black and white pixel data to thereby smooth the detected irregular patterns;

a pixel-distribution step for detecting isolated pixels that are represented by data included in the input black and white pixel data and for distributing the detected isolated pixel to peripheral pixels to thereby reduce isolated pixel dot size; and a control step for operating such that the black and white pixel data input to said image-quality correction step is input to said pixel-distribution step to be processed therein when the black and white pixel data does not match one of the first irregularity detection patterns, and said image-quality correction step is used to process the input black and white pixel data by preventing processing being performed in said pixel-distribution step when the black and white pixel data matches one of the first irregularity detection patterns; and wherein said image-quality correction step uses a plurality of matrix patterns having different sizes, detects isolated pixels by use of said matrix patterns in a descending sequence of size, and causes diffusion of the isolated pixels into surrounding pixels in response to the size of the matrix patterns having said isolated pixels.

* * * * *

UNITED STATES PATENT AND TRADEMARK OFFICE
CERTIFICATE OF CORRECTION

| | | |
|---|---|---|
| PATENT NO. | : 7,064,862 B2 | Page 1 of 1 |
| APPLICATION NO. | : 09/835620 | |
| DATED | : June 20, 2006 | |
| INVENTOR(S) | : Yoshihiro Takashimizu | |

It is certified that error appears in the above-identified patent and that said Letters Patent is hereby corrected as shown below:

Column 35, line 25, change "prevention" to --preventing--

Column 35, line 59, change "remove" to -- removal of--

Column 35, line 30, after "to" insert --an--

Column 36, line 42, after "data" insert --and--

Column 36, line 51, after "said" insert --second--

Column 37, line 16, after "data" insert --and--

Signed and Sealed this

Tenth Day of April, 2007

JON W. DUDAS
*Director of the United States Patent and Trademark Office*

UNITED STATES PATENT AND TRADEMARK OFFICE
CERTIFICATE OF CORRECTION

PATENT NO. : 7,064,862 B2  Page 1 of 1
APPLICATION NO. : 09/835620
DATED : June 20, 2006
INVENTOR(S) : Yoshihiro Takashimizu It is certified that error appears in the above-identified patent and that said Letters Patent is hereby corrected as shown below:

Column 35, line 25, change "prevention" to --preventing--

Column 35, line 59, change "remove" to --removal of--

Column 36, line 30, after "to" insert --an--

Column 36, line 42, after "data" insert --and--

Column 36, line 51, after "said" insert --second--

Column 37, line 16, after "data" insert --and--

This certificate supersedes the Certificate of Correction issued April 10, 2007.

Signed and Sealed this

First Day of April, 2008

JON W. DUDAS
*Director of the United States Patent and Trademark Office*